United States Patent
Peng et al.

(10) Patent No.: US 12,486,284 B2
(45) Date of Patent: Dec. 2, 2025

(54) UBIQUITIN-SPECIFIC PROTEASE INHIBITOR AND PREPARATION METHOD THEREFOR AND USE THEREOF

(71) Applicant: CHASER THERAPEUTICS, INC., Zhejiang (CN)

(72) Inventors: Jin Peng, Zhejiang (CN); Kun Jiang, Zhejiang (CN); Jitian Bu, Zhejiang (CN); Feng Wang, Zhejiang (CN)

(73) Assignee: CHASER THERAPEUTICS, INC., Zhejiang (CN)

( * ) Notice: Subject to any disclaimer, the term of this patent is extended or adjusted under 35 U.S.C. 154(b) by 905 days.

(21) Appl. No.: 17/595,122

(22) PCT Filed: May 8, 2020

(86) PCT No.: PCT/CN2020/089284
§ 371 (c)(1),
(2) Date: Nov. 9, 2021

(87) PCT Pub. No.: WO2020/224652
PCT Pub. Date: Nov. 12, 2020

(65) Prior Publication Data
US 2022/0213118 A1 Jul. 7, 2022

(30) Foreign Application Priority Data
May 9, 2019 (CN) .......................... 201910385956.0

(51) Int. Cl.
*C07D 495/04* (2006.01)
*C07D 519/00* (2006.01)

(52) U.S. Cl.
CPC ......... *C07D 495/04* (2013.01); *C07D 519/00* (2013.01)

(58) Field of Classification Search
CPC ..... C07D 495/04; C07D 519/00; Y02P 20/55; A61P 31/04; A61P 31/12; A61P 35/00; A61P 37/06; A61P 29/00; A61P 37/00; A61K 31/4365; A61K 31/4545; A61K 31/496; A61K 31/4985
USPC ....................................................... 514/301
See application file for complete search history.

(56) References Cited

FOREIGN PATENT DOCUMENTS

| CN | 101128470 A | 2/2008 | |
|---|---|---|---|
| CN | 101341153 A | 1/2009 | |
| CN | 109071560 A | 12/2018 | |
| CN | 109071561 A | 12/2018 | |
| WO | WO-2006068618 A1 * | 6/2006 | .............. A61P 11/00 |
| WO | 2009048274 A2 | 4/2009 | |
| WO | 2017139779 A1 | 8/2017 | |
| WO | WO-2017139778 A1 * | 8/2017 | .............. A61P 29/00 |
| WO | 2019032863 A1 | 2/2019 | |
| WO | 2020033707 A1 | 2/2020 | |

OTHER PUBLICATIONS

Brown, N. Bioisosteres in medicinal chemistry. Wiley-Vch, Cop. (Year: 2012).*
Li, Xue-Dong et al. "Identification of thienopyridine carboxamides as selective binders of HIV-1 trans Activation Response (TAR) and Rev Response Element (RRE) RNAs", Organic & Biomolecular Chemistry, vol. 16, No. 47, Nov. 16, 2018, ISSN: 1477-0520, pp. 9191-9196, especially, p. 9192, figure 2.
Liu, Huan et al., "Synthesis, preliminary structure-activity relationships, and in vitro biological evaluation of 6-aryl-3-amino-thieno[2,3-b]pyridine derivatives as potential anti-inflammatory agents", Bioorganic & Medicinal Chemistry Letters, Elsevier, Amsterdam, NL, vol. 23, No. 8, Feb. 24, 2013, pp. 2349-2352.
Rodinovskaya L A et al., "Synthesis of annulated heterocyclic systems based on 44CF 3 or 44CHF 2", Russian Chemical Bulletin International Edition, vol. 62, Oct. 1, 2013, pp. 2214-2226.

* cited by examiner

*Primary Examiner* — Scarlett Y Goon
*Assistant Examiner* — Hoi Yan Lee
(74) *Attorney, Agent, or Firm* — NKL Law; Allen Xue

(57) ABSTRACT

A compound represented by formula I and a racemate, a stereoisomer, a tautomer, an isotopic marker, nitrogen oxide, a solvate, a polymorph, a metabolite, an ester, a pharmaceutically acceptable salt or a prodrug thereof, a pharmaceutical composition comprising same, a preparation method therefor, and a pharmaceutical use thereof are described. The compound has the activity of inhibiting USP28 and/or USP25. The structure of the formula I is as follows.

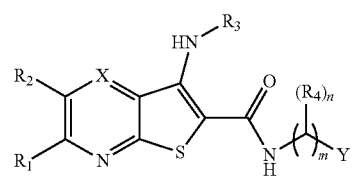

(I)

13 Claims, No Drawings

UBIQUITIN-SPECIFIC PROTEASE INHIBITOR AND PREPARATION METHOD THEREFOR AND USE THEREOF

CROSS REFERENCE TO RELATED APPLICATIONS

The present application is a U.S. national stage entry of PCT International Application No. PCT/CN2020/089284, filed on May 8, 2020, which claims priority to Chinese Patent Application No. 201910385956.0 filed with China National Intellectual Administration on May 9, 2019, and entitled "UBIQUITIN-SPECIFIC PROTEASE INHIBITOR AND PREPARATION METHOD THEREFOR AND USE THEREOF", which is incorporated herein by reference in its entirety.

TECHNICAL FIELD

The present invention relates to the field of medicines, and in particular to a novel ubiquitin-specific protease inhibitor and a preparation method therefor and use thereof.

BACKGROUND

The normal functioning of a cell depends on intracellular protein homeostasis, and the maintenance of this homeostasis depends on the dynamic balance of protein synthesis and degradation. Cells remove undesired proteins, such as ones that are damaged or have played their own parts, primarily in a proteasome degradation way. Proteins degraded by proteasomes are usually labeled with a polyubiquitin chain formed via lysine 48. The polyubiquitin labeling of proteins is the result of the action of a series of enzymes, mainly including E1, E2 and E3. E1 activates ubiquitin by forming a high-energy thioester bond between its own cysteine residue and the C-terminal carboxyl group of ubiquitin consisting of 76 amino acids; the activated ubiquitin is transferred to the cysteine residue of E2 (approximately 50 types of E2 conjugated enzymes in mammals); subsequently, under the action of E3 ligase (approximately 500 types of E3 in mammalian cells), the E2 conjugated enzyme transfers the ubiquitin to a lysine residue of a target protein. In essence, the E3 ligase simply brings together the E2 conjugated enzymes and the substrate such that the ubiquitin is transferred from E2 to the target protein (Annu. Rev. Biochem., 2009, 78, 477 & 2018, 87, 697; J. Am. Soc. Nephrol., 2006, 17, 1807). Ubiquitin-mediated protein degradation by proteasomes is an essential regulatory means in a range of cell activities, such as cell cycle, apoptosis (Front Cell. Dev. Biol., 2018, 6, 11; Cell Death Differ., 1999, 6, 303; J. Cell. Mol. Med., 2002, 6, 25), and DNA damage checkpoint control (DNA Repair, 2010, 9, 1229; Biochim. Biophys. Acta., 2014, 1843, 150; Cell Death Differ., 2010, 17, 78; ISRN Mol. Biol., 2012, 146748).

Cells also possess the ability to deubiquitinate, relative to ubiquitination, so as to more precisely regulate protein homeostasis. Deubiquitination is catalyzed by deubiquitinases (DUBs). DUBs are a class of specific proteolytic enzymes (Physiol. Rev., 2013, 93, 1289; Oncogene, 2012, 31, 2373; Biochem. J., 2015, 465, 1; BMC Biochem., 2008, 9 Suppl 1, S3; Protein Sci., 2014, 23, 344). In mammals, over 100 types of known DUBs are divided into several families, including the ubiquitin-specific protease (USP) family, the ubiquitin C-terminal hydrolase (UCH) family, the ovarian tumor protease (OTU) family, and the Machado-Josephin domain (MJD) family.

It is understood that the dysregulation of the proteasome-mediated protein degradation system is closely tied to a great many human diseases, including tumors and some diseases of immune and nervous system (Front Mol. Neurosci., 2014, 7, 70; Cardiovasc. Res., 2010, 85, 251; Essays Biochem., 2005, 41, 187; Front Biosci., 2014, 19, 886; Cancer Biol. Ther., 2002, 1, 337; IUBMB Life, 2015, 67, 544; Acta Neuropathol., 2009, 118, 329; Int. J. Biochem. Cell. Biol., 2018, 101, 80; J. Clin. Oncol., 2013, 31, 1231; Cancer Metastasis Rev. 2017, 36, 635; Circ. Res., 2013, 112, 1046; Drug Resist. Updat., 2015, 23, 1; Biochim. Biophys. Acta., 2014, 1843, 13; Cancer Metastasis Rev., 2017, 36, 683; Cancer Sci., 2009, 100, 24).

USP28, a ubiquitin-specific protease, plays an important role in maintaining protein levels of c-MYC (Nat. Cell. Biol., 2007, 9, 765), LSD1 (Cell Rep., 2013, 5, 224), HIF1alpha (Blood, 2012, 119, 1292), Notch1 (J. Clin. Invest., 2014, 124, 3407), 53BP1 (Mol. Cell. Biol., 2014, 34, 2062) and CLASPIN (Cell 2006, 126, 529) and the like, preventing them from being degraded while still functioning. Almost all of these substrates, especially c-MYC, play an important role in tumorigenesis and progression. There are also evidences showing that USP28 is overexpressed in tumors and patients with high expression levels have a poor prognosis (Tumor Biol., 2014, 35, 4017; BBA-Mol. Basis. Dis., 2019, 1865, 599; Biochem. Pharmacol., 2018, 150, 280; Oncotarget, 2017, 8, 39627; Transl. Oncol., 2017, 10, 80; J. Cell. Mol. Med., 2015, 19, 799). This makes USP28 an attractive target for tumor therapy.

c-MYC acts as a transcription factor that activates the expression of genes involved in cell growth and proliferation (Biochim. Biophys. Acta, 2015, 1849, 506; Annu. Rev. Cell Dev. Biol., 2000, 16, 653; Trends Biochem. Sci., 1997, 22, 177; Adv. Cancer Res., 1996, 70, 95; Lung Cancer, 2001, 34 Suppl 2, S43). Almost all growth-regulating signaling pathways ultimately require c-MYC to function, making c-MYC a most potential target in tumor therapy (Cancer Lett., 2003, 197, 125; Expert Opin. Ther. Targets, 2003, 7, 623; Cell, 2004, 117, 153-156; Semin. Cancer Biol., 2006, 16, 318). However, research experience over the past decades has shown that small molecule compounds that directly regulate c-MYC activity are almost impossible to find (Biochim. Biophys. Acta, 2015, 1849, 525). In this context, efforts are currently made to find methods for indirectly inhibiting the function of c-MYC. One approach is to exploit the instability of c-MYC proteins. FBW7, a main E3 ligase of c-MYC, promotes its ubiquitination and degradation (Curr. Biol., 2004, 14, 1852; EMBO J., 2004, 23, 2116), while USP28 plays an opposite role in this process (Nat. Cell Biol., 2007, 9, 765). Thus, the inhibition of USP28 can potentially decrease the stability of c-MYC and thereby slow down or prevent the proliferation of tumor cells.

LSD1 is a histone demethylase that plays an important role in epigenetic regulation of gene expression (Curr. Opin. Chem. Biol., 2007, 11, 561; Epigenomics, 2016, 8, 1103). LSD1 has been found to be overexpressed in a number of malignancies, and LSD1 is believed to play a very important role in the maintenance of tumor stem cells (Hum. Pathol., 2012, 43, 1300; Fertil. Steril., 2014, 101, 740; Int. J. Cancer, 2011, 128, 574; J. Ovarian Res., 2013, 6, 75; Int. J. Gynecol. Cancer, 2015, 25, 1453; PLoS One, 2015, 10, e0118002; Tumor Biol., 2013, 34, 173; World J. Gastroenterol., 2012, 18, 6651). In breast cancer cells, the absence of LSD1 results in the loss of the stem cell population, and also reduces the proliferative potential of cells (Cell Rep., 2013, 5, 224). In addition, LSD1 has also been identified as a key regulation factor in tumor immunity (Cell, 2018, 174, 549). Therefore, the inhibition of USP28 can destabilize these two abnormally important oncoproteins LSD1 and c-MYC, and reduce their intracellular levels, thereby achieving the purpose of preventing tumor cell proliferation.

USP28-free mice develop well and grow well after birth, and neither obvious unhealthy condition nor impaired fertility is observed in adult mice, indicating that USP28 is unnecessary in mice (J. Clin. Invest., 2014, 124, 3407; Mol. Cell. Biol., 2014, 34, 2062). However, USP28-free mice show resistance to APC mutation-induced colon cancer (J. Clin. Invest., 2014, 124, 3407), suggesting that USP28 is a valuable target at least in colon cancer therapy.

Recent studies have led to a continuous recognition of the important role of cellular senescence in individual senescence (Nat. Rev. Mol. Cell. Biol., 2007, 8, 729; Exp. Gerontol., 2001, 36, 1619; Nat. Med., 2015, 21, 1424; J. Physiol. Anthropol., 2007, 26, 365; Mol. Biol. Cell, 2015, 26, 4524; Curr. Opin. Cell. Biol. 1991, 3, 230; Adv. Exp. Med. Biol., 2017, 1002, 189; Mech. Ageing Dev., 2008, 129, 460; Cell. Biochem., 2007, 101, 1355; Nat. Rev. Nephrol., 2017, 13, 77; Nature, 2014, 509, 439). More importantly, the elimination of senescent cells can ameliorate the health condition of aged animals (Nature, 2011, 479, 232; J. Clin. Invest., 2018, 128, 1217; Nat. Med., 2017, 23, 775-781; Clin. Pharmacol. Ther., 2013, 93, 105). Senescence-associated secretory phenotype (SASP) refers to a phenomenon in which senescent cells secrete plenty of cytokines, many of which may initiate inflammatory responses (J. Clin. Invest., 2013, 123, 966). Current studies show that USP28 is necessarily involved in cellular senescence (Genes Dev., 2017, 31, 1933), and thus the inhibition of USP28 may produce beneficial effects in the elderly.

USP25 is a homologous gene very close to USP28, and is similar to USP28-free mice, and mice lacking USP25 also do not present any unhealthy character (Nat. Immunol., 2012, 13, 1110). However, these two deubiquitinases are located in different regions of a cell (USP28 in the nucleus and USP25 in the cytoplasm) and their substrate spectra are also different. Tankyrase is one of the substrates of USP25 (Cell Rep., 2017, 31, 1024). It is a poly-ADP-ribosyltransferase and is involved in a variety of biological processes, such as Wnt signaling pathway, telomere length maintenance, and vesicle trafficking. The prevention of USP25 function may result in attenuation of Wnt signaling (Genes Dev., 2017, 31, 1024). Given the known role of Wnt signaling in cancer, it can be predicted that the inhibition of USP25 will also produce beneficial effects on tumor therapy. Based on the homology of USP28 and USP25, it is expected that any small molecule that targets USP28 will also target USP25, which may, however, add to their value in tumor therapy.

It is reported that USP25 can negatively regulate IL17-mediated immune responses by deubiquitinating TRAF5 and TRAF6 proteins (Nat. Immunol., 2012, 13, 1110). Further studies have shown that USP25 can also deubiquitinate TRAF3 proteins and thereby regulate TLR4-dependent innate immune responses (PLoS One, 2013, 8, e80976). Therefore, the inhibition of USP25 is likely to be beneficial to the immune response of the body against tumors and infections.

SUMMARY

To ameliorate the problems existing in the prior art, and to provide a novel structure having inhibitory activity against USP28/USP25, the present invention provides a compound of formula I below, and a racemate, a stereoisomer, a tautomer, an isotopically labeled compound, a nitrogen oxide, a solvate, a polymorph, a metabolite, an ester, a pharmaceutically acceptable salt or a prodrug thereof:

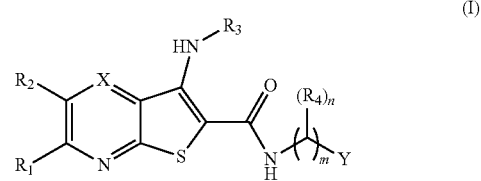

wherein:
X is $CR_5$ or N;
m is 0, 1, 2, 3, 4, 5 or 6;
n is 1 or 2;
Y is selected from

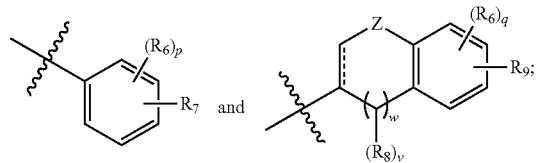

Z is $NR_{10}$, O, S or $CR_{11}R_{12}$; the dashed bond represents that there may be a bond or not;
p is 1, 2, 3 or 4;
q is 1, 2 or 3;
w is 0 or 1;
v is 1 or 2;
$R_1$, $R_2$ and $R_5$, which may be the same or different, are each independently selected from hydrogen, halogen, amino and an optionally unsubstituted or substituted ($C_1$-$C_{12}$) aliphatic hydrocarbyl;
$R_3$ is an unsubstituted or substituted ($C_1$-$C_{12}$) aliphatic hydrocarbyl;
$R_4$, $R_6$ and $R_8$, which may be the same or different, are each independently selected from hydrogen, halogen, hydroxy, amino and an optionally unsubstituted or substituted ($C_1$-$C_{12}$) aliphatic hydrocarbyl;
$R_7$ and $R_9$ are selected from hydrogen, halogen, hydroxy, amino and an optionally unsubstituted or substituted ($C_1$-$C_{12}$) aliphatic hydrocarbyl, with the proviso that each $R_6$ and $R_7$ are not both H simultaneously (e.g., when $R_6$ is H, $R_7$ is not H);
or, $R_7$ and $R_9$ are selected from 3-20 membered heterocyclyl and 5-20 membered heteroaryl unsubstituted or optionally substituted with one, two or more $R_{13}$;
$R_{10}$ is selected from hydrogen and an unsubstituted or substituted ($C_1$-$C_{12}$) aliphatic hydrocarbyl;
$R_{11}$, $R_{12}$ and $R_{13}$ are selected from hydrogen, halogen, hydroxyl, amino and an optionally unsubstituted or substituted ($C_1$-$C_{12}$) aliphatic hydrocarbyl.

According to an embodiment of the present invention, the "unsubstituted ($C_1$-$C_{12}$) aliphatic hydrocarbyl" is a linear or branched, saturated or unsaturated chain or cyclic hydrocarbyl consisting of 1-12 carbon atoms and corresponding hydrogen atoms, and the type of the aliphatic hydrocarbyl may be selected from alkyl, alkenyl, alkynyl and other groups; the "substituted ($C_1$-$C_{12}$) aliphatic hydrocarbyl" is a ($C_1$-$C_{12}$) aliphatic hydrocarbyl containing one, two or more halogen and/or oxygen, sulfur, nitrogen and phosphorus atoms, wherein the halogen and the oxygen, sulfur, nitrogen and phosphorus atoms may be positioned on the linear or branched chain of the ($C_1$-$C_{12}$) aliphatic hydrocarbyl and may also be positioned on any one position of the linear or branched chain; the "($C_1$-$C_{12}$) aliphatic hydrocarbyl" may preferably be a "($C_1$-$C_{10}$) aliphatic hydrocarbyl", a "($C_1$-$C_8$) aliphatic hydrocarbyl" and a "($C_1$-$C_6$) aliphatic hydrocarbyl", for example, may be selected from the following groups: a ($C_1$-$C_6$) aliphatic hydrocarbyl, a ($C_1$-$C_6$) aliphatic hydrocarbyloxy, an N—($C_1$-$C_6$) aliphatic hydrocarbylamino, an N,N-di-($C_1$-$C_3$) aliphatic hydrocarbylamino, a ($C_1$-$C_6$) aliphatic hydrocarbylthio, a halogenated ($C_1$-$C_6$) aliphatic hydrocarbyl, a halogenated ($C_1$-$C_6$) aliphatic hydrocarbyloxy, a (mono- or di-N-substituted) halogenated ($C_1$-$C_6$) aliphatic hydrocarbylamido, a halogenated ($C_1$-$C_6$) aliphatic hydrocarbylthio, a ($C_1$-$C_6$) aliphatic hydrocarbyloxy ($C_1$-$C_6$) aliphatic hydrocarbyl, a ($C_1$-$C_6$) aliphatic hydrocarbylthio ($C_1$-$C_6$) aliphatic hydrocarbyl, an N—($C_1$-$C_6$) aliphatic hydrocarbylamido ($C_1$-$C_6$) aliphatic hydrocarbyl, and an N,N-di-($C_1$-$C_3$) aliphatic hydrocarbylamido ($C_1$-$C_6$) aliphatic hydrocarbyl, and more specifically, may be methyl, ethyl, propyl, isopropyl, cyclopropyl, methoxymethyl, ethoxymethyl, propoxymethyl, methoxyethyl, ethoxyethyl, propoxyethyl, methoxypropyl, ethoxypropyl, propoxypropyl, N-methylaminomethyl, N-methylaminoethyl, N-ethylaminoethyl, N,N-dimethylaminomethyl, N,N-dimethylaminoethyl, or N,N-diethylaminoethyl.

According to an embodiment of the present invention, Z is nitrogen-hydrogen (NH), oxygen (O), sulfur (S) or methylene ($CH_2$).

According to an embodiment of the present invention, $R_3$ may be selected from methyl, ethyl, propyl, butyl, methoxymethyl, ethoxymethyl, propoxymethyl, methoxyethyl, ethoxyethyl, propoxyethyl, methoxypropyl, ethoxypropyl, propoxypropyl, N-methylaminomethyl, N-methylaminoethyl, N-ethylaminoethyl, N,N-dimethylaminomethyl, N,N-dimethylaminoethyl and N,N-diethylaminoethyl.

According to an embodiment of the present invention, Y may be selected from

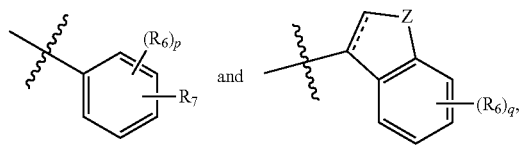

wherein $R_6$, $R_7$, Z, p and q are as defined above.

According to an embodiment of the present invention, Y may be selected from

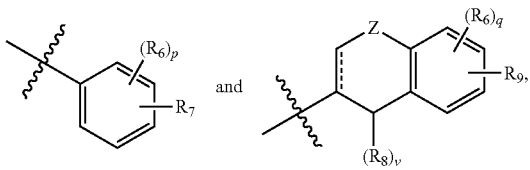

wherein $R_6$, $R_7$, $R_8$, $R_9$, Z, p, q and v are as defined above.

According to an embodiment of the present invention, $R_7$ and $R_9$ are each independently selected from 3-20 membered heterocyclyl and 5-20 membered heteroaryl unsubstituted or optionally substituted with one, two or more $R_{13}$.

According to an embodiment of the present invention, $R_7$ and $R_9$ are each independently selected from 3-20 membered heterocyclyl and 5-20 membered heteroaryl unsubstituted or optionally substituted with one, two or more $R_{13}$ and containing one, two or more N atoms, further preferably, 3-10 membered heterocyclyl containing only one or two N as heteroatoms.

According to an embodiment of the present invention, $R_7$ and $R_9$ may be selected from the following groups unsubstituted or optionally substituted with one, two or more $R_{13}$:

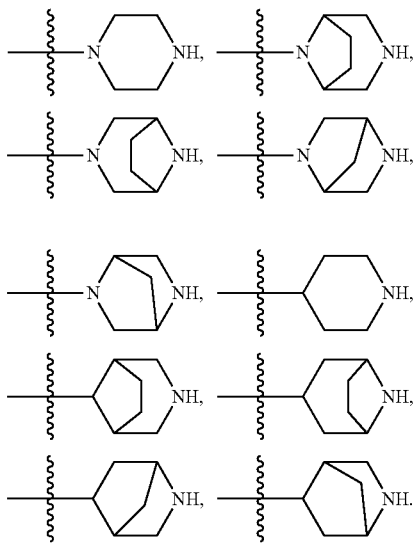

According to an embodiment of the present invention, $R_{13}$ may be substituted for the corresponding hydrogen atom on the C atom or on the N atom of the above groups; two $R_{13}$ may also be substituted for two hydrogen atoms on the same C atom.

According to an embodiment of the present invention, the structure of formula I is further selected from structures of formula II and formula III below:

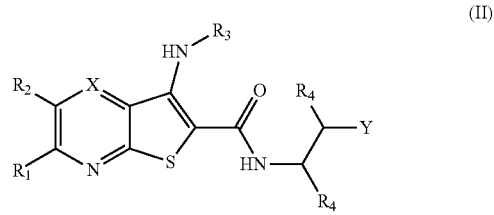

(II)

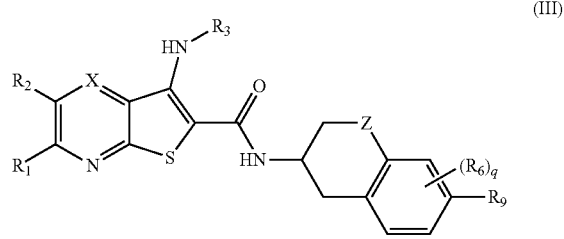

(III)

in formulas II and III, $R_1$, $R_2$, $R_3$, $R_4$, $R_6$, $R_9$, X, Y, Z and q are as defined in formula I.

According to an embodiment of the present invention, in formula II, Y is
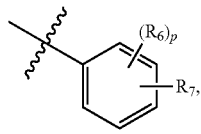
in which R₇ is preferably positioned at the para-position.
According to an embodiment of the present invention, the following compounds (I-1 to I-95) or tautomers, optical isomers, nitrogen oxides, solvates, pharmaceutically acceptable salts or prodrugs thereof are preferred:
I-1
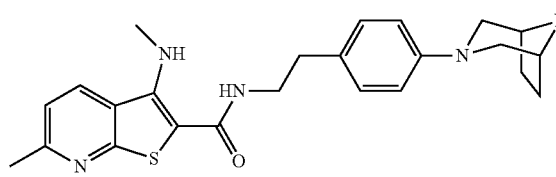
I-2
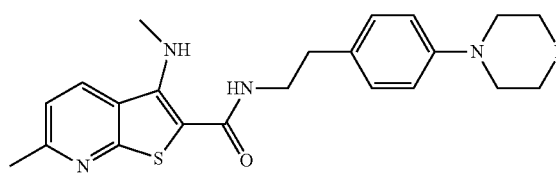
I-3
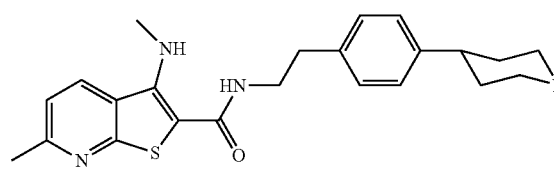
I-4
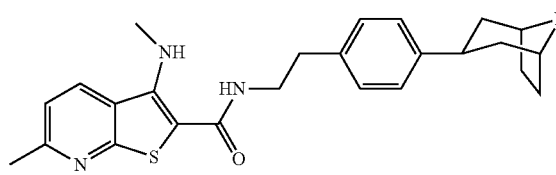
I-5
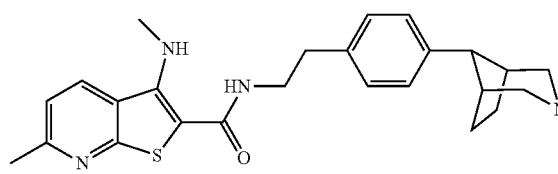
I-6
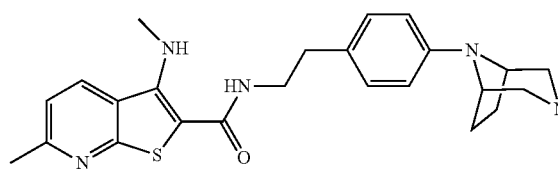
I-7
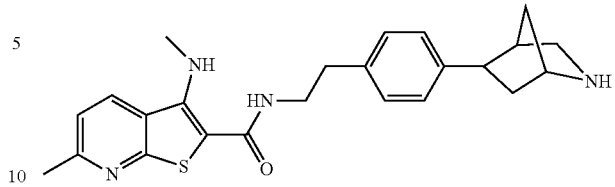
I-8
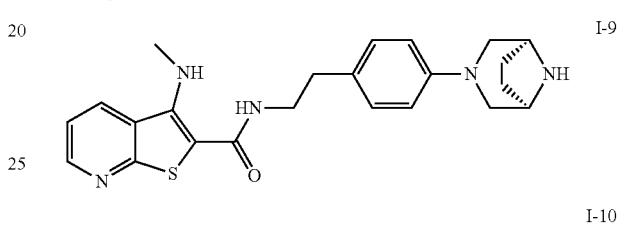
I-9
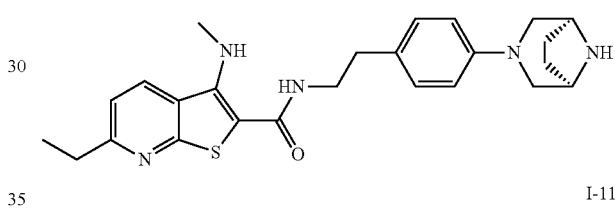
I-10
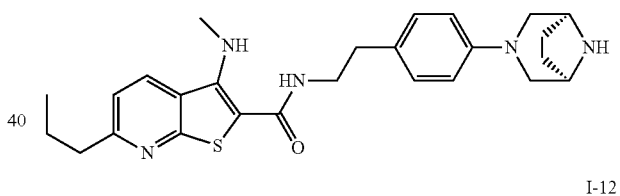
I-11
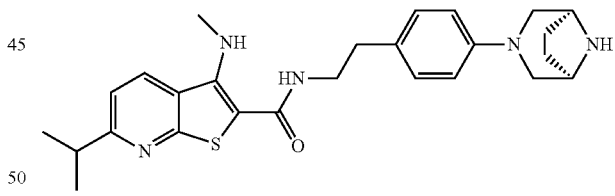
I-12
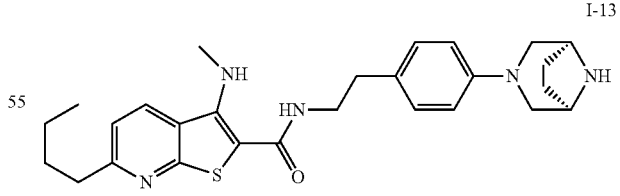
I-13
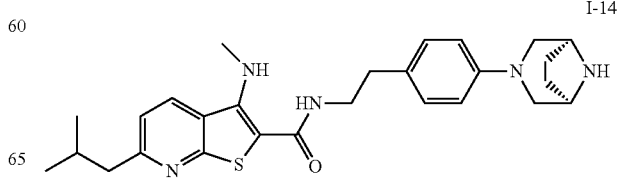
I-14

-continued
I-15
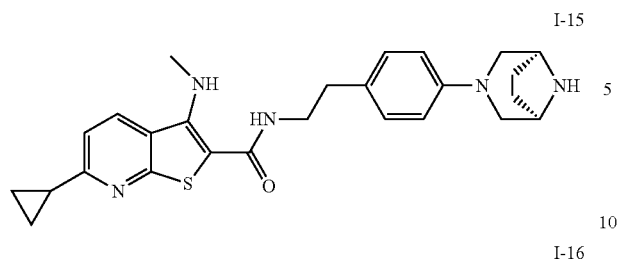
I-16
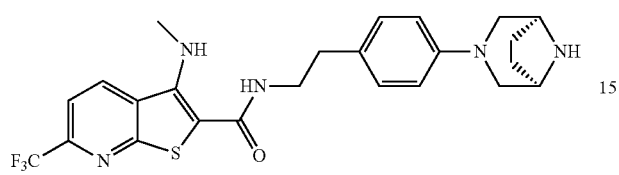
I-17
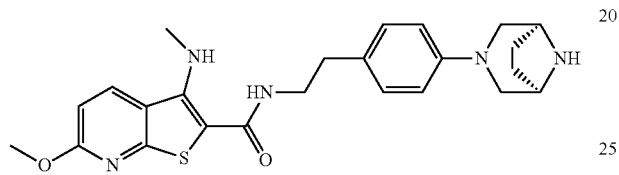
I-18
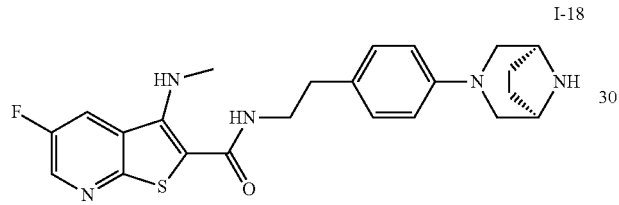
I-19
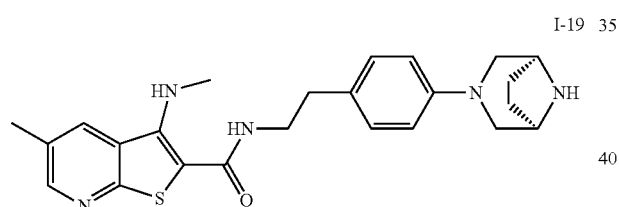
I-20
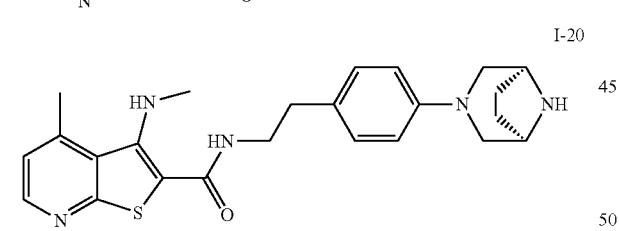
I-21
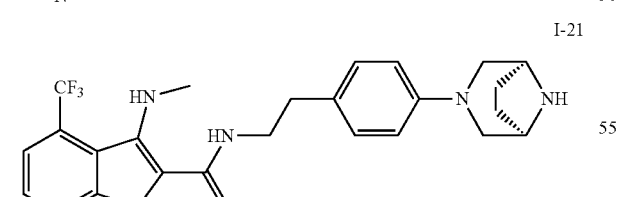
I-22
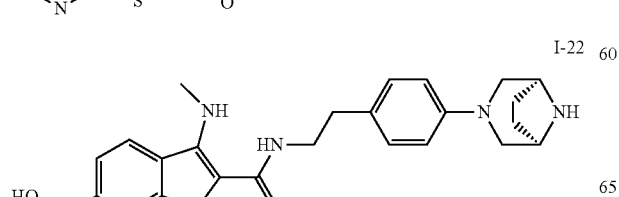
-continued
I-23
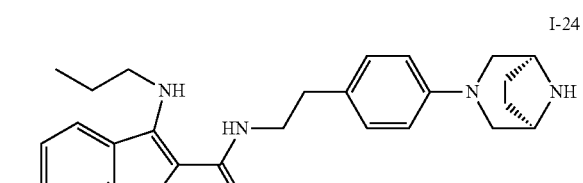
I-24
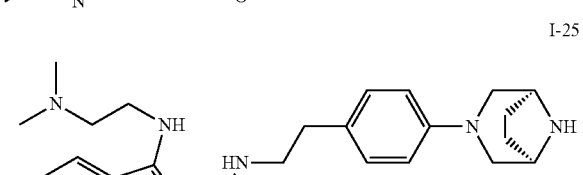
I-25
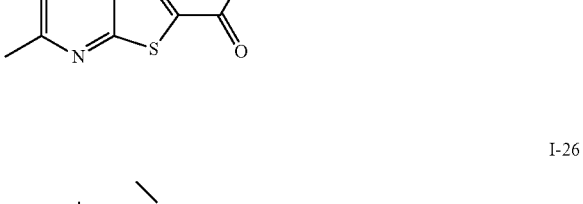
I-26
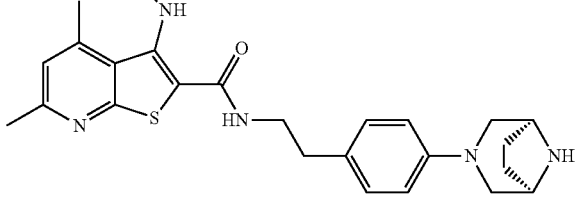
I-27
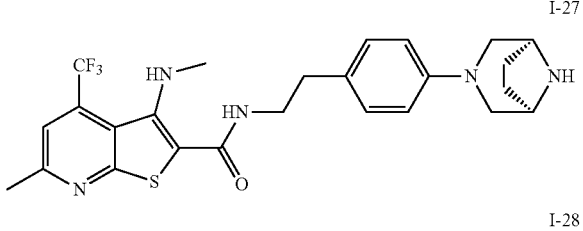
I-28
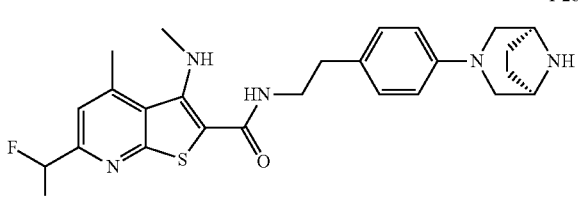
I-29
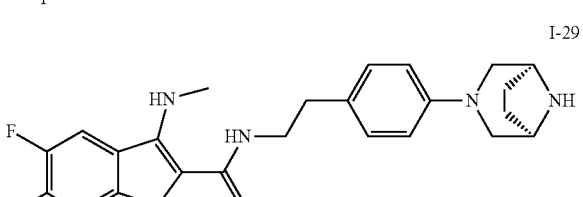

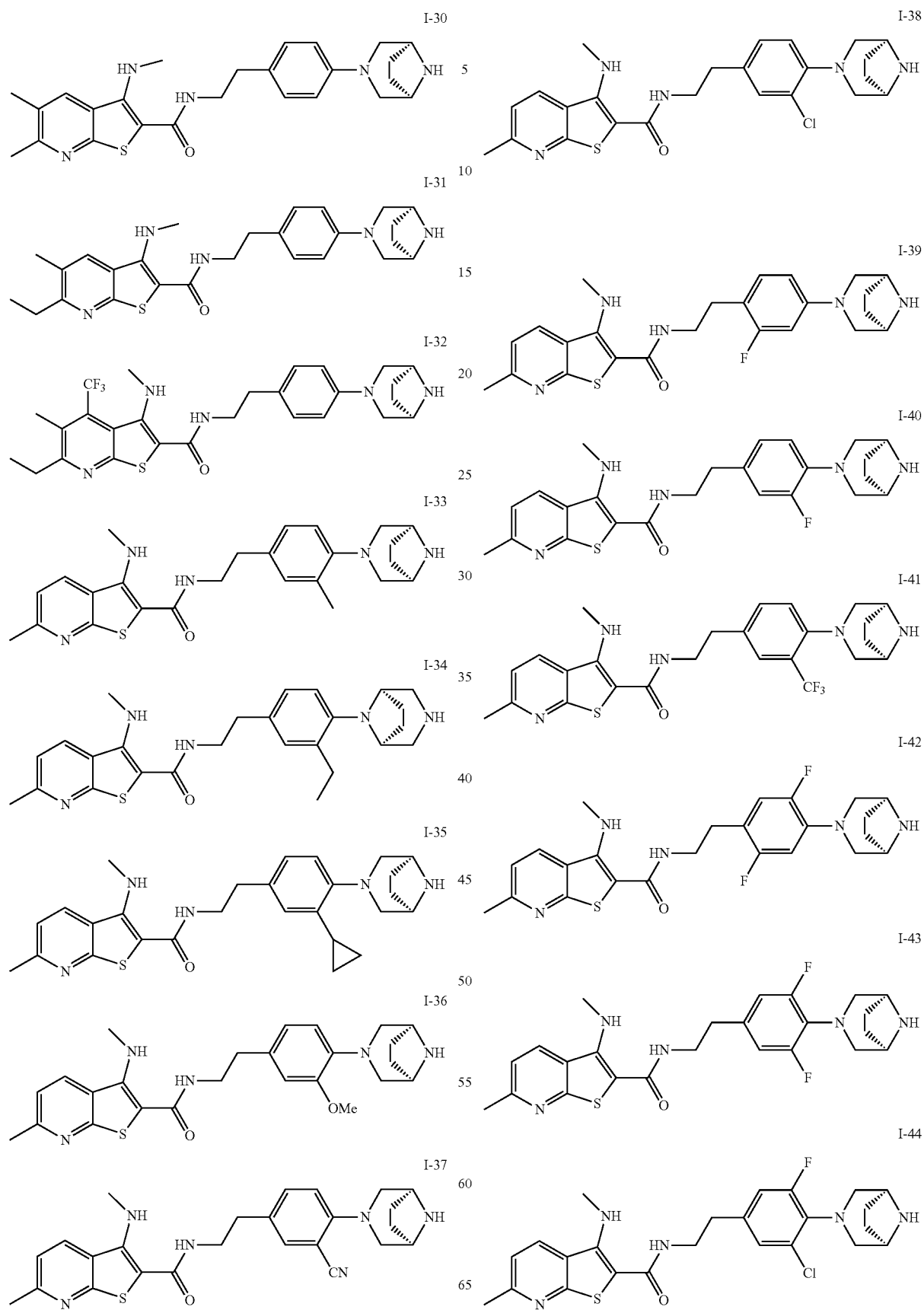

-continued
I-45
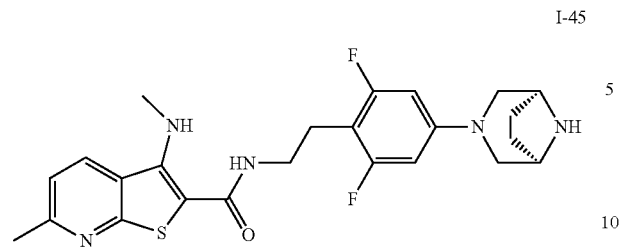
I-46
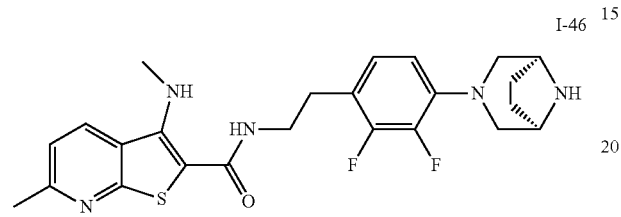
I-47
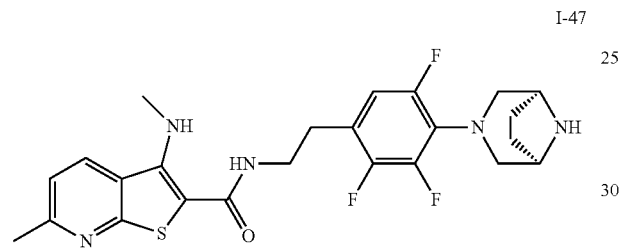
I-48
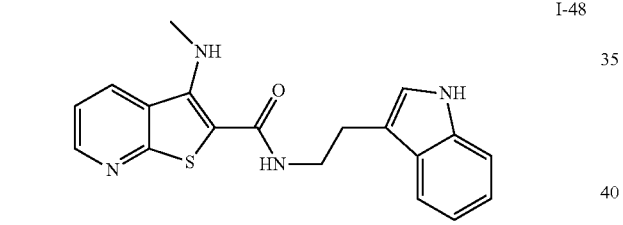
I-49
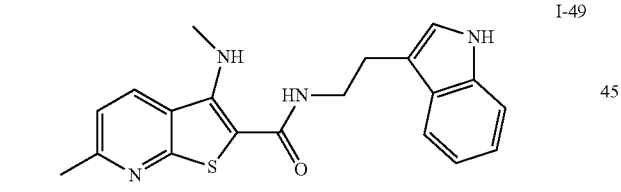
I-50
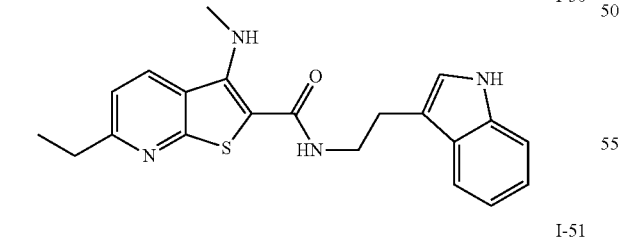
I-51
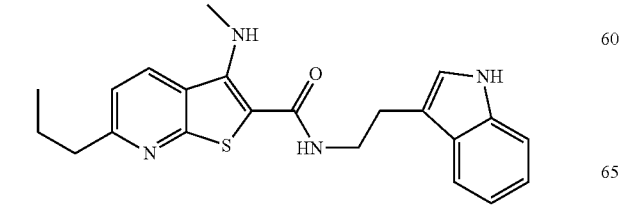
-continued
I-52
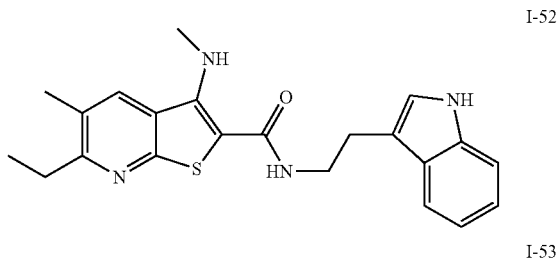
I-53
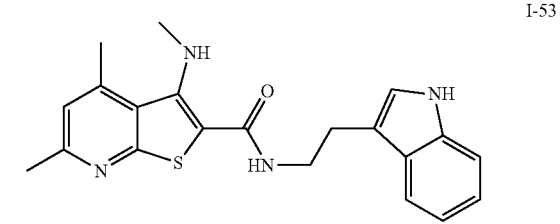
I-54
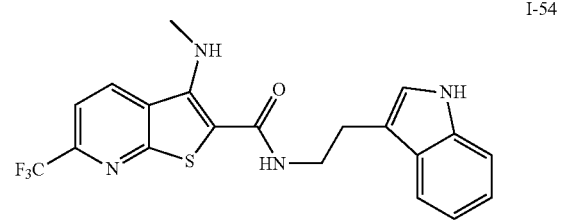
I-55
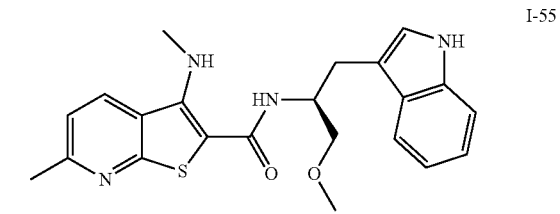
I-56
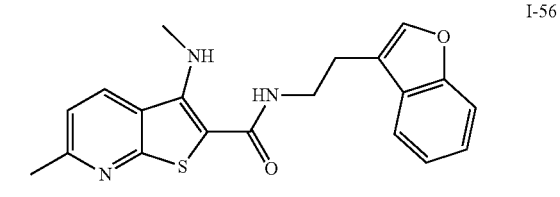
I-57
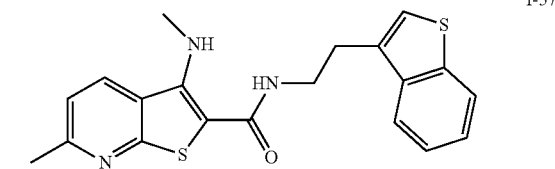
I-58
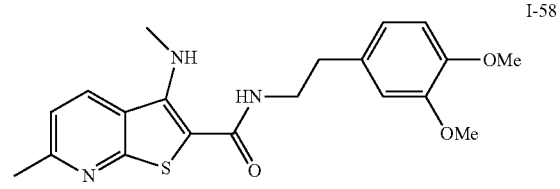
I-59
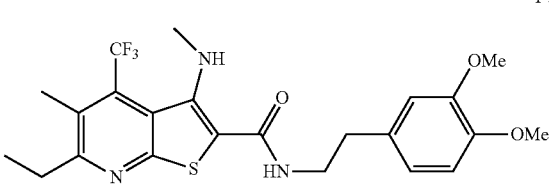

I-60
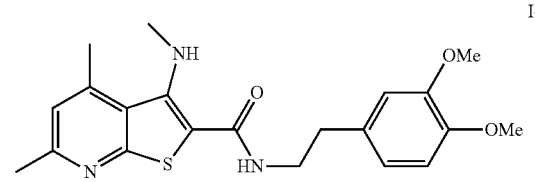
I-61
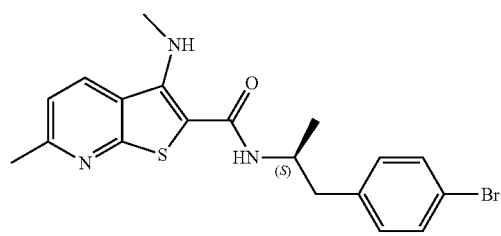
I-62
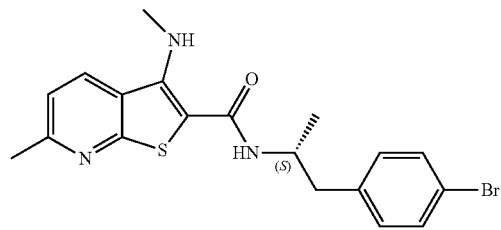
I-63
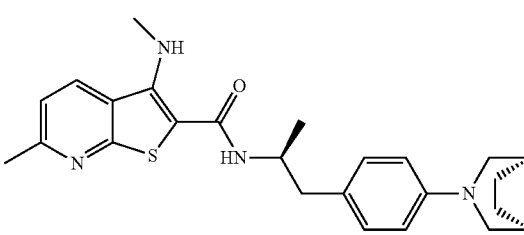
I-64
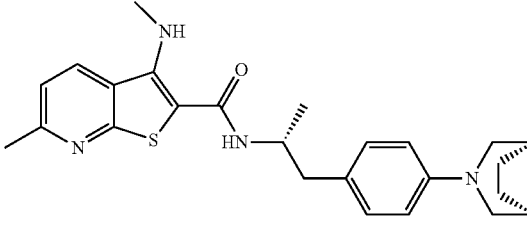
I-65
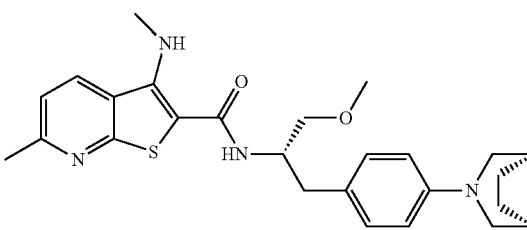
I-66
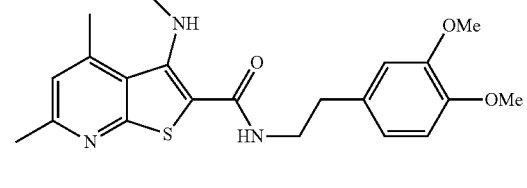
I-67
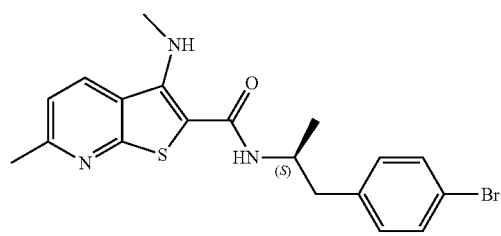
I-68
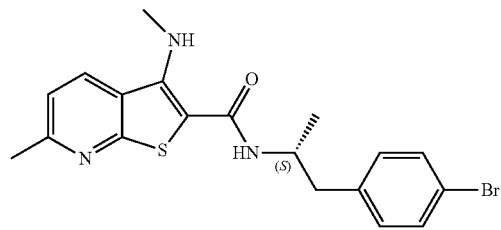
I-69
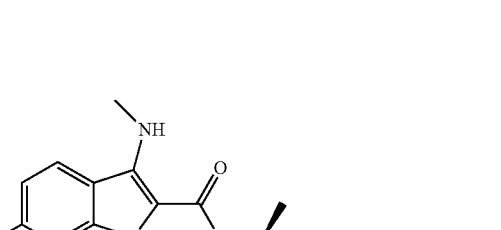
I-70
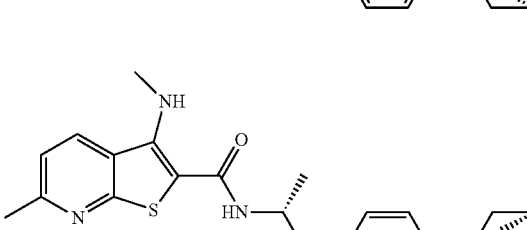
I-71
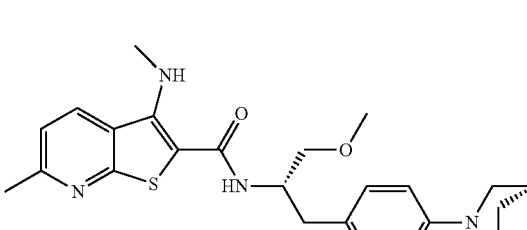
I-72

I-73
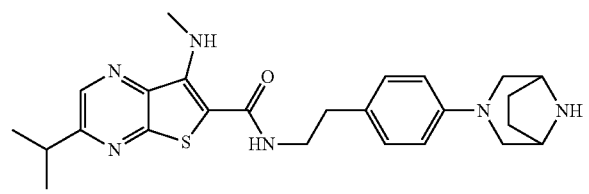 [SMILES: CNc1c(C(=O)NCCc2ccc(N3CC4CCC(C3)N4)cc2)sc2nc(C(C)C)cnc12]
I-74
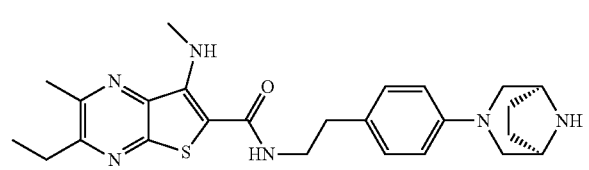
I-75
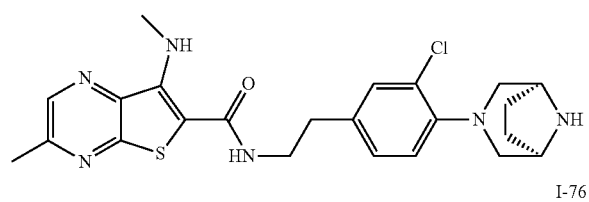
I-76
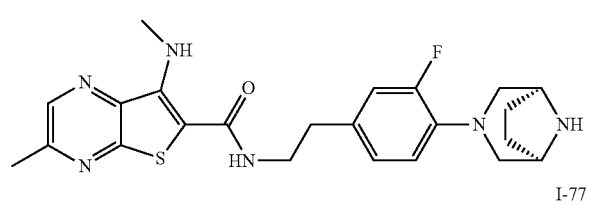
I-77
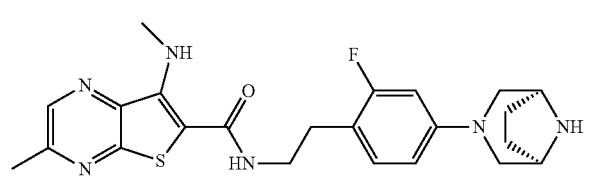 [SMILES: CNc1c(C(=O)NCCc2ccc(N3C[C@H]4CC[C@@H](C3)N4)cc2F)sc2nc(C)cnc12]
I-78
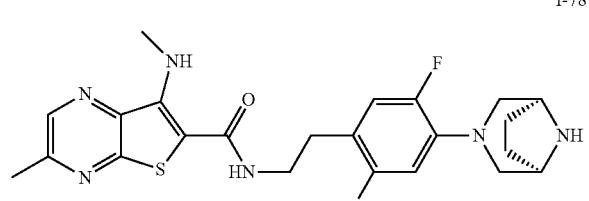
I-79
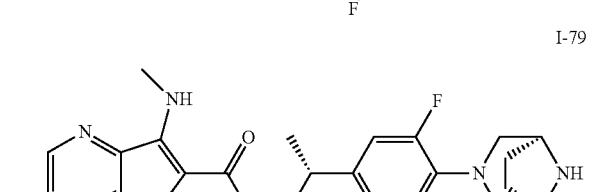
I-80
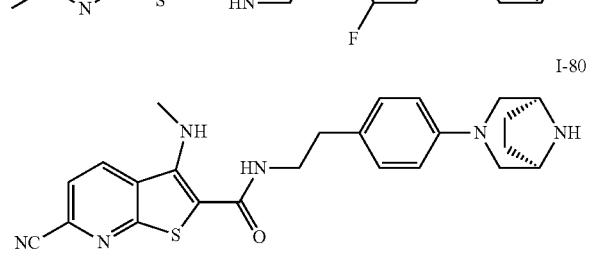
I-81
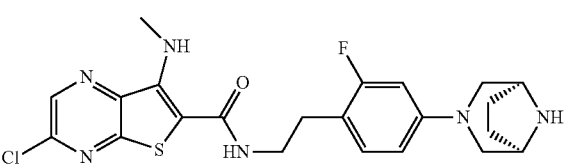 [SMILES: CNc1c(C(=O)NCCc2ccc(N3C[C@H]4CC[C@@H](C3)N4)cc2F)sc2nc(Cl)cnc12]
I-82
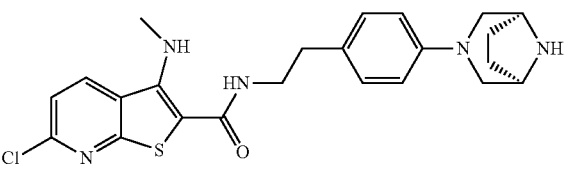 [SMILES: CNc1c(C(=O)NCCc2ccc(N3C[C@H]4CC[C@@H](C3)N4)cc2)sc2nc(Cl)ccc12]
I-83
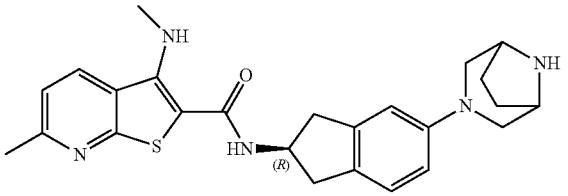
I-84
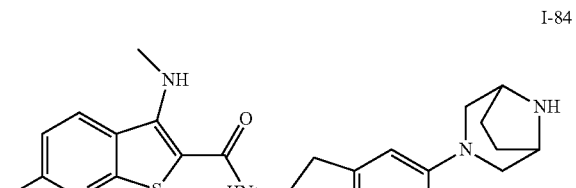
I-85
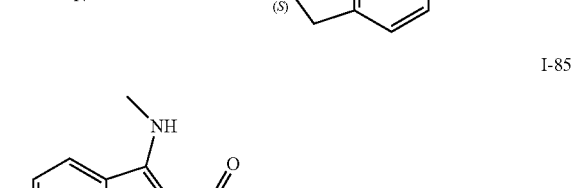
I-86
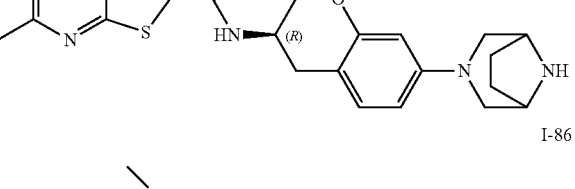
I-87
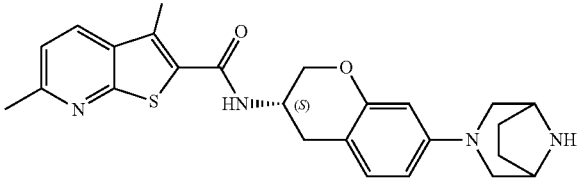
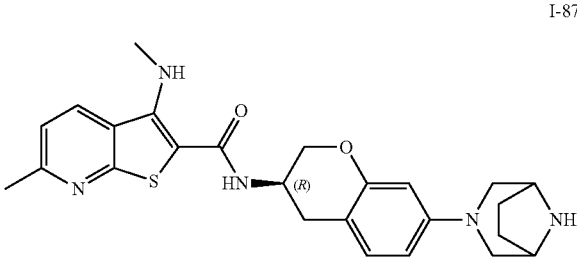

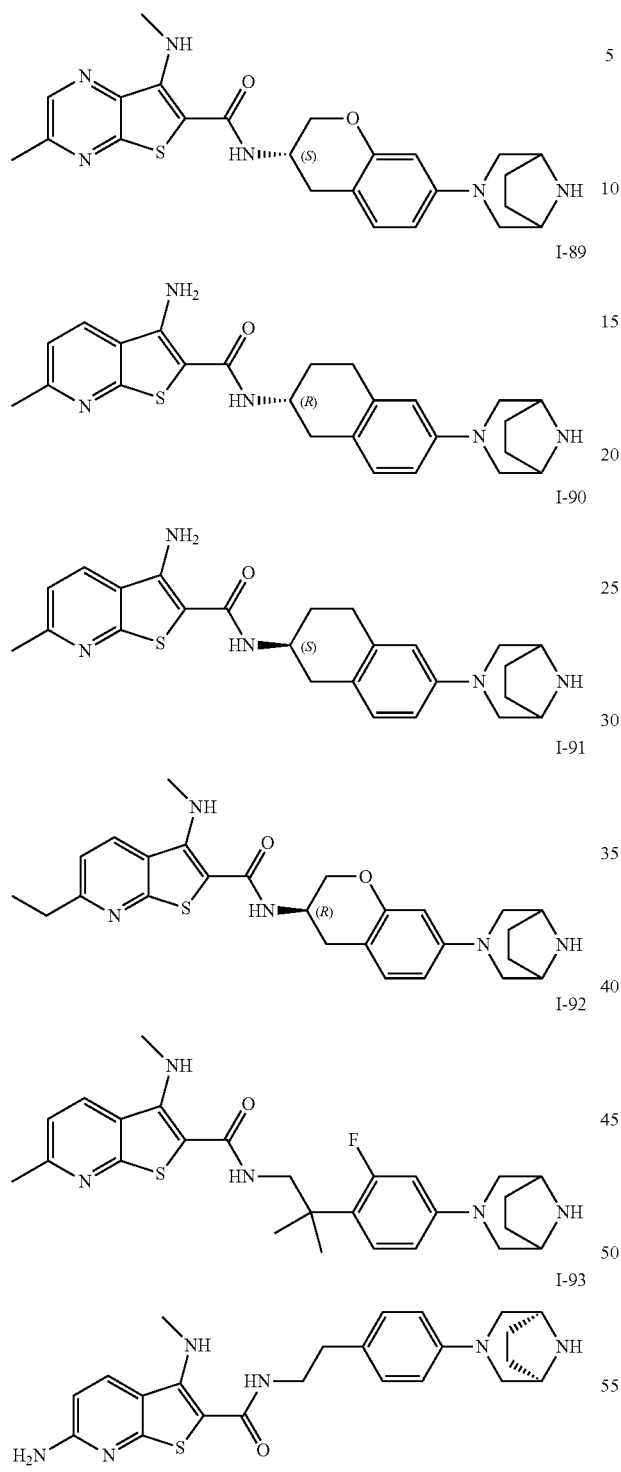

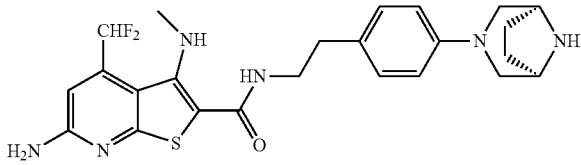

The present invention further provides a preparation method for the compound of formula I, which comprises:
reacting an intermediate carboxylic acid A and an intermediate amine B with a peptide coupling reagent under a basic condition to form an amide, and removing protecting groups to give a target compound I:

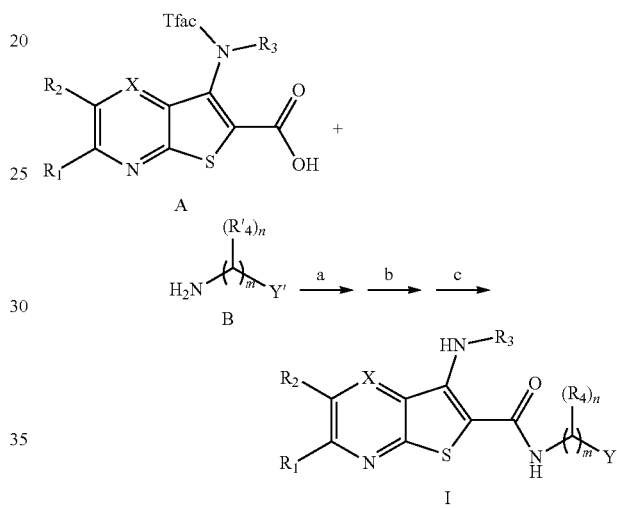

wherein $R_1$, $R_2$, $R_3$, X, m and n are as defined in formula I; $R'_4$ and $Y'$ are $R_4$ and Y of formula I, or $R_4$ and Y in which active groups such as hydroxyl, sulfydryl and amino are protected by protecting groups.

Reagents and reaction conditions are as follows:
a) amide coupling reaction: the coupling reagent is selected from EDCI-HOBt, BOP and HATU, and the base is selected from DEA, TEA, EDCI and DMAP; the solvent is selected from DCM and DMF;
b) Tfac removal reaction: the base is selected from $K_2CO_3$ and NaOMe, and the solvent is MeOH; and
c) Boc removal reaction: dilute hydrochloric acid-methanol.

According to an embodiment of the present invention, the above intermediate A can be prepared by the following step (the starting materials are commercially available):

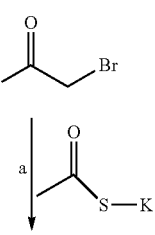

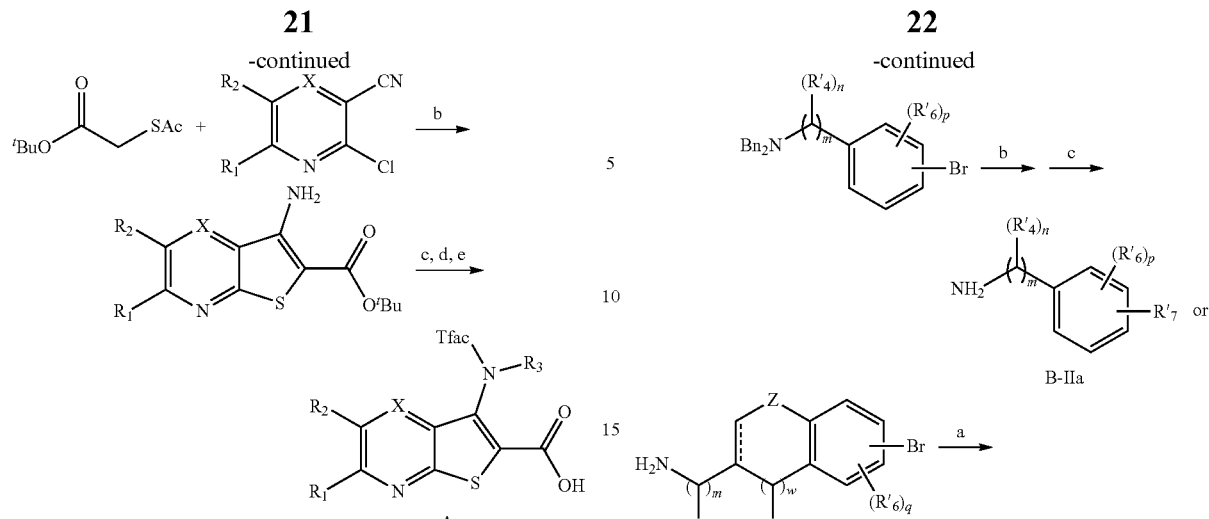

wherein $R_1$, $R_2$, $R_3$ and X are as defined in formula I.

Reagents and reaction conditions include: a) DMF; b) NaOMe/DMF; c) (Tfac)$_2$O/NaHCO$_3$/CHCl$_3$; d) NaH/DMF, $R_3$—I; and e) TFA/DCM.

According to an embodiment of the present invention, some intermediates B-I (e.g., B-Ia and B-Ib) may be obtained commercially or by classic synthetic methods:

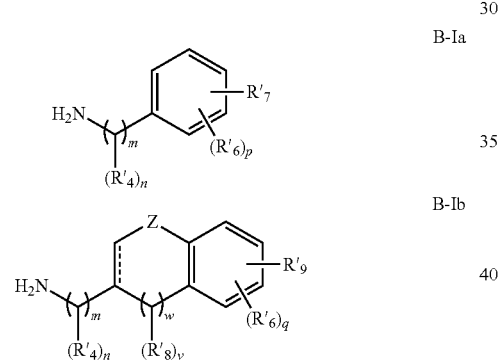

wherein Z, m, n, p, q, w and v are as defined in formula I; $R'_4$, $R'_6$ and R's are defined as $R_4$, $R_6$ and $R_8$ of formula I, or $R_4$, $R_6$ and $R_8$ in which active groups are protected by protecting groups; $R'7$ and $R'9$ are selected from hydrogen, halogen, hydroxyl, amino and an optionally unsubstituted or substituted ($C_1$-$C_{12}$) aliphatic hydrocarbyl, and the functional groups in which active groups are protected; with the proviso that each R'6 and R'7 are not both hydrogen atoms simultaneously.

According to an embodiment of the present invention, some intermediates B-II (e.g., B-IIa and B-IIb) can be prepared by the following step:

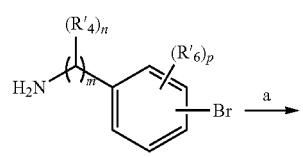

wherein Z, m, n, p, q, w and v are as defined in formula I; $R'_4$, $R'_6$ and R's are defined as $R_4$, $R_6$ and $R_8$ of formula I, or the functional groups in which active groups are protected by protecting groups; $R'_7$ and $R'_9$ are selected from 3-20 membered heterocyclyl and 5-20 membered heteroaryl unsubstituted or optionally substituted with one, two or more $R_{13}$, and the above functional groups in which active groups are protected by protecting groups; $R_{13}$ is as defined in formula I.

Reagents and reaction conditions include: a) BnCl, KI, K$_2$CO$_3$/MeCN; b) H—$R_7$-Boc, Pd(OAc)$_2$, X-phos, Cs (CO$_3$)$_2$, toluene; and c) HCO$_2$NH$_4$, Pd(OH)$_2$/C, MeOH.

According to an embodiment of the present invention, formula II and formula III covered by formula I can be synthesized by the above general preparation method, and the structures of the corresponding starting materials adopted for formulas II and III can be determined based on the structures of formula II and formula III.

The present invention further provides a pharmaceutical composition comprising a compound of formula (I), and a racemate, a stereoisomer, a tautomer, an isotopically labeled compound, a nitrogen oxide, a solvate, a polymorph, a metabolite, an ester, a pharmaceutically acceptable salt or a prodrug thereof as an active ingredient.

According to an embodiment of the present invention, the pharmaceutical composition further comprises a therapeutically effective amount of the compound of formula I or a tautomer, an optical isomer, a nitrogen oxide, a solvate, a pharmaceutically acceptable salt or a prodrug thereof and a pharmaceutically acceptable carrier.

The carrier in the pharmaceutical composition is "acceptable" in that it is compatible with (and preferably, capable of stabilizing) the active ingredient of the composition and is not deleterious to the subject being treated. One or more solubilizers may be used as pharmaceutical excipients for delivery of the active compound.

The present invention further provides use of the compound of formula (I), and the racemate, the stereoisomer, the tautomer, the isotopically labeled compound, the nitrogen oxide, the solvate, the polymorph, the metabolite, the ester, the pharmaceutically acceptable salt or the prodrug thereof or the pharmaceutical composition in preparing a drug for the treatment of a disease or disorder associated with the inhibition of USP28.

The present invention further provides use of the compound of formula (I), and the racemate, the stereoisomer, the tautomer, the isotopically labeled compound, the nitrogen oxide, the solvate, the polymorph, the metabolite, the ester, the pharmaceutically acceptable salt or the prodrug thereof or the pharmaceutical composition in preparing a drug for the treatment of a disease or disorder associated with the inhibition of USP25.

The present invention further provides use of the compound of formula (I), and the racemate, the stereoisomer, the tautomer, the isotopically labeled compound, the nitrogen oxide, the solvate, the polymorph, the metabolite, the ester, the pharmaceutically acceptable salt or the prodrug thereof or the pharmaceutical composition in preparing a drug for the treatment of a disease or disorder associated with the inhibition of USP25 and USP28.

The present invention further provides a method for treating or preventing a disease or disorder associated with the modulation of USP28 and/or USP25, which comprises administering to a patient suffering from at least one of the diseases or disorders a compound of formula (I), and a racemate, a stereoisomer, a tautomer, an isotopic labeled compound, a nitrogen oxide, a solvate, a polymorph, a metabolite, an ester, a pharmaceutically acceptable salt or a prodrug thereof.

According to an embodiment of the present invention, the diseases or disorders associated with USP25 and/or USP28 include cancer, inflammation, autoimmune diseases, viral and bacterial infections.

According to an embodiment of the present invention, the pharmaceutical composition may be in a form suitable for oral administration, such as tablet, troche, lozenge, aqueous or oily suspension, dispersible powder or granule, emulsion, hard or soft capsule, or syrup or elixir. Oral compositions can be prepared according to any method known in the art for preparing pharmaceutical compositions and may comprise one or more ingredients selected from a sweetener, a flavoring agent, a colorant and a preservative, so as to provide a pleasant-to-eye and palatable pharmaceutical formulation. Tablets contain active ingredients and non-toxic pharmaceutically acceptable excipients which are used for mixing and suitable for the preparation of tablets. These excipients may be inert excipients, granulating agents, disintegrating agents, binders and lubricants. These tablets may be uncoated or may be coated by known techniques for masking the taste of the drug or delaying the disintegration and absorption of the drug by the gastrointestinal tract and thus enabling sustained release of the drug over a longer period.

According to an embodiment of the present invention, the pharmaceutical composition provides an oral formulation in the form of a soft gelatin capsule in which the active ingredient is mixed with an inert solid diluent or in which the active ingredient is mixed with a water-soluble carrier or an oily vehicle. Aqueous suspensions contain active substances and excipients which are used for mixing and suitable for the preparation of aqueous suspensions. Such excipients are suspending agents, dispersing agents or wetting agents. These aqueous suspensions may also contain one or more preservatives, one or more colorants, one or more flavoring agents, and one or more sweeteners. Oily suspensions can be prepared by suspending the active ingredient in a vegetable oil, or in a mineral oil. These oil suspensions may contain thickening agents. The sweeteners and the flavoring agents described above may be added to provide a palatable formulation. These compositions can be well preserved by the addition of antioxidants; dispersible powders and granules suitable for the preparation of an aqueous suspension can provide an active ingredient, and a dispersing or wetting agent, and a suspending agent or one or more preservatives for mixing by the addition of water. Suitable dispersing agents or wetting agents and suspending agents may also be added to facilitate the preparation of the formulation as described in the above examples. Other excipients, such as sweeteners, flavoring agents and colorants, may also be added. These compositions are well preserved by the addition of antioxidants such as ascorbic acid.

According to an embodiment of the present invention, the pharmaceutical composition may also be in the form of an oil-in-water emulsion. The oil phase may be a vegetable oil or a mineral oil, or a mixture thereof. Suitable emulsifiers may be naturally occurring phospholipids, and the emulsions may also contain sweeteners, flavoring agents, preservatives and antioxidants. Such formulations may also contain palliatives, preservatives, colorants and antioxidants.

According to an embodiment of the present invention, the pharmaceutical composition may be in the form of a sterile injectable aqueous solution. Available and acceptable vehicles or solvents include water, Ringer's solution and isotonic sodium chloride solution. The sterile injectable formulation may be a sterile injectable oil-in-water microemulsion in which the active ingredient is dissolved in the oil phase. The injection or microemulsion can be locally injected into the bloodstream of a patient in large quantities. Alternatively, it may be desirable to administer solutions and microemulsions in such a way as to maintain a constant circulating concentration of the compound disclosed herein. To maintain such a constant concentration, a continuous intravenous delivery device may be used. An example of such a device is a Deltec CADD-PLUS.™. 5400 intravenous injection pump.

According to an embodiment of the present invention, the pharmaceutical composition may be in the form of a sterile injectable aqueous or oily suspension for intramuscular and subcutaneous administration. The suspension can be prepared according to the known art using those suitable dispersing agents or wetting agents and suspending agents mentioned above. The sterile injectable formulation may also be a sterile injection or suspension prepared in a parenterally acceptable non-toxic diluent or solvent. In addition, a sterile fixed oil may be conventionally used as a solvent or a suspending medium. For this purpose, any blend fixed oil may be employed. In addition, fatty acids can also be used to prepare injections.

According to an embodiment of the present invention, the compound disclosed herein may be administered in the form of a suppository for rectal administration. These pharmaceutical compositions can be prepared by mixing a drug with a suitable non-irritating excipient which is solid at ordinary temperatures but liquid in the rectum and therefore will melt in the rectum to release the drug.

As is well known to those skilled in the art, the dosage of the drug administered depends on a variety of factors, including but not limited to, the activity of the particular compound employed, the age of the patient, the weight of the patient, the health condition of the patient, the behavior of the patient, the diet of the patient, the time of administration, the mode of administration, the rate of excretion, the combination of drugs, and the like. In addition, the optimal treatment regimen, such as the mode of treatment, the daily amount of the compound of formula (I) or the type of pharmaceutically acceptable salts, can be verified according to conventional treatment regimens.

BENEFICIAL EFFECTS OF THE PRESENT INVENTION

The present invention provides a ubiquitin-specific protease inhibitor with a novel structure. Experiments prove that the compound disclosed herein has better inhibitory activity against USP28 and/or USP25 compared with an inhibitor in the prior art, with an increase of no less than 5 folds, such as no less than 10 folds, even no less than 15 folds.

Terminology

Unless otherwise specified, the definitions of groups and terms described in the specification and claims of the present application, including definitions thereof as examples, exemplary definitions, preferred definitions, definitions documented in tables, definitions of specific compounds in the examples, and the like, may be arbitrarily combined and incorporated with each other. The definitions of groups and the structures of the compounds in such combinations and incorporations should fall within the scope of the present specification.

When a numerical range defined by "integer" is recited in the specification and claims of this application, it shall be construed as reciting both endpoints of the range and every integer within the range. For example, "an integer of 0 to 6" shall be construed to include every integer of 0, 1, 2, 3, 4, 5 and 6. The term "more" refers to three or more.

The term "halogen" refers to F, Cl, Br and I. In other words, F, Cl, Br and I may be described as "halogen" in the specification.

The term "aliphatic hydrocarbyl" includes saturated or unsaturated, and linear or branched or cyclic hydrocarbyl groups. The aliphatic hydrocarbyl may be selected from alkyl, alkenyl, alkynyl, and the like, has preferably 1-12 or 1-10 carbon atoms, and more preferably 1-6 carbon atoms, and specifically may include but is not limited to the following groups: methyl, ethyl, n-propyl, isopropyl, n-butyl, isobutyl, tert-butyl, n-pentyl, isopentyl, neopentyl, n-hexyl, ethenyl, 1-propenyl, 2-propenyl, 1-methylethenyl, 1-butenyl, 1-ethylethenyl, 1-methyl-2-propenyl, 2-butenyl, 3-butenyl, 2-methyl-1-propenyl, 2-methyl-2-propenyl, 1-pentenyl, 1-hexenyl, ethynyl, 1-propynyl, 2-propynyl, 1-butynyl, 1-methyl-2-propynyl, 3-butynyl, 1-pentynyl, 1-hexynyl, cyclopropyl, cyclobutyl, cyclopentyl and cyclohexyl. The aliphatic hydrocarbyl may optionally comprise one or more other suitable substituents. Examples of such substituents may include hydroxyl, halogen, cyano, amino and other groups. For example, the aliphatic hydrocarbyl may contain one, two or more halogens, indicating that one, two or more hydrogen atoms of the aliphatic hydrocarbyl may be substituted with an equivalent number of halogens. If the hydrocarbyl contains more than one carbon atoms, then those carbons are not necessarily connected to each other. For example, at least two of the carbons may be connected via a suitable atom or group. That is, the aliphatic hydrocarbyl may optionally contain one, two or more heteroatoms (or may be construed as optional insertion of heteroatoms into the aliphatic hydrocarbyl group at any C—C bond or C—H bond). Suitable heteroatoms will be apparent to those skilled in the art and include, for example, sulfur, nitrogen, oxygen, phosphorus and silicon. The aliphatic hydrocarbyl containing heteroatoms may be selected from the following groups: a ($C_1$-$C_6$) aliphatic hydrocarbyloxy, a ($C_1$-$C_6$) aliphatic hydrocarbylthiol, a halogenated ($C_1$-$C_6$) aliphatic hydrocarbyl, a halogenated ($C_1$-$C_6$) aliphatic hydrocarbyloxy, a halogenated ($C_1$-$C_6$) aliphatic hydrocarbylthiol, a ($C_1$-$C_6$) aliphatic hydrocarbyloxy ($C_1$-$C_6$) aliphatic hydrocarbyl, a ($C_1$-$C_6$) aliphatic hydrocarbylthiol ($C_1$-$C_6$) aliphatic hydrocarbyl, an N—($C_1$-$C_3$) aliphatic hydrocarbylamino ($C_1$-$C_6$) aliphatic hydrocarbyl, and an N,N-di-($C_1$-$C_3$) aliphatic hydrocarbylamino ($C_1$-$C_6$) aliphatic hydrocarbyl, for example, methoxymethyl, ethoxymethyl, propoxymethyl, methoxyethyl, ethoxyethyl, propoxyethyl, methoxypropyl, ethoxypropyl, propoxypropyl, N-methylaminomethyl, N-methylaminoethyl, N-ethylaminoethyl, N,N-dimethylaminomethyl, N,N-dimethylaminoethyl, and N,N-diethylaminoethyl; the "aliphatic hydrocarbyl" moieties contained in the other groups are defined as above.

The term "3-20 membered heterocyclyl" refers to a saturated monovalent monocyclic or bicyclic hydrocarbon ring comprising 1-5 heteroatoms independently selected from N, O and S, and preferably is "3-10 membered heterocyclyl". The term "3-10 membered heterocyclyl" refers to a saturated monovalent monocyclic or bicyclic ring comprising 1-5, preferably 1-3, heteroatoms selected from N, O and S. The heterocyclyl may be connected to the rest of the molecule through any one of the carbon atoms or the nitrogen atom (if present). In particular, the heterocyclyl may include, but is not limited to: 4 membered rings such as azetidinyl or oxetanyl; 5 membered rings such as tetrahydrofuranyl, dioxolyl, pyrrolidinyl, imidazolidinyl, pyrazolidinyl or pyrrolinyl; 6 membered rings such as tetrahydropyranyl, piperidinyl, morpholinyl, dithianyl, thiomorpholinyl, piperazinyl or trithianyl; or 7 membered rings such as diazepanyl. Optionally, the heterocyclyl may be benzo-fused. The heterocyclyl may be bicyclic, such as but not limited to a 5,5 membered ring such as a hexahydrocyclopenta[c]pyrrol-2(1H)-yl ring, or a 5,6 membered bicyclic ring such as a hexahydropyrrolo[1,2-a]pyrazin-2(1H)-yl ring. The ring containing nitrogen atoms may be partially unsaturated, i.e., it may comprise one or more double bonds, such as but not limited to 2,5-dihydro-1H-pyrrolyl, 4H-[1,3,4]thiadiazinyl, 4,5-dihydrooxazolyl or 4H-[1,4]thiazinyl, or it may be benzo-fused, such as but not limited to dihydroisoquinolinyl. According to the present invention, the heterocyclyl is non-aromatic. The 3-20 membered heterocyclyl may be further selected from the following groups:

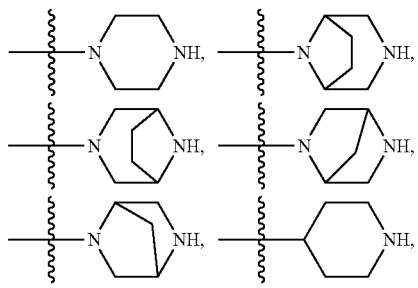

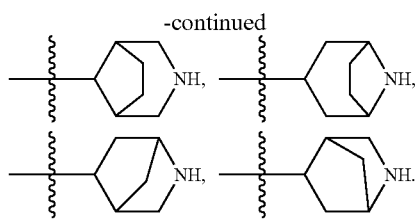

Unless otherwise specified, heterocyclyl or heteroaryl includes all possible isomeric forms thereof, e.g. positional isomers thereof. Accordingly, for some illustrative non-limiting examples, pyridinyl or pyridinylene includes pyridin-2-yl, pyridinylene-2-yl, pyridin-3-yl, pyridinylene-3-yl, pyridin-4-yl, and pyridinylene-4-yl; thienyl or thienylene includes thien-2-yl, thien-2-ylene, thien-3-yl, and thien-3-ylene.

In any method for preparing the compound disclosed herein, it may be necessary and/or desirable to protect sensitive or reactive groups on any molecule concerned. This can be achieved by conventional protecting groups, as described in textbooks or in reference books in the art. The protecting group may be removed at a convenient subsequent stage using methods known in the art. Those skilled in the art will recognize that, other reagents, including but not limited to Pd/C, Pd(OH)$_2$, PdCl$_2$, Pd(OAc)$_2$/Et$_3$SiH, Raney nickel, an appropriately selected acid, an appropriately selected base, fluoride, and the like, may be used in this deprotection step depending on the particular protecting group.

The target compound may be isolated according to known methods, for example by extraction, filtration, column chromatography, FCC or preparative HPLC.

According to the structure, the compounds disclosed herein may be chiral and may therefore exist in various enantiomeric forms. These compounds may therefore exist in racemic or optically active form. The compounds disclosed herein or intermediates thereof may be separated into enantiomers by chemical or physical methods well known to those skilled in the art, or used in this form for synthesis. In the case of racemic amines, diastereoisomers are prepared from mixtures by reaction with optically active resolving agents. Examples of suitable resolving agents are optically active acids such as R- or S-tartaric acid, diacetyltartaric acid, dibenzoyltartaric acid, mandelic acid, malic acid, lactic acid, suitable N-protected amino acids (e.g., N-benzoylproline or N-benzenesulfonylproline) or various optically active camphorsulfonic acids. Enantiomeric resolution by chromatography can be advantageously performed with the aid of optically active resolving agents, such as dinitrobenzoylphenylglycine, cellulose triacetate or other carbohydrate derivatives or chirally derivatized methacrylate polymers immobilized on silica gel. Suitable eluents for this purpose are mixtures of solvent containing water or alcohol, for example, hexane/isopropanol/acetonitrile.

Those skilled in the art will appreciate that not all nitrogen-containing heterocycles can form N-oxides, as nitrogen needs to have available lone pairs of electrons used for oxidation to oxides; those skilled in the art will identify nitrogen-containing heterocycles capable of forming N-oxides. Those skilled in the art will also recognize that tertiary amines are capable of forming N-oxides. Synthetic methods for preparing N-oxides of heterocycles and tertiary amines are well known to those skilled in the art and include oxidation by peroxy acids such as peroxyacetic acid and m-chloroperbenzoic acid (MCPBA), hydrogen peroxide, alkyl hydroperoxides such as tert-butyl hydroperoxide, sodium perborate, and dioxiranes such as dimethyldioxirane. These methods for preparing N-oxides have been widely described and reviewed in the literature.

A pharmaceutically acceptable salt may be, for example, acid addition salts of the compound disclosed herein having a nitrogen atom in the chain or ring with sufficient basicity, for example, acid addition salts formed with the following inorganic acids: hydrochloric acid, hydrofluoric acid, hydrobromic acid, hydroiodic acid, sulfuric acid, pyrosulfuric acid, phosphoric acid or nitric acid; hydrosulfates; or acid addition salts with the following organic acids: formic acid, acetic acid, acetoacetic acid, pyruvic acid, trifluoroacetic acid, propionic acid, butyric acid, hexanoic acid, heptanoic acid, undecanoic acid, lauric acid, benzoic acid, salicylic acid, 2-(4-hydroxybenzoyl)benzoic acid, camphoric acid, cinnamic acid, cyclopentanepropionic acid, digluconic acid, 3-hydroxy-2-naphthoic acid, nicotinic acid, pamoic acid, pectinic acid, peroxosulfuric acid, 3-phenylpropionic acid, picric acid, pivalic acid, 2-hydroxyethanesulfonic acid, itaconic acid, sulfamic acid, trifluoromethanesulfonic acid, dodecylsulfuric acid, ethanesulfonic acid, benzenesulfonic acid, p-toluenesulfonic acid, methanesulfonic acid, 2-naphthalenesulfonic acid, naphthalenedisulfonic acid, camphorsulfonic acid, citric acid, tartaric acid, stearic acid, lactic acid, oxalic acid, malonic acid, succinic acid, malic acid, adipic acid, alginic acid, maleic acid, fumaric acid, D-gluconic acid, mandelic acid, ascorbic acid, glucoheptoic acid, glycerophosphoric acid, aspartic acid, sulfosalicylic acid, hemisulfuric acid, or thiocyanic acid.

In addition, another suitable pharmaceutically acceptable salt of the compound disclosed herein having sufficient acidity is an alkali metal salt (e.g., sodium salt or potassium salt), an alkaline earth metal salt (e.g., calcium salt or magnesium salt), an ammonium salt, or a salt formed with an organic base which provides a physiologically acceptable cation, for example a salt formed with: a sodium ion, a potassium ion, N-methylglucamine, dimethylglucamine, ethylglucamine, lysine, dicyclohexylamine, 1,6-hexanediamine, ethanolamine, glucosamine, meglumine, sarcosine, serinol, trihydroxymethylaminomethane, aminopropanediol, or 1-amino-2,3,4-butanetriol. As an example, the pharmaceutically acceptable salts include salts formed by the group —COOH with: a sodium ion, a potassium ion, a calcium ion, a magnesium ion, N-methylglucamine, dimethylglucamine, ethylglucamine, lysine, dicyclohexylamine, 1,6-hexanediamine, ethanolamine, glucosamine, meglumine, sarcosine, serinol, trishydroxymethylaminomethane, aminopropanediol, or 1-amino-2,3,4-butanetriol.

In addition, the basic nitrogen-containing groups may be quaternized with the following agents: lower alkyl halides such as methyl, ethyl, propyl and butyl chlorides, bromides and iodides; dialkyl sulfates such as dimethyl sulfate, diethyl sulfate, dibutyl sulfate, and dipentyl sulfate; long chain halides such as decyl, lauryl, myristyl and stearyl chlorides, bromides and iodides; and aralkyl halides such as benzyl and phenethyl bromides. As an example, pharmaceutically acceptable salts include hydrochloride, sulfate, nitrate, bisulfate, hydrobromide, acetate, oxalate, citrate, mesylate, formate, meglumine, and the like.

Since the compound disclosed herein may have a plurality of salt-forming sites, the "pharmaceutically acceptable salt" includes not only a salt formed at 1 salt-forming site of the compound disclosed herein but also salts formed at 2, 3 or all of the salt-forming sites thereof. For this purpose, the molar ratio of the compound of formula (I) to a radical ion (anion) of an acid or a cation of a base required for salt formation may vary within a wide range, and may be, for example, 4:1 to 1:4, such as 3:1, 2:1, 1:1, 1:2, and 1:3.

According to the present invention, the pharmaceutically acceptable anions include anions selected from those generated by the ionization of inorganic or organic acids. The "inorganic acid" includes, but is not limited to, hydrochloric acid, hydrofluoric acid, hydrobromic acid, hydroiodic acid, sulfuric acid, pyrosulfuric acid, phosphoric acid, or nitric acid. The "organic acid" includes, but is not limited to, formic acid, acetic acid, acetoacetic acid, pyruvic acid, trifluoroacetic acid, propionic acid, butyric acid, hexanoic acid, heptanoic acid, undecanoic acid, lauric acid, benzoic acid, salicylic acid, 2-(4-hydroxybenzoyl)benzoic acid, camphoric acid, cinnamic acid, cyclopentanepropionic acid, digluconic acid, 3-hydroxy-2-naphthoic acid, nicotinic acid, pamoic acid, pectinic acid, peroxosulfuric acid, 3-phenylpropionic acid, picric acid, pivalic acid, 2-hydroxyethanesulfonic acid, itaconic acid, sulfamic acid, trifluoromethanesulfonic acid, dodecylsulfuric acid, ethanesulfonic acid, benzenesulfonic acid, p-toluenesulfonic acid, methanesulfonic acid, 2-naphthalenesulfonic acid, naphthalenedisulfonic acid, camphorsulfonic acid, citric acid, tartaric acid, stearic acid, lactic acid, oxalic acid, malonic acid, succinic acid, malic acid, adipic acid, alginic acid, maleic acid, fumaric acid, D-gluconic acid, mandelic acid, ascorbic acid, glucoheptoic acid, glycerophosphoric acid, aspartic acid, sulfosalicylic acid, hemisulfuric acid, or thiocyanic acid.

According to the position and nature of the various substituents, the compound disclosed herein may also comprise one or more asymmetric centers. Asymmetric carbon atoms may exist in either the (R) or (5) configuration. When there is only one asymmetric center, a racemic mixture is generated, and when there are multiple asymmetric centers, a diastereoisomeric mixture is generated. In some cases, asymmetry may also exist due to hindered rotation about a particular bond, for example, the two substituted aromatic rings of a particular compound connected by the central bond may be asymmetric. Furthermore, the substituents may exist in cis- or trans-isomeric forms.

The compound disclosed herein also include all possible stereoisomers thereof, either in the form of a single stereoisomer or in the form of any mixture of the stereoisomers (e.g., R- or S-isomers, or E- or Z-isomers) in any proportion. Single stereoisomers (e.g., single enantiomers or single diastereoisomers) of the compound disclosed herein may be separated by any suitable method in the prior art (e.g., chromatography, particularly, e.g., chiral chromatography).

The term "tautomer" refers to functional isomers resulting from the rapid movement of an atom in a molecule between two positions. The compound disclosed herein may exhibit the tautomerism. Tautomeric compounds may exist in two or more interconvertible forms. Prototropic tautomers result from the migration of a covalently bonded hydrogen atom between two atoms. Tautomers generally exist in an equilibrium form. Trying to separate a single tautomer usually lead to a mixture, the physicochemical properties of which are consistent with the mixture of the compound. The position of the equilibrium depends on the chemical properties of the molecule. For example, in many aliphatic aldehydes and ketones such as acetaldehyde, the keto form predominates; whereas in phenol, the enol form predominates. The present invention comprises all tautomeric forms of the compound.

In the present invention, the compounds involved also include isotopically labeled compounds, which are identical to the compound of formula I, but have one or more atoms substituted with atoms with the atomic mass or mass number different from the atomic mass or mass number of those usually found in nature. Examples of isotopes that can be incorporated into the compound disclosed herein include isotopes of H, C, N, O, S, F and Cl, such as $^{2}H$, $^{3}H$, $^{13}C$, $^{11}C$, $^{14}C$, $^{15}N$, $^{18}O$, $^{17}O$, $^{32}P$, $^{35}S$, $^{18}F$, and $^{36}Cl$. The compound, the prodrug thereof, or the pharmaceutically acceptable salts thereof comprising the above isotopes and/or other isotopes of other atoms are within the scope of the present invention. Certain isotopically labeled compounds disclosed herein, e.g., those into which radioactive isotopes such as $^{3}H$ and $^{14}C$ are incorporated, are useful in drug and/or substrate tissue distribution assays. Tritium (i.e., $^{3}H$) and carbon $^{14}$ (i.e., $^{14}C$) isotopes are particularly preferred for their ease of preparation and detectability. Furthermore, substitution with heavier isotopes such as deuterium (i.e., $^{2}H$) may provide certain therapeutic advantages resulting from greater metabolic stability (e.g., increased in vivo half-life or reduced dosage requirement) and hence may be preferred in some cases. The compound disclosed herein as claimed may be particularly limited to substitution with deuterium or tritium. Furthermore, the lack of separate specification of a hydrogen in a substituent as the term deuterium or tritium does not mean that the deuterium or tritium is excluded, on the contrary, the deuterium or tritium can also be included.

The term "effective amount" or "therapeutically effective amount" refers to an amount of the compound disclosed herein sufficient to effect the intended use, including but not limited to the treatment of a disease as defined below. The therapeutically effective amount may vary depending on the following factors: the intended use (in vitro or in vivo), or the subject and diseases or conditions being treated, such as weight and age of the subject, severity of the diseases or conditions and mode of administration, etc., which can be readily determined by one of ordinary skill in the art. The specific dosage will vary depending on the following factors: the particular compound selected, the dosage regimen to be followed, whether to administer in combination with other compounds, the schedule of administration, the tissue to be administered and the physical delivery system carried.

The term "excipient" refers to a pharmaceutically acceptable inert ingredient. Examples of types of excipients include, without limitation, binders, disintegrants, lubricants, glidants, stabilizers, fillers, diluents, and the like. Excipients are capable of enhancing the handling characteristics of the pharmaceutical formulation, i.e., making the formulation more amenable to direct compression by increasing flowability and/or adhesiveness. Examples of typical pharmaceutically acceptable carriers suitable for use in the above formulations include: saccharides such as lactose, sucrose, mannitol, and sorbitol; starches, such as corn starch, tapioca starch and potato starch; cellulose and its derivatives, such as sodium carboxymethylcellulose, ethyl cellulose and methyl cellulose; calcium phosphates such as dicalcium phosphate and tricalcium phosphate; sodium sulfate; calcium sulfate; polyvinylpyrrolidone; polyvinyl alcohol; stearic acid; alkaline earth metal stearate, such as magnesium stearate and calcium stearate; vegetable oils such as peanut oil, cottonseed oil, sesame oil, olive oil and corn oil; nonionic, cationic and anionic surfactants; a glycol polymer; fatty alcohols; and grain hydrolysis solids and other nontoxic compatible excipients commonly available in pharmaceutical formulations, such as fillers, binders, disintegrants, buffers, preservatives, antioxidants, lubricants, colorants, and the like.

The term "solvate" refers to forms of the compound disclosed herein in which a complex is formed by coordination of the compound in the solid or liquid state with solvent molecules. Hydrate is a particular form of the solvate in which the coordination occurs with water. In the present invention, the preferred solvate is a hydrate. Further, pharmaceutically acceptable solvates (hydrates) of the compound of formula I disclosed herein refer to co-crystals and clathrates formed of the compound of formula I and one or more molecules of water or other solvents in stoichiometric amounts. Available solvents for solvates include, but are not limited to water, methanol, ethanol, ethylene glycol and acetic acid.

The term "prodrug", also known as "drug precursor", refers to a compound that is converted in vivo to the compound of the above general formula or of a particular compound. Such conversion is affected by hydrolysis of the prodrug in the blood or by enzymatic conversion of the prodrug into the parent structure in the blood or tissue. The prodrug disclosed herein may be esters, and in the present invention, the esters that may be used as prodrugs include phenyl esters, aliphatic ($C_{1-24}$) esters, acyloxymethyl esters, carbonates, carbamates and amino acid esters. For example, a compound disclosed herein containing hydroxyl or carboxyl can be acylated to give a prodrug. Other prodrugs include phosphate esters, and those phosphate esters are obtained by phosphorylating via the hydroxyl on the parent structure.

The "cancer" described herein includes, but is not limited to, bladder cancer, breast cancer (e.g., ductal carcinoma), cervical cancer (e.g., squamous cell carcinoma), colorectal cancer (e.g., adenocarcinoma), esophageal cancer (e.g., squamous cell carcinoma), gastric cancer (e.g., adenocarcinoma, medulloblastoma, colon cancer, choriocarcinoma, squamous cell carcinoma), head and neck cancer, hematologic cancer (e.g., acute lymphocytic anemia, acute myelogenous leukemia, acute lymphocytic leukemia B-cell, anaplastic large cell lymphoma, B-cell lymphoma, Burkitt lymphoma, chronic lymphocytic leukemia, chronic eosinophilic leukemia/hypereosinophilic syndrome, chronic myelogenous leukemia, Hodgkin's lymphoma, mantle cell lymphoma, multiple myeloma, T-cell acute lymphocytic leukemia), lung cancer (e.g., bronchoalveolar carcinoma, mesothelioma, mucoepidermoid carcinoma, small cell lung cancer, non-small cell lung cancer, adenocarcinoma, squamous cell carcinoma), liver cancer (e.g., hepatocellular carcinoma), lymphoma, nervous system cancer (e.g., glioblastoma, neuroblastoma, glioma), ovarian cancer (e.g., adenocarcinoma), pancreatic cancer (e.g., ductal carcinoma), prostate cancer (e.g., adenocarcinoma), kidney cancer (e.g., renal cell carcinoma, renal clear cell carcinoma), sarcoma (e.g., chondrosarcoma, ewing's sarcoma, fibrosarcoma, multisource sarcoma, osteosarcoma, rhabdomyosarcoma, synovial sarcoma), skin cancer (e.g., melanoma, epidermoid carcinoma, squamous cell carcinoma), thyroid cancer (e.g., medullary carcinoma), uterine cancer, and the like.

The "autoimmune disease" or "autoimmune disorder" described herein refers to a condition that is immune-mediated by attack on self-tissues, but may also involve an immune response to a microorganism. Examples of autoimmune diseases include, but are not limited to: multiple sclerosis, psoriasis, inflammatory bowel disease, ulcerative colitis, Crohn's disease, rheumatoid arthritis, multiple arthritis, local and systemic scleroderma, systemic lupus erythematosus, discoid lupus erythematosus, cutaneous lupus erythematosus (including chilblain lupus erythematosus, lupus nephritis, discoid lupus erythematosus, subacute cutaneous lupus erythematosus), dermatomyositis, polymyositis, idiopathic edema, chronic thyroiditis, Guillain-Barre syndrome, Grave's disease, myasthenia gravis, Sjogren's syndrome, nodular panarteritis, autoimmune enteropathy, uveitis, autoimmune oophoritis, chronic immune thrombocytopenic purpura, colitis, diabetes, psoriasis, pemphigus vulgaris, proliferative glomerulonephritis, Wiscott-Aldrich syndrome, autoimmune lymphoproliferative disorders, chronic arthritis, inflammatory chronic sinusitis, colitis, celiac disease, inflammatory bowel disease, Barlow's esophageal cancer, inflammatory gastritis, autoimmune nephritis, autoimmune vasculitis, autoimmune hepatitis, autoimmune cardioinflammation, autoimmune encephalitis, autoimmune-mediated hematologic disease, and the like.

DETAILED DESCRIPTION

The present invention will be further illustrated with reference to the following specific examples. The present invention includes, but is not limited to, the following examples.

Unless otherwise specified, the experimental procedures in the examples described below are all conventional procedures; the $^1$H NMR spectrum and the mass spectrum of the obtained compound are measured by a Varian Mercury-plus 400 nuclear magnetic resonance instrument and a Waters Q-TOF-Ultima mass spectrometer; unless otherwise specified, the reagents and biomaterials are commercially available.

Explanation of the abbreviations used in the following examples and elsewhere herein is as follows:

| Abbreviations | English |
| --- | --- |
| Ac | Acetyl |
| BME | 2-Mercaptoethanonl |
| BnCl | Benzyl chloride |
| Boc | t-Butyloxy carbonyl |
| BOP | ((1H-Benzo[d][1,2,3]triazol-1-yl)oxy)tris(dimethylamino)phosphonium Hexafluorophosphate(V) |
| br | broad |
| CD$_3$OD | Deuterated methanol |
| CDCl$_3$ | Deuterated chlorofrom |
| CHCl$_3$ | Chlorofrom |
| Cs(CO$_3$)$_2$ | Caesium carbonate |
| d | doublet |
| DCM | Dichloromethane |
| DEA | Diethylamine |
| DIEA | N,N-Diisopropylethylamine |
| DMF | N,N-Dimethylformamide |
| DMAP | 4-Dimethylaminopyridine |
| DME | L,2-Dimethoxyethane |
| DMF | N,N-Dimethylformamide |
| DMSO | Dimethyl sulfoxide |
| dppf | 1,1'-bisfdiphenylphosphino)ferrocene |
| $^t$Bu | Tertiary-butyl |
| EA | Ethyl acetate |
| EDCI | N-(3-Dimethylaminopropyl)-N'-ethylcarbodiimide hydrochloride |
| ESI | Electrospray Ionization |
| Et$_3$SiH | Triethylsilane |
| FCC | Flash Column Chromatography |
| h | hour |
| HATU | [bis(dimethylamino)methylene]-1H-1,2,3-triazolo[4,5-b]pyridinium 3-oxide hexafluorophosphate |
| HCO$_2$NH$_4$ | Ammonium formate |
| HMPA | Hexamethylphosphoramide |
| HOBt | Benzotriazol-1-ol |
| HPLC | High Performance Liquid Chromatography |
| IC$_{50}$ | Concentration of inhibitory 50% (enzyme) |
| Integ. | Integration |
| J | Coupling constant |
| K$_2$CO$_3$ | Potassium carbonate |
| KI | Potassium iodide |

| Abbreviations | English |
|---|---|
| LC-MS | Liquid Chromatography-Mass Spectrometry |
| m | multiplet |
| MeCN | Acetonitrile |
| MeI | Iodomethane |
| MeOH | Methanol |
| MHz | Megahertz |
| min | minute |
| mult. | multiplicity |
| NaH | Sodium hydride |
| $NaHCO_3$ | Sodium hydrogencarbonate |
| NaCl | Sodium chloride |
| NaOMe | Sodium methoxide |
| $Na_2SO_4$ | Sodium sulphate (anhyfrous) |
| NMR | Nuclear Magnetic Resonance |
| Pd/C | Palladium on Carbon |
| $PdCl_2$ | Palladium chloride |
| $Pd(OH)_2$ | Palladium hydroxide |
| $Pd(OAc)_2$ | Palladium (II) acetate |
| PE | Petroleum Ether |
| Prionex | protein stabilizer |
| q | quartet |
| Raney Ni | Raney Nickel |
| r.t. | room temperature |

| Abbreviations | English |
|---|---|
| s | singlet |
| $SOCl_2$ | Thionyl chloride |
| t | triplet |
| toluene | Toluene |
| TEA | Triethylamine |
| TFA | Trifluoroacetic Acid |
| Tfac | Trifluoroacetyl |
| $(Tfac)_2O$ | Trifluoroacetic anhydride |
| THF | Tetrahydrofuran |
| TosMIC | 1-(Isocyanomethylsulfonyl)-4-methylbenzene |
| Triton X-100 | polyoxyethylene octyl phenyl ether |
| X-phos | 4,5-Bis(diphenylphosphino)-9,9-dimethylxanthene |
| X-phos Pd (II) 2nd generation precatalyst | Chloro(2-dicyclohexylphosphino-2',4',6'-triisopropyl-1l,1'-biphenyl1)[2-(2'-amino-1l,1'-biphenyl)] palladium (II) |

Example 1

Preparation of Intermediate A-1 (3-(N-methyl-N-trifluoroacetylamino)-thiophene[2,3-b]pyridine-2-carboxylic Acid)

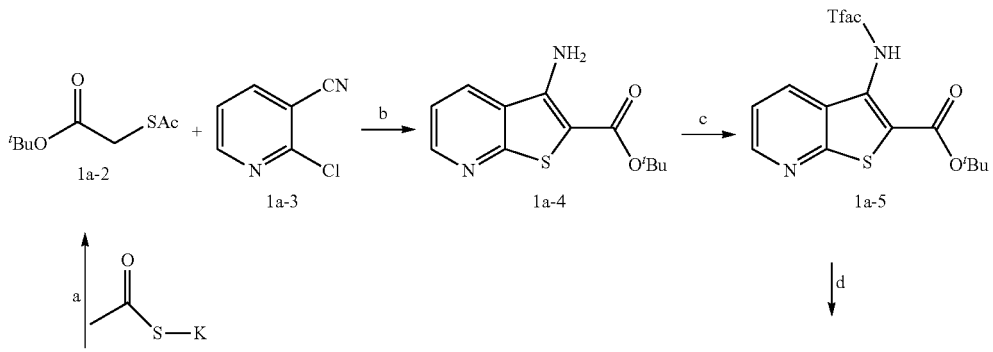

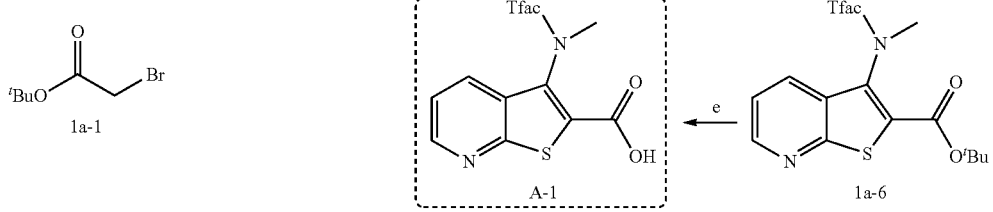

Procedures:

a) To a reaction flask (500 mL) were added potassium thioacetate (57.11 g, 0.50 mol) and anhydrous DMF (250 mL), and the mixture was added dropwise with tert-butyl bromoacetate 1a-1 (97.53 g, 0.50 mol) with stirring at room temperature. After the dropwise addition was completed, the reaction was continued at room temperature for 30 min. The reaction mixture was concentrated under reduced pressure at 80° C. to remove the solvent, cooled, dissolved in water (150 mL), and extracted with chloroform (150 mL×2), and the chloroform layer was washed with saturated NaCl solution (100 mL×2), dried over anhydrous Na$_2$SO$_4$, filtered, and concentrated under reduced pressure to give 1a-2 (95.01 g, 99.9% yield) in the form of an orange-red liquid.

b) To a reaction flask (250 mL) were added tert-butyl 2-acetylthioacetate 1a-2 (10.46 g, 55 mmol), 2-chloro-3-cyanopyridine 1a-3 (6.93 g, 50 mmol) and anhydrous DMF (100 mL), and the mixture was cooled to 0-5° C., added with NaOMe (3.24 g, 60 mmol) in portions, heated to room temperature and then reacted for 1 h. The reaction mixture was poured into water (1.2 L) with stirring, with a large amount of pale yellow solid precipitated, followed by filtration under vacuum. The precipitate was washed with water, and recrystallized from an ethanol-water solution to give tert-butyl 3-aminothieno[2,3-b]pyridine-2-carboxylate (1a-4, 10.26 g, 82% yield).

c) To a reaction flask (250 mL) were added 1a-4 (10.01 g, 40 mmol), NaHCO$_3$ (6.72 g, 80 mmol) and anhydrous chloroform (80 mL), and the mixture was added dropwise with (Tfac)$_2$O (6.8 mL, 48 mmol) with stirring at room temperature. After the dropwise addition was completed, the reaction was continued at room temperature for 30 min. The reaction mixture was added with water (40 mL), and then stirred at room temperature until no gas was generated. The chloroform layer was separated, and the aqueous layer was extracted with chloroform (40 mL×2). The chloroform layers were combined, washed with saturated NaCl solution (80 mL×2), dried over anhydrous Na$_2$SO$_4$, and filtered under vacuum to give tert-butyl 3-N-trifluoroacetylaminothioeno[2,3-b]pyridine-2-carboxylate (1a-5, 13.85 g, 100% yield).

d) To a reaction flask (250 mL) were added 1a-5 (13.85 g, 40 mmol) and anhydrous DMF (70 mL), and the mixture was cooled to 0-5° C., added with NaH (1.92 g, 48 mmol, 60% content) until no gas was generated, and then added dropwise with MeI (3.24 mL, 52 mmol)/DMF (10 mL). After the dropwise addition was completed, the reaction mixture was heated to room temperature and reacted for 2 h. The reaction mixture was adjusted to pH 7 with acetic acid, added with water (50 mL), and extracted with chloroform (50 mL×3). The chloroform layers were combined, washed with saturated NaCl solution (50 mL×2), dried over anhydrous Na$_2$SO$_4$, and concentrated under reduced pressure, and the concentrate was recrystallized from CHCl$_3$-PE to give tert-butyl N-methyl-N-trifluoroacetyl-3-aminothieno[2,3-b]pyridine-2-carboxylate (1a-6, 12.84 g, 89% yield).

e) To a reaction flask (50 mL) were added 1a-6 (2.88 g, 8 mmol), dry DCM (20 mL) and TFA (10 mL), and the mixture was reacted at 40° C. overnight, and concentrated under reduced pressure to remove DCM and TFA to give a yellow gum, which is purified by column chromatography on silica gel using gradient elution (CHCl$_3$/MeOH=50:1, 7:3) to give N-methyl-N-trifluoroacetyl-3-aminothieno[2,3-b]pyridine-2-carboxylic acid (A-1, 2.38 g, 98% yield). ESI-MS: m/z 305 ([M+H]$^+$); $^1$H NMR (400 MHz, DMSO-d$_6$) □ 8.70 (dd, J=4.6, 1.3 Hz, 1H), 8.26 (d, J=8.1 Hz, 1H), 7.53 (dd, J=8.1, 4.6 Hz, 1H), 3.28 (s, 3H).

Example intermediates A-2 to A-29 in Table 1 below were synthesized according to the reagents and reaction conditions described above for Example 1 (intermediate A-1) using appropriate synthesis precursors.

TABLE 1

| Example No. | Structures | [M + H]$^+$ (m/z) |
| --- | --- | --- |
| A-2 | (structure) | 319 |
| A-3 | (structure) | 333 |
| A-4 | (structure) | 347 |
| A-5 | (structure) | 347 |
| A-6 | (structure) | 361 |
| A-7 | (structure) | 361 |

TABLE 1-continued

| Example No. | Structures | [M + H]+ (m/z) |
|---|---|---|
| A-8 | 3-(Tfac(methyl)amino)-6-cyclopropylthieno[2,3-b]pyridine-2-carboxylic acid | 345 |
| A-9 | 3-(Tfac(methyl)amino)-6-(trifluoromethyl)thieno[2,3-b]pyridine-2-carboxylic acid | 373 |
| A-10 | 3-(Tfac(methyl)amino)-6-methoxythieno[2,3-b]pyridine-2-carboxylic acid | 335 |
| A-11 | 3-(Tfac(methyl)amino)-5-methylthieno[2,3-b]pyridine-2-carboxylic acid | 319 |
| A-12 | 3-(Tfac(methyl)amino)-4-methylthieno[2,3-b]pyridine-2-carboxylic acid | 319 |
| A-13 | 3-(Tfac(methyl)amino)-4-(trifluoromethyl)thieno[2,3-b]pyridine-2-carboxylic acid | 373 |
| A-14 | 3-(Tfac(methyl)amino)-5-fluorothieno[2,3-b]pyridine-2-carboxylic acid | 323 |
| A-15 | 3-(Tfac(methyl)amino)-4,6-dimethylthieno[2,3-b]pyridine-2-carboxylic acid | 333 |
| A-16 | 3-(Tfac(methyl)amino)-4-(trifluoromethyl)-6-methylthieno[2,3-b]pyridine-2-carboxylic acid | 387 |
| A-17 | 3-(Tfac(methyl)amino)-4-methyl-6-(difluoromethyl)thieno[2,3-b]pyridine-2-carboxylic acid | 369 |
| A-18 | 3-(Tfac(methyl)amino)-5-fluoro-6-methylthieno[2,3-b]pyridine-2-carboxylic acid | 337 |
| A-19 | 3-(Tfac(methyl)amino)thieno[2,3-b]pyrazine-2-carboxylic acid | 306 |
| A-20 | 3-(Tfac(methyl)amino)-6-methylthieno[2,3-b]pyrazine-2-carboxylic acid | 320 |
| A-21 | 3-(Tfac(methyl)amino)-6-ethylthieno[2,3-b]pyrazine-2-carboxylic acid | 334 |
| A-22 | 3-(Tfac(methyl)amino)-6-isopropylthieno[2,3-b]pyrazine-2-carboxylic acid | 348 |
| A-23 | 3-(Tfac(methyl)amino)-5-methyl-6-ethylthieno[2,3-b]pyrazine-2-carboxylic acid | 348 |

TABLE 1-continued
| Example No. | Structures | [M + H]+ (m/z) |
|---|---|---|
| A-24 | | 340 |
| A-25 | | 339 |
| A-26 | | 389 |
| A-27 | | 333 |
| A-28 | | 347 |
| A-29 | | 376 |
Example 2
Preparation of Intermediate A-30 (3-(N-methyl-N-trifluoroacetylamino-6-hydroxymethylthiophene[2,3-b]pyridine-2-carboxylic Acid)
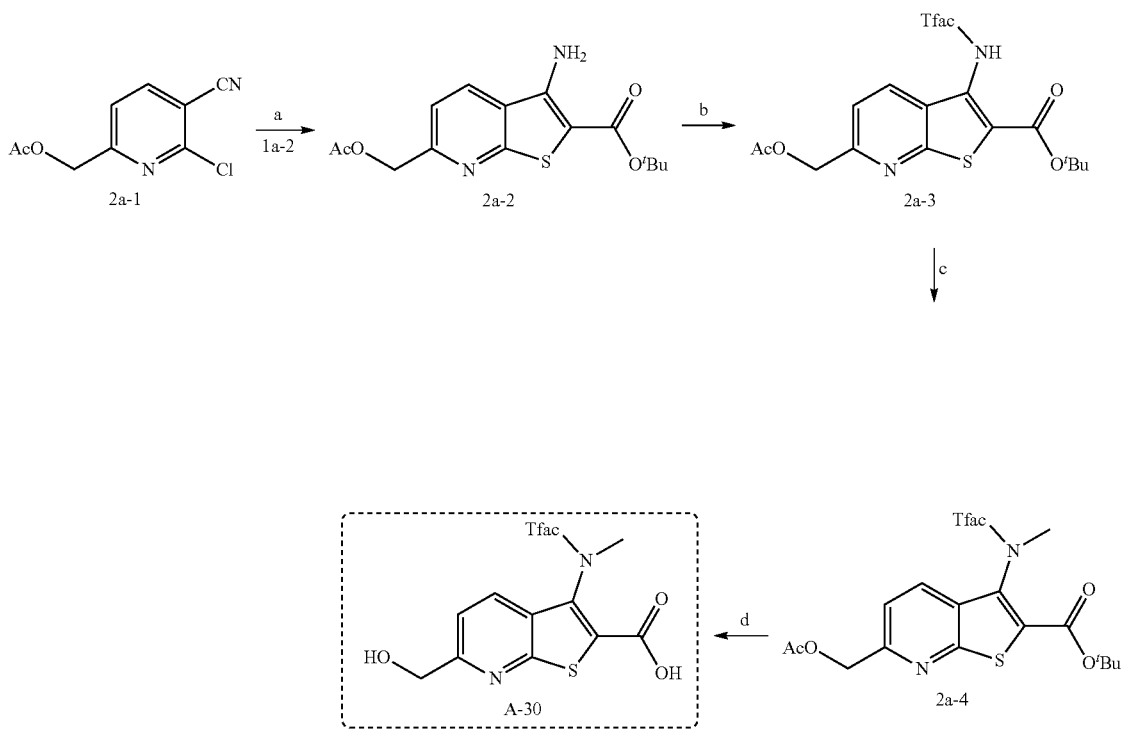

Procedures:
a) To a reaction flask (250 mL) were added tert-butyl 2-acetylthioacetate 1a-2 (10.64 g, 56 mmol), 2-chloro-3-cyano-6-acetoxymethylpyridine 2a-1 (10.53 g, 50 mmol) and anhydrous DMF (100 mL), and the mixture was cooled to 0-5° C., added with NaOMe (3.24 g, 60 mmol) in portions, heated to room temperature and then reacted for 1 h. The reaction mixture was poured into water (1.2 L) with stirring, with a large amount of pale yellow solid precipitated, followed by filtration under vacuum. The precipitate was washed with water, and recrystallized from an ethanol-water solution to give tert-butyl 3-amino-6-acetoxymethylthioeno[2,3-b]pyridine-2-carboxylate 2a-2 (13.54 g, 84%).
b) To a reaction flask (250 mL) were added 2a-2 (13.54 g, 42 mmol), NaHCO$_3$ (6.72 g, 80 mmol) and anhydrous chloroform (80 mL), and the mixture was added dropwise with (Tfac)$_2$O (6.8 mL, 48 mmol) with stirring at room temperature. After the dropwise addition was completed, the reaction was continued at room temperature for 30 min. The reaction mixture was added with water (40 mL), and then stirred at room temperature until no gas was generated. The chloroform layer was separated, and the aqueous layer was extracted with chloroform (40 mL×2). The chloroform layers were combined, washed with saturated NaCl solution (80 mL×2), dried over anhydrous Na$_2$SO$_4$, and filtered under vacuum to give tert-butyl 3-N-trifluoroacetylamino-6-acetoxymethylthiophene[2,3-b]pyridine-2-carboxylate 2a-3 (17.22 g, 98% yield).
c) To a reaction flask (250 mL) were added 2a-3 (16.73 g, 40 mmol) and anhydrous DMF (70 mL), and the mixture was cooled to 0-5° C., added with NaH (1.92 g, 48 mmol, 60% content) until no gas was generated, and then added dropwise with MeI (3.24 mL, 52 mmol)/DMF (10 mL). After the dropwise addition was completed, the reaction mixture was heated to room temperature and reacted for 2 h. The reaction mixture was adjusted to pH 7 with acetic acid, added with water (50 mL), and extracted with chloroform (50 mL×3). The chloroform layers were combined, washed with saturated NaCl solution (50 mL×2), dried over anhydrous Na$_2$SO$_4$, and concentrated under reduced pressure, and the concentrate was recrystallized from CHCl$_3$-PE to give tert-butyl N-methyl-N-trifluoroacetyl-3-aminothieno[2,3-b]pyridine-2-carboxylate 2a-4 (12.84 g, 89% yield).
d) To a reaction flask (50 mL) were added 2a-4 (3.35 g, 8 mmol), dry dichloromethane (20 mL) and trifluoroacetic acid (10 mL), and the mixture was reacted at 40° C. overnight, and concentrated under reduced pressure to remove dichloromethane and residual trifluoroacetic acid. The residue was purified by column chromatography on silica gel using gradient elution (CHCl$_3$/MeOH=20:1→3:1) to give 3-N-methyl-N-trifluoroacetylamino-6-hydroxymethylthieno[2,3-b]pyridine-2-carboxylic acid A-30 (2.54 g, 95% yield). ESI-MS: m/z 335 ([M+H]$^+$); $^1$H NMR (400 MHz, DMSO-d$_6$) ☐ 8.50 (d, J=8.1 Hz, 1H), 7.34 (d, J=8.1 Hz, 1H), 4.91 (s, 2H), 3.28 (s, 3H).

Example 3

Preparation of Intermediate B-1 (tert-butyl 3-(4-(2-aminoethyl)phenyl)-3,8-diazabicyclo[3.2.1]octane-8-carboxylate)

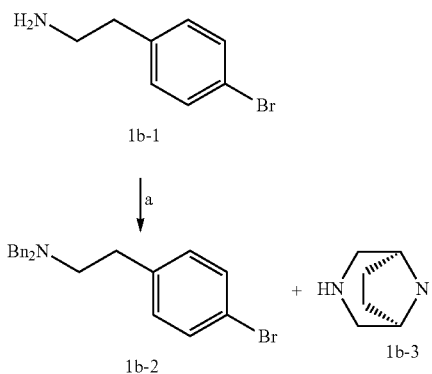

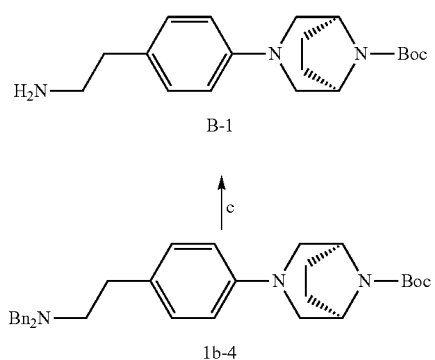

Procedures:
a) To a reaction flask (250 mL) were added p-bromophenylethylamine 1b-1 (10.00 g, 50 mmol), KI (0.41 g, 2.5 mmol), K$_2$CO$_3$ (16.58 g, 120 mmol) and acetonitrile (100 mL), and the mixture was heated to reflux, and then added dropwise with BnCl (20.89 g, 165 mmol). After the dropwise addition was completed, the reaction mixture was refluxed for 2 h, and filtered to remove inorganic salts, and the filtrate was concentrated under reduced pressure to remove acetonitrile. The concentrate was added with chloroform (200 mL), washed with saturated NaCl solution (100 mL×2), dried over anhydrous Na$_2$SO$_4$, and concentrated under reduced pressure to give a crude product. The crude product was concentrated under reduced pressure to remove excess BnCl and by-product benzyl alcohol to give 1b-2 (18.39 g, 97% yield) in the form of a pale yellow liquid.
b) To a reaction flask (250 mL) were added 1b-3 (4.25 g, 20 mmol), 1b-2 (9.13 g, 24 mmol), Pd(OAc)$_2$ (449 mg, 2 mmol), X-phos (953 mg, 2 mmol), Cs$_2$CO$_3$ (13.03 g, 40 mmol) and toluene (80 mL), followed by vacuum/N$_2$ cycles, and the mixture was heated to 100° C. and reacted for 18 h. The reaction mixture was filtered to remove the insoluble substances, and the filtrate was concentrated under reduced pressure. The concentrate was purified by column chromatography on silica gel using gradient elution (PE/EA=19:1, 9:1) to give 1b-4 (8.59 g, 84% yield).
c) To a reaction flask (250 mL) were added 1b-4 (8.15 g, 15.9 mmol), HCO$_2$NH$_4$ (20.09 g, 318.5 mmol), Pd(OH)$_2$/C (2.26 g, 15% Pd contained) and MeOH (65 mL), followed by vacuum/N$_2$ cycles, and the mixture was heated to 60° C. and reacted overnight. The reaction mixture was filtered to remove the insoluble substances, and the filtrate was concentrated under reduced pressure to remove methanol. The concentrate was added with chloroform (200 mL), washed with saturated NaCl solution (50 mL×3), dried over anhydrous Na$_2$SO$_4$, and concentrated under reduced pressure to give a crude product. The crude product was purified by column chromatography on silica gel using gradient elution (CHCl$_3$/MeOH=20:1->8:2) to give B-1 (5.15 g, 93% yield). ESI-MS: m/z 332 ([M+H]$^+$); $^1$H NMR (400 MHz, CDCl$_3$) δ 7.08 (d, J=8.5 Hz, 2H), 6.77 (d, J=8.5 Hz, 2H), 4.33 (m, 2H), 3.37 (d, J=10.0 Hz, 2H), 2.95 (br s, 2H), 2.92 (t, J=6.8 Hz, 2H), 2.67 (t, J=6.8 Hz, 2H), 1.92 (m, 4H), 1.84 (m, 2H), 1.46 (s, 9H).

Example intermediates B-2 to B-20 in Table 2 below were synthesized according to the reagents and reaction conditions described above for Example 3 (intermediate B-1) using appropriate synthesis precursors.

TABLE 2

| Example No. | Structures | [M + H]$^+$ (m/z) |
|---|---|---|
| B-2 | | 306 |
| B-3 | | 318 |
| B-4 | | 332 |
| B-5 | | 346 |
| B-6 | | 350 |
| B-7 | | 350 |
| B-8 | | 357 |
| B-9 | | 360 |
| B-10 | | 362 |
| B-11 | | 366 |
| B-12 | | 368 |
| B-13 | | 368 |
| B-14 | | 368 |
| B-15 | | 368 |
| B-16 | | 384 |
| B-17 | | 386 |
| B-18 | | 400 |
| B-19 | | 372 |

TABLE 2-continued

| Example No. | Structures | [M + H]+ (m/z) |
|---|---|---|
| B-20 | H₂N-CHF-C₆H₄-N(bicyclic)-N-Boc | 350 |

Example 4

Preparation of Intermediate B-21 (tert-butyl 4-(4-aminoethylphenyl)piperidine-1-carboxylate)

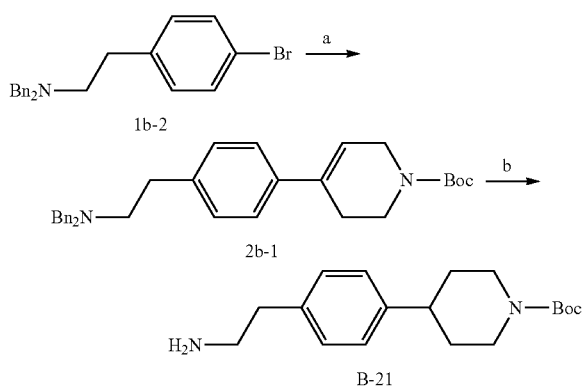

Procedures:

a) To a microwave tube (50 mL) were added 1b-2 (1.66 g, 4.35 mmol), tert-butyl 4-(tetramethyl-1,3,2-dioxaborolan 2-yl)-1,2,3,6-tetrahydropyridine-1-carboxylate (2.69 g, 8.70 mmol), Pd(dppf)Cl₂ (0.32 g, 0.44 mmol), potassium carbonate (1.20 g, 8.68 mmol), ethanol (10 mL) and water (2 mL). The mixture was heated at 130° C. under microwave irradiation for 1 h, The reaction mixture was filtered to remove the residual solid, and the filtrate was concentrated under reduced pressure. The resulting crude product was purified by column chromatography on silica gel using gradient elution (EA/PE) to give 2b-1 (419 mg, 20% yield) in the form of a yellow solid.

b) To a reaction flask (25 mL) were added 2b-1 (400 mg, 0.83 mmol), HCO₂NH₄ (1.05 g, 16.65 mmol), Pd(OH)₂/C (115 mg, 15% Pd contained) and MeOH (5 mL), followed by vacuum/N₂ cycles, and the mixture was heated to 60° C. and reacted overnight. The reaction mixture was filtered to remove the insoluble substances, and the filtrate was concentrated under reduced pressure to remove methanol. The concentrate was added with chloroform (10 mL), washed with saturated NaCl solution (10 mL×3), dried over anhydrous Na₂SO₄, and concentrated under reduced pressure to give a crude product. The crude product was purified by column chromatography on silica gel using gradient elution (CHCl₃/MeOH=20:1→5:1) to give B-21 (227 mg, 90% yield). ESI-MS: m/z 305 ([M-41]⁺).

Example intermediates B-22 to B-24 in Table 3 below were synthesized according to the procedures outlined above for Example 4 (intermediate B-21) using appropriate synthesis precursors.

TABLE 3

| Example No. | Structures | [M + H]+ (m/z) |
|---|---|---|
| B-22 | H₂N-CH₂CH₂-C₆H₄-(bicyclic)-N-Boc | 331 |
| B-23 | H₂N-CH₂CH₂-C₆H₄-(bicyclic)-N-Boc | 331 |
| B-24 | H₂N-CH₂CH₂-C₆H₄-(bicyclic)-N-Boc | 317 |

Example 5

Preparation of Intermediate B-25 (tert-butyl 3-(4-(1-amino-isopropyl)phenyl)-3,8-diazabicyclo[3.2.1]octane-8-carboxylate)

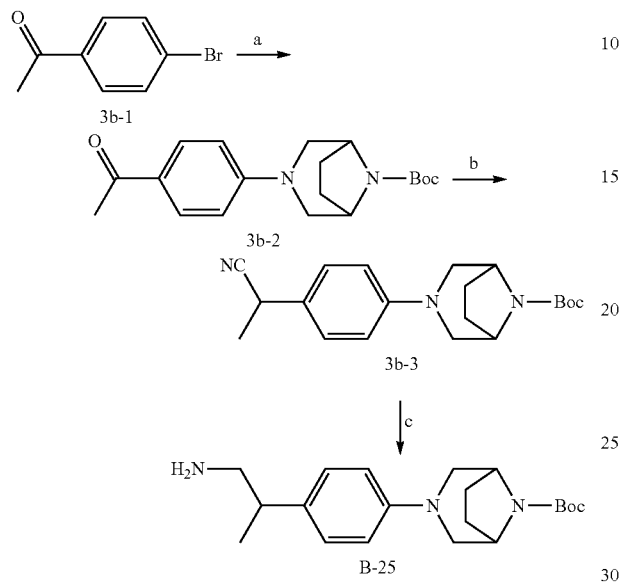

Procedures:

a) To a round-bottom flask (100 mL) were added p-bromoacetophenone 3b-1 (3.38 g, 17.0 mmol), 3,8-diazabicyclo[3.2.1]octane-8-carboxylate (3.00 g, 14.1 mmol), potassium carbonate (5.86 g, 42.4 mmol) and HMPA (30 mL), and the resulting solution was stirred in an oil bath at 70° C. overnight and cooled to room temperature. The reaction was quenched with water (30 mL). Then the resulting solution was extracted with EA (30 mL×3), and the organic layers were combined, concentrated under reduced pressure, and purified by column chromatography on silica gel with EA/PE of 1:5 to give 3b-2 (1.68 g, 30%) in the form of a brown oil. ESI-MS: m/z 331 ([M+H]$^+$).

b) To a round-bottom flask (100 mL) were added 3b-2 (1.65 g, 5 mmol), potassium tert-butoxide (1.13 g, 13.0 mmol), TosMIC (1.46 g, 7.5 mmol), tert-butanol (20 mL) and DME (20 mL), and the resulting solution was stirred in an oil bath at 90° C. overnight and cooled after the reaction was completed. The reaction was quenched with water (20 mL). The reaction mixture was extracted with EA (20 mL×3), and the organic layers were combined, dried over anhydrous Na$_2$SO$_4$, filtered, concentrated under reduced pressure, and purified by column chromatography on silica gel with EA/PE of 1:5 to give 3b-3 (1.13 g, 66% yield) in the form of a brown oil. ESI-MS: m/z 342 ([M+H]$^+$).

c) To a round-bottom flask (100 mL) were added 3b-3 (0.96 g, 2.8 mmol), NH$_3$/MeOH (7 M, 20 mL) and Raney nickel (500 mg) in a nitrogen atmosphere, and the reaction mixture was stirred in a hydrogen atmosphere at room temperature for 2 h, and filtered to remove the solid. The filtrate was concentrated under reduced pressure and purified by column chromatography on silica gel with dichloromethane/methanol of 10:1 to give B-25 (790 mg, 82% yield) in the form of a yellow oil. ESI-MS: m/z 346 ([M+H]$^+$).

Example 6

Preparation of Intermediate B-26 ((S)-1-(4-bromophenyl)-2-amino-3-methoxypropane)

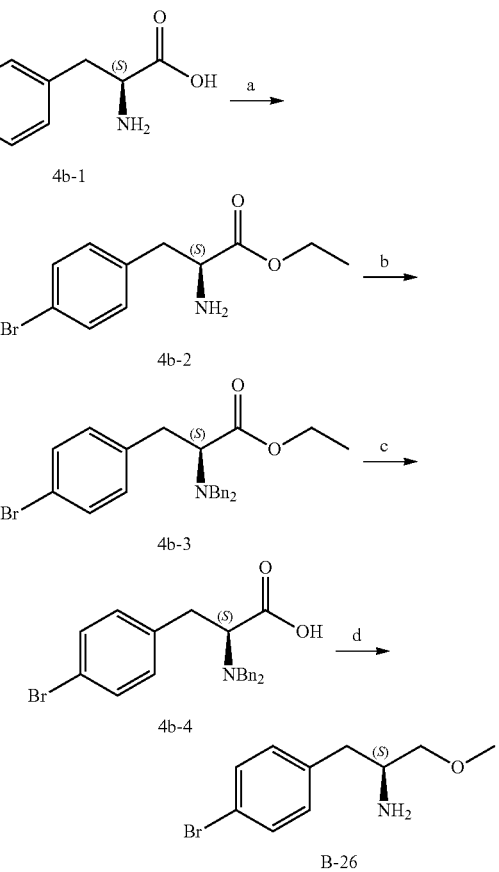

Procedures:

a) To a round-bottom flask (100 mL) were added 4b-1 (12.25 g, 50 mmol) and absolute alcohol (30 mL), and the mixture was cooled to 0° C., stirred, and then added dropwise slowly with SOCl$_2$ (5.45 mL, 75 mmol) before being heated to room temperature and stirred overnight. After the reaction was completed, the reaction mixture was concentrated under reduced pressure to remove the solvent, added with water (30 mL), and extracted with EA (30 mL×3), and the organic layers were combined and concentrated under reduced pressure to give 4b-2 (11.70 g, 86% yield).

b) To a round-bottom flask (100 mL) were added 4b-2 (9.52 g, 35 mmol), BnCl (11.5 mL, 100 mmol), KI (8.3 g, 50 mmol), K$_2$CO$_3$ (6.91 g, 50 mmol) and MeCN (30 mL), and the mixture was stirred at 60° C. for 4 h. After the reaction was completed, the reaction mixture was cooled, and the reaction was quenched with water (30 mL). The reaction mixture was extracted with EA (30 mL×3), and the organic layers were combined, concentrated under reduced pressure, and purified by column chromatography on silica gel with EA/PE of 1:5 to give 4b-3 (14.25 g, 90% yield). ESI-MS: m/z 452 ([M+H]⁺).

c) To a round-bottom flask (100 mL) were added 4b-3 (13.57 g, 30 mmol), NaBH₄ (2.27 g, 60 mmol) and THF (30 mL) in a nitrogen atmosphere, and the mixture was stirred at room temperature for 2 h, and filtered to remove the solid. The filtrate was added with saturated potassium carbonate solution (20 mL), and the organic layer was separated, concentrated under reduced pressure, and purified by column chromatography on silica gel with dichloromethane/methanol of 20:1 to give 4b-4 (9.85 g, 80% yield). ESI-MS: m/z 410 ([M+H]⁺).

d) To a reaction flask (25 mL) were added 4b-4 (0.92 g, 4 mmol), anhydrous THF (5 mL) and NaH (0.192 g, 4.8 mmol, 60% content), and the mixture was stirred at room temperature for 30 min, and then added dropwise with MeI (0.33 mL, 5.2 mmol)/DMF (1 mL). After the dropwise addition was completed, the reaction was continued for 2 h. The reaction mixture was adjusted to pH 7 with acetic acid, added with water (5 mL), and extracted with chloroform (5 mL×3). The chloroform layers were combined, washed with saturated NaCl solution (5 mL×2), dried over anhydrous Na₂SO₄, and concentrated under reduced pressure, and the concentrate was recrystallized from CHCl₃-PE to give B-26 (859 mg, 88% yield). ESI-MS: m/z 244 ([M+H]⁺).

Example 7

Preparation of Intermediate B-27 (tert-butyl 3-(4-(2-amino-3-ethoxypropyl)phenyl)-3,8-diazabicyclo[3.2.1]octane-8-carboxylate)

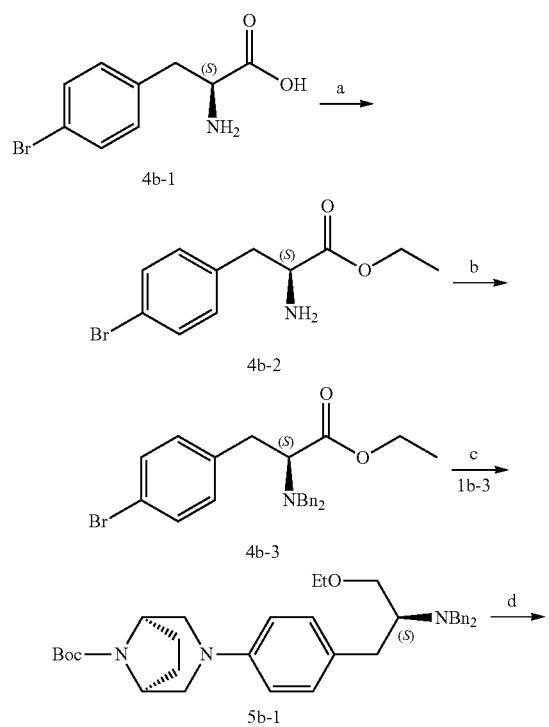

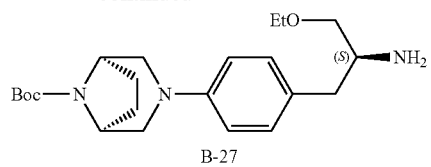

Procedures:

Steps a) and b) are the same as a) and b) of Example 6.

c) To a reaction flask (250 mL) were added 1b-3 (4.25 g, 20 mmol), 4b-3 (9.04 g, 20 mmol), Pd(OAc)₂ (449 mg, 2 mmol), X-phos (953 mg, 2 mmol), Cs₂CO₃ (13.03 g, 40 mmol) and toluene (80 mL), followed by vacuum/N₂ cycles, and the mixture was heated to 100° C. and reacted for 18 h, and filtered to remove the insoluble substances. The filtrate was concentrated under reduced pressure, and the concentrate was purified by column chromatography on silica gel using gradient elution (PE/EA=19:1->9:1) to give 5b-1 (9.34 g, 82% yield).

d) To a reaction flask (250 mL) were added 5b-1 (8.15 g, 15.9 mmol), HCO₂NH₄ (20.09 g, 318.5 mmol), Pd(OH)₂/C (2.26 g, 15% Pd contained) and MeOH (65 mL), followed by vacuum/N₂ cycles, and the mixture was heated to 60° C. and reacted overnight, and filtered to remove the insoluble substances. The filtrate was concentrated under reduced pressure to remove methanol, and the concentrate was added with chloroform (200 mL), washed with saturated NaCl solution (50 mL×3), dried over anhydrous Na₂SO₄, and concentrated under reduced pressure to give a crude product. The crude product was purified by column chromatography on silica gel using gradient elution (CHCl₃/MeOH=20:18:2) to give B-27 (4.57 g, 91% yield). ESI-MS: m/z 390 ([M+H]⁺).

Example intermediates B-28 to B-30 in Table 4 below were synthesized according to the procedures outlined above for Examples 6 and 7 (intermediates B-26 and B-27) using appropriate synthesis precursors.

TABLE 4

| Example No. | Structures | [M + H]⁺ (m/z) |
|---|---|---|
| B-28 | H₂N—CH(CH₃)—CH₂—C₆H₄—Br | 214 |
| B-29 | H₂N—CH(CH₃)—CH₂—C₆H₄—N(diazabicyclo)—N—Boc | 346 |
| B-30 | H₂N—CH(CF₃)—C₆H₄—N(diazabicyclo)—N—Boc | 400 |

Example 8

Preparation of Intermediates B-31 and B-32 (tert-butyl 3-(3R-aminochroman-7-yl)-3,8-diazabicyclo[3.2.1]octane-8-carboxylate and Tert-butyl 3-(3S-aminochroman-7-yl)-3,8-diazabicyclo[3.2.1]octane-8-carboxylate)

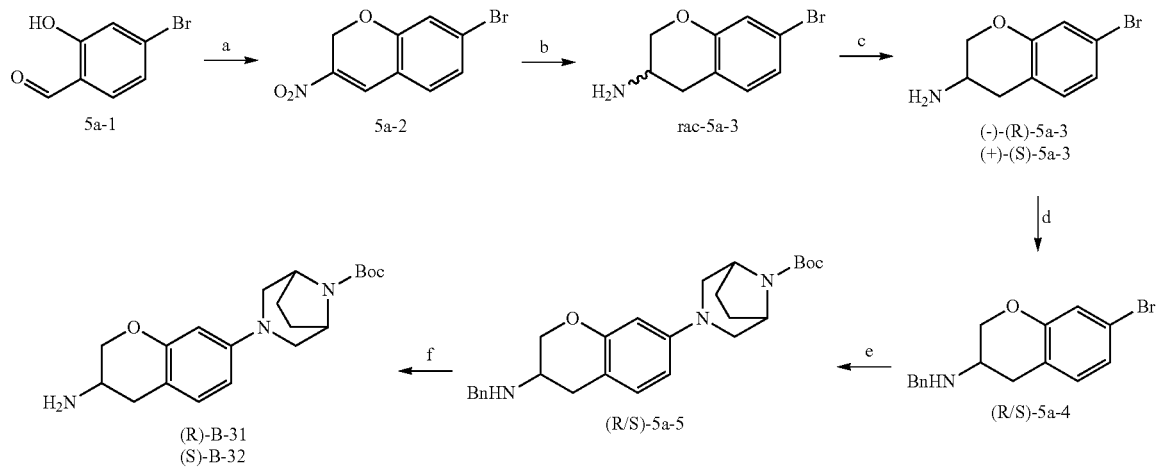

Procedures:

a) To a reaction flask (100 mL) were added 4-bromo-2-hydroxybenzaldehyde (5a-1, 3.02 g, 15 mmol), di-n-butylamine hydrochloride (1.24 g, 7.5 mmol), 2-nitroethanol (2.73 g, 30 mmol) and amyl acetate (15 mL), and the mixture was heated to reflux in a nitrogen atmosphere for 8 h, followed by separation by a water separator to remove water. After the reaction was completed, the reaction mixture was cooled to room temperature and filtered to give a dark solid, which was washed with ethyl acetate. The filtrate was concentrated under reduced pressure, and the concentrate was purified by column chromatography on silica gel (100 g, 200-300 mesh) with petroleum ether/ethyl acetate of 20:1 to give 5a-2 (1.92 g, 50% yield) in the form of a yellow solid.

b) 5a-2 (1.9 g, 7.42 mmol) was dissolved in anhydrous THF (32 mL), followed by dropwise addition of borane-tetrahydrofuran solution (1 M, 37.1 mL, 37.1 mmol) at 0° C. in a nitrogen atmosphere. After the dropwise addition was completed, the ice bath was removed, and the mixture was added with NaBH$_4$ (0.28 g, 7.42 mmol) and reacted at 65° C. for 18 h. The reaction mixture was cooled to room temperature, adjusted to pH 1-2 by slowly dropwise addition of 1 N hydrochloric acid, heated to 70° C. and reacted for 1.5 h. The reaction mixture was cooled to room temperature, and extracted with diethyl ether (60 mL×2). The aqueous solution was adjusted to about pH 10 with 1 N sodium hydroxide solution into the aqueous solution, and extracted with ethyl acetate (60 mL×3). The organic phases were combined, washed with saturated NaCl solution (60 mL×2), dried over anhydrous sodium sulfate, filtered, and concentrated to give rac-5a-3 (1.51 g, 89% yield) in the form of a pale brown solid.

c) rac-5a-3 (742 mg) was dissolved in 1.5 mL Hexane-EtOH (1:1), Daicel IA (5 μm, 10×250 mm), mobile phase: Hexane-EtOH-DEA=70:30:0.2, flow rate: 2.5 mL/min, column temperature: 25° C., detection wavelength: 254 nm, injection volume: 25 μL. (−)-(R)-5a-3 (323 mg, $t_{R1}$=14.0 min), $[α]_D^{25}$=−77.9 (c 0.2, MeOH), the steric configuration is determined by X-ray; (+)-(S)-5a-3 (306 mg, $t_{R2}$=16.7 min), $[α]_D^{25}$=100.0 (c 0.2, MeOH).

d) To a reaction flask (25 mL) were added (R)-5a-3 (313 mg, 1.37 mmol), K$_2$CO$_3$ (568 mg, 4.11 mmol) and MeCN (5 mL), and the mixture was heated to 60° C., and added dropwise with benzyl chloride (520 mg, 4.11 mmol)/MeCN (2 mL) within 30 min. After the dropwise addition was completed, the reaction was continued for 3 h at 60° C. The reaction mixture was cooled to room temperature, added with water (10 mL), and extracted with CHCl$_3$ (10 mL×3), and the organic phases were combined, washed with saturated NaCl solution (15 mL×2), dried over anhydrous Na$_2$SO$_4$, and concentrated under reduced pressure to give a crude product. The crude product was purified by column chromatography on silica gel (20 g, 200-300 mesh) with CHCl$_3$ to give (R)-5a-4 (347 mg, 80% yield) in the form of a pale yellow oil. $R_f$=0.70 (CHCl$_3$-MeOH, 50:1).

e) To a reaction flask (10 mL) were added (R)-5a-4 (318 mg, 1.0 mmol), 8-Boc-3,8-diazabicyclo[3.2.1]octane (234 mg, 1.1 mmol), Pd(OAc)$_2$ (22 mg, 0.1 mmol), Xphos (48 mg, 0.1 mmol) and Cs$_2$CO$_3$ (652 mg, 2.0 mmol), and the mixture was added with PhMe (5 mL) in an N$_2$ atmosphere, heated to 100° C. and reacted overnight. The reaction mixture was cooled to room temperature, added with water (10 mL), and extracted with CHCl$_3$ (10 mL×3), and the organic phases were combined, washed with saturated NaCl solution (15 mL×2), dried over anhydrous Na$_2$SO$_4$, and concentrated to give a crude product. The crude product was purified by column chromatography on silica gel (20 g, 200-300 mesh) with CHCl$_3$/MeOH of 100:1 to give (R)-5a-5 (450 mg, 100% yield) in the form of a pale yellow gum. R$_f$=0.24 (CHCl$_3$/MeOH=100:1).

f) To a reaction flask (10 mL) were added (R)-5a-5 (450 mg, 1.0 mmol), ammonium formate (1.26 g, 20 mmol) and MeOH (5 mL), followed by addition of Pd(OH)$_2$—C (71 mg, 0.1 mmol, 15% Pd contained), and the mixture was heated to 60° C. in an N$_2$ atmosphere and reacted overnight. The reaction mixture was cooled to room temperature, filtered, and concentrated under reduced pressure to give a crude product. The crude product was purified by column chromatography on silica gel (30 g, 200-300 mesh) with CHCl$_3$/MeOH from 25:1 to 9:1 to give B-31 (450 mg, 100% yield) in the form of a pale yellow gum. R$_f$=0.52 (CHCl$_3$/MeOH=9:1), ESI-MS: m/z 360 ([M+H]$^+$).

(S)-5a-3 was taken as a starting material, and reacted by steps d), e) and f) to give B-32.

Example intermediates B-33 to B-36 in Table 5 below were synthesized according to the procedures outlined above for Example 8 (intermediates B-31 and B-32) using appropriate synthesis precursors.

TABLE 5

| Examples No. | Structures | [M + H]$^+$ (m/z) |
|---|---|---|
| B-33 | H$_2$N-(R)-indane-N(N-Boc bicyclic) | 344 |
| B-34 | H$_2$N-(S)-indane-N(N-Boc bicyclic) | 344 |
| B-35 | H$_2$N-(R)-tetrahydronaphthalene-N(N-Boc bicyclic) | 358 |
| B-36 | H$_2$N-(S)-tetrahydronaphthalene-N(N-Boc bicyclic) | 358 |

Example 9

Preparation of Compound I-1 (N-4-(3,8-diazabicyclo[3.2.1]octan-3-yl)phenethyl-6-methyl-3-methylaminothiophene[2,3-b]pyridine-2-carboxamide) and Hydrochlorides Thereof

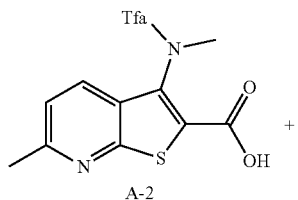

A-2

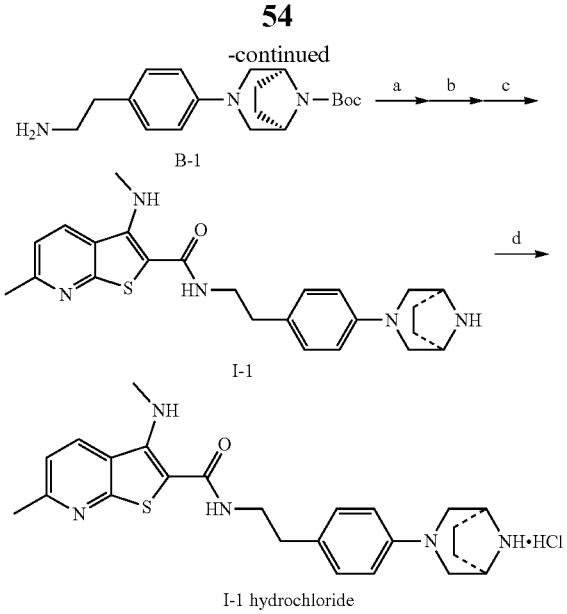

a) To a reaction flask (10 mL) were added A-2 (382 mg, 1.2 mmol), B-1 (398 mg, 1.2 mmol), EDCI (276 mg, 1.44 mmol), HOBt (178 mg, 1.32 mmol) and dry DMF (4 mL), and the mixture was added with DIEA (611 uL, 3.6 mmol), heated to 60° C. and reacted for 2 h. The reaction mixture was concentrated under reduced pressure at 80° C., and the concentrate was purified by column chromatography on silica gel using gradient elution (PE:EA=7:3->6:4) to give an amide (624 mg, 82% yield).

b) To a reaction flask (10 mL) were added amide (604 mg, 0.96 mmol) and dichloromethane (4 mL), followed by addition of trifluoroacetic acid (745 μL, 10 mmol), and the mixture was heated to 40° C. and reacted overnight. After the reaction was completed, the reaction mixture was concentrated under reduced pressure to remove dichloromethane and trifluoroacetic acid to give a Boc-free product.

c) To the Boc-free product were added MeOH (4 mL) and K$_2$CO$_3$ (553 mg, 4 mmol), and the mixture was stirred at room temperature for 30 min. The reaction mixture was added with water (10 mL) and extracted with chloroform (10 mL×3), and the chloroform layers were combined, washed with saturated NaCl solution (10 mL×2), dried over anhydrous Na$_2$SO$_4$, and concentrated under reduced pressure to give a Tfac-free product I-1 (238 mg, 57% yield). ESI-MS: m/z 436 ([M+H]$^+$); $^1$H NMR (400 MHz, CDCl$_3$) δ 8.30 (d, J=8.5 Hz, 1H), 8.10 (q, J=5.7 Hz, 1H), 7.15 (d, J=8.6 Hz, 2H), 7.12 (d, J=8.5 Hz, 1H), 6.80 (d, J=8.6 Hz, 2H), 5.59 (t, J=5.6 Hz, 1H), 3.78 (br s, 2H), 3.60 (td, J=6.9, 5.6 Hz, 2H), 3.47 (dd, J=11.4, 2.3 Hz, 2H), 3.32 (d, J=5.7 Hz, 3H), 3.02 (dd, J=11.3, 1.5 Hz, 2H), 2.83 (t, J=6.9 Hz, 2H), 2.67 (s, 3H), 1.94 (br s, 4H).

d) I-1 (237 mg) was dissolved in MeOH (8 mL), followed by the addition of 36% hydrochloric acid (120 μL) with stirring at room temperature to precipitate a large amount of an orange-yellow solid, and the mixture was filtered under vacuum. The residue was washed with a small amount of MeOH to remove the free HCl to give the I-1 hydrochloride (253 mg, 100% yield). ESI-MS: m/z 436 ([M+H]$^+$); $^1$H NMR (400 MHz, DMSO-d$_6$) δ 9.50-9.46 (m, 2H), 8.49 (d, J=8.5 Hz, 1H), 7.87 (t, J=4.9 Hz, 1H), 7.30 (d, J=8.5 Hz, 1H), 7.09 (d, J=8.6 Hz, 2H), 6.84 (d, J=8.6 Hz, 2H), 6.53 (br s, 3H), 4.09 (br s, 2H), 3.55 (dd, J=11.2, 1.6 Hz, 2H), 3.36 (tt, J=7.8, 4.8 Hz, 2H), 3.17 (s, 3H), 3.08 (d, J=12.8 Hz, 2H), 2.72

(t, J=7.8 Hz, 2H), 2.59 (s, 3H), 1.97 (m, 2H), 1.91 (m, 2H); $^{13}$C NMR (125 MHz, DMSO-d$_6$) δ 164.7, 158.2, 157.6, 148.3, 146.8, 133.5, 130.1, 129.2, 124.4, 119.5, 114.6, 53.7, 50.6, 41.0, 34.4, 32.9, 25.4, 23.7.

Example compounds 1-2 to 1-92 in Table 6 below were synthesized according to the reagents and reaction conditions described above for Example 9 (Compound I-1) using appropriate synthesis precursors, such as the above-mentioned intermediates A1 to A30 and B1 to B36, as well as the above-mentioned B-I obtained commercially or by classic synthetic methods.

TABLE 6

| No. | Structural formulas | [M + H]$^+$ | $^1$H NMR 400 MHz [(solvent) □ (mult., J in Hz, Integ.)]* |
|---|---|---|---|
| I-2 | (structure) | 410 | (CDCl$_3$) δ 8.30 (d, 8.5), 8.10 (q, 5.3), 7.14 (d, 8.6, 2H), 7.12 (d, 8.5), 6.78 (d, 8.6, 2H), 5.59 (t, 5.6), 3.60 (td, 6.9, 5.3,2H), 3.38 (t, 7.0, 4H), 3.30 (d, 5.7, 3H), 3.09 (br t, 7.0, 4H), 2.84 (t, 6.9, 2H), 2.67 (s, 3H), 2.00 (br s) |
| I-3 | (structure) | 409 | (DMSO-d$_6$) δ 8.50 (d, 8.5), 7.90 (q, 5.7), 7.30 (d, 8.5), 7.18 (m, 4H), 6.55 (t, 5.6), 3.39 (td, 6.9, 5.6, 2H), 3.26 (m, 2H), 3.18 (d, 5.7, 3H), 2.88-2.81 (m, 4H), 2.73 (m), 2.59 (s, 3H), 1.89 (m, 2H), 1.69 (m, 2H). |
| I-4 | (structure) | 435 | (CD$_3$OD) δ 8.25 (d, 8.5), 7.30 (d, 8.5), 7.20 (m, 4H), 3.68 (br s,2H), 3.50 (t, 7.5, 2H), 3.41 (m, 2H), 3.24 (s, 3H), 2.99 (m), 2.83 (t, 7.5, 2H), 2.67 (s, 3H), 2.38-2.25 (m, 2H), 1.95-1.88 (m, 2H),, 1.76-1.72 (m, 2H), 1.70-1.64 (m, 2H). |
| I-5 | (structure) | 435 | (CDCl$_3$) δ 8.29 (d, 8.5), 8.10 (q, 5.7), 7.21 (m, 4H), 7.10 (d, 8.5), 5.61 (t, 5.6), 3.61 (td, 7.0, 5.6, 2H), 3.41 (dd, 11.5, 3.4, 2H), 3.30 (d, 5.7, 3H), 3.10 (dd, 11.5, 2.7, 2H), 3.01 (br t, 3.0), 2.85 (t, 7.0, 2H), 2.67 (s, 3H), 1.74-1.65 (m, 6H). |
| I-6 | (structure) | 436 | (CDCl$_3$) δ 8.30 (d, 8.5), 8.08 (q, 5.7), 7.15 (d, 8.6, 2H), 7.13 (d, 8.5), 6.80 (d, 8.6, 2H), 5.59 (t, 5.6), 4.01 (m, 2H), 3.61 (td, 6.9, 5.6, 2H), 3.32 (d, 5.7, 3H), 3.06 (dd, 11.5, 2.9, 2H), 2.97 (dd, 11.5, 2.0, 2H), 2.82 (t, 6.9, 2H), 2.66 (s, 3H), 1.88-1.80 (m, 5H). |
| I-7 | (structure) | 421 | (CDCl$_3$) δ 8.29 (d, 8.5), 8.01 (q, 5.7), 7.20 (m, 4H), 7.09 (d, 8.5), 5.60 (t, 5.6), 3.60 (td, 6.9, 5.6, 2H), 3.46 (m), 3.34 (d, 5.7, 3H), 2.94-2.82 (m, 5H), 2.70 (br s), 2.66 (s, 3H), 2.44 (m), 2.18-2.08 (m, 2H), 1.71 (m, 2H). |

TABLE 6-continued

| No. | Structural formulas | [M + H]+ | ¹H NMR 400 MHz [(solvent) δ (mult., J in Hz, Integ.)]* |
|---|---|---|---|
| I-8 | | 422 | (CDCl$_3$) δ 8.30 (d, 8.5), 8.10 (q, 5.7), 7.12 (d, 8.5), 7.08 (d, 8.6, 2H), 6.81 (d, 8.6, 2H), 5.63 (t, 5.6), 3.80 (quint, 7.0), 3.61-3.50 (m, 3H), 3.32 (d, 5.7, 3H), 3.30 (dd, 12, 4, 7.1), 3.19 (dd, 12.4, 6.9), 3.08 (dd, 12.4, 6.9), 2.97 (m), 2.85 (t, 7.1, 2H), 2.67 (s, 3H), 2.15 (br s), 1.90 (m, 2H). |
| I-9 | | 422 | (Methanol-d$_4$) δ 8.58 (dd, 4.6, 1.3), 8.57 (br d, 8.2), 7.40 (m), 7.17 (d, 8.6, 2H), 6.89 (d, 8.6, 2H), 4.12 (br s, 2H), 3.63 (dd, 12.8, 2.5, 2H), 3.50 (t, 7.5, 2H), 3.24 (s, 3H), 3.06 (br d, 12.3, 2H), 2.81 (t, 7.5, 2H), 2.15-2.07 (m, 4H). |
| I-10 | | 450 | (CDCl$_3$) δ 8.32 (d, 8.5), 8.10 (q, 5.7), 7.15 (d, 8.6, 2H), 7.14 (d, 8.5), 6.80 (d, 8.6, 2H), 5.61 (t, 5.6), 3.78 (br s, 2H), 3.60 (td, 6.9, 5.6, 2H), 3.47 (dd, 11.4, 2.3, 2H), 3.30 (d, 5.7, 3H), 3.02 (dd, 11.3, 1.5, 2H), 2.88 (q, 7.5, 2H), 2.83 (t, 6.9, 2H), 1.25 (t, 7.5, 3H), 1.94 (br s, 4H). |
| I-11 | | 464 | (CDCl$_3$) δ 8.40 (d, 8.5), 8.11 (q, 5.7), 7.17 (d, 8.5), 7.15 (d, 8.6, 2H), 6.80 (d, 8.6, 2H), 5.59 (t, 5.6), 3.78 (br s, 2H), 3.60 (td, 6.9, 5.6, 2H), 3.47 (dd, 11.4, 2.3, 2H), 3.32 (d, 5.7, 3H), 3.02 (dd, 11.3, 1.5, 2H), 2.97 (t, 7.5, 2H), 2.83 (t, 6.9, 2H), 1.94 (br s, 4H), 1.82 (sept, 7.5, 2H), 0.98 (t, 7.5, 3H). |
| I-12 | | 464 | (CDCl$_3$) δ 8.33 (d, 8.5), 8.11 (q, 5.7), 7.15 (d, 8.6, 2H), 7.11 (d, 8.5), 6.80 (d, 8.6, 2H), 5.62 (t, 5.6), 3.78 (br s, 2H), 3.60 (td, 6.9, 5.6, 2H), 3.47 (dd, 11.4, 2.3, 2H), 3.32 (d, 5.7, 3H), 3.27 (hept), 3.02 (dd, 11.3, 1.5, 2H), 2.83 (t, 6.9, 2H), 1.96 (br s, 4H), 1.37 (d, 7.5, 3H), 1.32 (d, 7.5, 3H). |
| I-13 | | 478 | (CDCl$_3$) δ 8.44 (d, 8.5), 8.11 (q, 5.7), 7.22 (d, 8.5), 7.15 (d, 8.6, 2H), 6.80 (d, 8.6, 2H), 5.60 (t, 5.6), 3.78 (br s, 2H), 3.60 (td, 6.9, 5.6, 2H), 3.47 (dd, 11.4, 2.3, 2H), 3.32 (d, 5.7, 3H), 3.02 (dd, 11.3, 1.5, 2H), 2.91-2.81 (m, 4H), 2.00-1.91 (m, 6H), 1.41 (m, 2H), 0.96 (t, 7.5, 3H). |
| I-14 | | 478 | (CDCl$_3$) δ 8.39 (d, 8.5), 8.12 (q, 5.7), 7.15 (d, 8.6, 2H), 7.07 (d, 8.5), 6.80 (d, 8.6, 2H), 5.62 (t, 5.6), 3.78 (br s, 2H), 3.60 (td, 6.9, 5.6, 2H), 3.47 (dd, 11.4, 2.3, 2H), 3.32 (d, 5.7, 3H), 3.02 (dd, 11.3, 1.5, 2H), 2.85-2.80 (m, 4H), 2.05 (m), 1.95 (br s, 4H), 1.11 (d, 7.5, 3H), 1.06 (d, 7.5, 3H). |
| I-15 | | 462 | (CDCl$_3$) δ 8.25 (d, 8.5), 8.09 (q, 5.7), 7.22 (d, 8.5), 7.15 (d, 8.6, 2H), 6.80 (d, 8.6, 2H), 5.55 (t, 5.6), 3.78 (br s, 2H), 3.60 (td, 6.9, 5.6, 2H), 3.47 (dd, 11.4, 2.3, 2H), 3.32 (d, 5.7, 3H), 3.02 (dd, 11.3, 1.5, 2H), 2.83 (t, 6.9, 2H), 2.22 (m), 1.94 (br s, 4H), 1.24 (m, 2H), 1.01 (m, 2H). |

TABLE 6-continued

| No. | Structural formulas | [M + H]⁺ | ¹H NMR 400 MHz [(solvent) δ (mult., J in Hz, Integ.)]* |
|---|---|---|---|
| I-16 | | 490 | (CDCl₃) δ 8.22 (d, 8.5), 8.12 (q, 5.7), 7.21 (d, 8.5), 7.15 (d, 8.6, 2H), 6.80 (d, 8.6, 2H), 5.61 (t, 5.6), 3.78 (br s, 2H), 3.60 (td, 6.9, 5.6, 2H), 3.47 (dd, 11.4, 2.3, 2H), 3.32 (d, 5.7, 3H), 3.02 (dd, 11.3, 1.5, 2H), 2.83 (t, 6.9, 2H), 2.67 (s, 3H), 1.94 (br s, 4H). |
| I-17 | | 452 | (DMSO-d₆) δ 8.18 (d, 8.5), 7.87 (t, 5.0), 7.10 (d, 8.6, 2H), 6.66 (d, 8.5), 6.84 (d, 8.6, 2H), 6.52 (br s), 4.10 (br s, 2H), 3.93, (s, 3H), 3.56 (br d, 11.2, 2H), 3.37 (td, 7.2, 5.0, 2H), 3.18 (s, 3H), 3.09 (br d, 11.5, 2H), 2.73 (t, 7.2, 2H), 1.90-2.00 (m, 4H). |
| I-18 | | 440 | (DMSO-d₆) δ 8.68 (br d, 9.8), 8.37 (dd, 9.6, 2.1), 7.87 (t, 5.0), 7.16 (d, 8.6, 2H), 6.81 (d, 8.6, 2H), 6.52 (br s), 4.10 (br s, 2H), 3.56 (br d, 11.2, 2H), 3.37 (td, 7.2, 5.0, 2H), 3.18 (s, 3H), 3.09 (br d, 11.5, 2H), 2.73 (t, 7.2, 2H), 2.00-1.90 (m, 4H). |
| I-19 | | 436 | (DMSO-d₆) δ 8.42 (s), 8.25 (s), 7.87 (t, 5.0), 7.10 (d, 8.6, 2H), 6.81 (d, 8.6, 2H), 6.52 (br s), 4.10 (br s, 2H), 3.56 (brd, 11.2, 2H), 3.37 (td, 7.2, 5.0, 2H), 3.18 (s, 3H), 3.09 (br d, 11.5, 2H), 2.73 (t, 7.2, 2H), 2.51 (s, 3H), 1.90-2.00 (m, 4H). |
| I-20 | | 436 | (CDCl₃) δ 8.50 (d, 4.6), 8.11 (q, 5.7), 7.18 (dd, 4.6), 7.15 (d, 8.6, 2H), 6.80 (d, 8.6, 2H), 5.60 (t, 5.6), 3.78 (br s, 2H), 3.60 (td, 6.9, 5.6, 2H), 3.47 (dd, 11.4, 2.3, 2H), 3.32 (d, 5.7, 3H), 3.02 (dd, 11.3, 1.5, 2H), 2.83 (t, 6.9, 2H), 2.60 (s, 3H), 1.94 (br s, 4H). |
| I-21 | | 490 | (CDCl₃) δ 8.51 (d, 8.5), 8.21 (q, 5.7), 7.39 (d, 8.5), 7.16 (d, 8.6, 2H), 6.79 (d, 8.6, 2H), 5.59 (t, 5.6), 3.78 (br s, 2H), 3.60 (td, 6.9, 5.6, 2H), 3.47 (dd, 11.4, 2.3, 2H), 3.39 (d, 5.7, 3H), 3.02 (dd, 11.3, 1.5, 2H), 2.83 (t, 6.9, 2H), 2.67 (s, 3H), 1.94 (br s, 4H) |
| I-22 | | 452 | (Methanol-d₄) δ 8.31 (d, 8.5), 7.54 (d, 8.5), 7.18 (d, 8.6, 2H), 6.92 (d, 8.6, 2H), 4.90 (s, 2H), 4.12 (br s, 2H), 3.63 (dd, 12.8, 2.5, 2H), 3.50 (t, 7.5, 2H), 3.24 (s, 3H), 3.06 (br d, 12.3, 2H), 2.81 (t, 7.5, 2H), 2.15-2.07 (m, 4H). |
| I-23 | | 450 | (CDCl₃) δ 8.31 (d, 8.5), 8.02 (t, 5.6), 7.15 (d, 8.6, 2H), 7.10 (d, 8.5), 6.80 (d, 8.6, 2H), 5.59 (t, 5.6), 3.78 (br s, 2H), 3.64-3.58 (m, 4H), 3.47 (dd, 11.4, 2.3, 2H), 3.02 (dd, 11.3, 1.5, 2H), 2.83 (t, 6.9, 2H), 2.67 (s, 3H), 1.94 (br s, 4H), 1.37 (t, 7.5, 3H). |

TABLE 6-continued

| No. | Structural formulas | [M + H]⁺ | ¹H NMR 400 MHz [(solvent) δ (mult., J in Hz, Integ.)]* |
|---|---|---|---|
| I-24 | | 464 | (CDCl₃) δ 8.32 (d, 8.5), 7.98 (t, 5.7), 7.15 (d, 8.6, 2H), 7.10 (d, 8.5), 6.80 (d, 8.6, 2H), 5.59 (t, 5.6, 2H), 3.78 (br s, 2H), 3.60 (td, 6.9, 5.6, 2H), 3.49-3.40 (m, 4H), 3.02 (dd, 11.3, 1.5, 2H), 2.83 (t, 6.9, 2H), 2.67 (s, 3H), 1.94 (br s, 4H), 1.73 (m, 2H), 0.99 (t, 7.5, 3H). |
| I-25 | | 493 | (CDCl₃) δ 8.32 (d, 8.5), 8.28 (t, 5.7), 7.15 (d, 8.6, 2H), 7.10 (d, 8.5), 6.80 (d, 8.6, 2H), 5.59 (t, 5.6, 2H), 3.78 (br s, 2H), 3.72 (m, 2H), 3.60 (td, 6.9, 5.6, 2H), 3.47 (dd, 11.4, 2.3, 2H), 3.02 (dd, 11.3, 1.5, 2H), 2.83 (t, 6.9, 2H), 2.73 (t, 7.2, 2H), 2.65 (s, 3H), 2.27 (s, 6H), 1.94 (br s, 4H). |
| I-26 | | 450 | (CDCl₃) δ 8.10 (q, 5.7), 7.15 (d, 8.6, 2H), 6.80 (d, 8.6, 2H), 6.84 (s), 5.59 (t, 5.6), 3.78 (br s, 2H), 3.60 (td, 6.9, 5.6, 2H), 3.47 (dd, 11.4, 2.3, 2H), 3.32 (d, 5.7, 3H), 3.02 (dd, 11.3, 1.5, 2H), 2.83 (t, 6.9, 2H), 2.64 (s, 3H), 2.56 (s, 3H), 1.94 (br s, 4H). |
| I-27 | | 504 | (DMSO-d₆) δ 7.91 (t, 5.0), 7.75 (br s), 7.10 (d, 8.6, 2H), 6.84 (d, 8.6, 2H), 6.52 (br s), 4.10 (br s, 2H), 3.56 (br d, 11.2, 2H), 3.37 (td, 7.2, 5.0, 2H), 3.18 (s, 3H), 3.09 (br d, 11.5, 2H), 2.73 (t, 7.2, 2H), 2.64 (s, 3H), 1.90-2.00 (m, 4H). |
| I-28 | | 486 | (DMSO-d₆) δ 7.98 (t, 57), 7.85 (t, 5.2), 7.65 (br s), 7.10 (d, 8.6, 2H), 6.80 (d, 8.6, 2H), 6.52 (br s), 4.10 (br s, 2H), 3.56 (br d, 11.2, 2H), 3.37 (td, 7.2, 5.0, 2H), 3.18 (s, 3H), 3.09 (br d, 11.5, 2H), 2.73 (t, 7.2, 2H), 2.63 (s, 3H), 1.90-2.00 (m, 4H). |
| I-29 | | 454 | (CDCl₃) δ 8.48 (d, 10.8), 8.11 (q, 5.7), 7.15 (d, 8.6, 2H), 6.80 (d, 8.6, 2H), 6.84 (s), 5.59 (t, 5.6), 3.78 (br s, 2H), 3.60 (td, 6.9, 5.6, 2H), 3.47 (dd, 11.4, 2.3, 2H), 3.32 (d, 5.7, 3H), 3.02 (dd, 11.3, 1.5, 2H), 2.83 (t, 6.9, 2H), 2.58 (s, 3H), 1.94 (br s, 4H). |
| I-30 | | 450 | (DMSO-d₆) δ 8.38 (s), 7.87 (t, 5.0), 7.10 (d, 8.6, 2H), 6.84 (d, 8.6, 2H), 6.52 (brs), 4.10 (br s, 2H), 3.56 (br d, 11.2, 2H), 3.37 (td, 7.2, 5.0, 2H), 3.18 (s, 3H), 3.09 (br d, 11.5, 2H), 2.73 (t, 7.2, 2H), 2.52 (s, 3H), 2.34 (s, 3H), 1.90-2.00 (m, 4H) |
| I-31 | | 464 | (DMSO-d₆) δ 8.55 (br s), 8.37 (s), 7.87 (t, 5.0), 7.10 (d, 8.6, 2H), 6.84 (d, 8.6, 2H), 4.09 (br s, 2H), 3.55 (br d, 11.0, 2H), 3.37 (td, 7.2, 5.0, 2H), 3.19 (s, 3H), 3.10 (br d, 11.6, 2H), 2.88 (q, 7.5, 2H), 2.73 (t, 7.2, 2H), 2.41 (s, 3H), 1.90-2.00 (m, 4H), 1.25 (t, 7.5, 3H). |

TABLE 6-continued

| No. | Structural formulas | [M + H]⁺ | ¹H NMR 400 MHz [(solvent) δ (mult., J in Hz, Integ.)]* |
|---|---|---|---|
| I-32 | | 532 | (DMSO-d$_6$) δ 8.48 (br s), 7.87 (t, 5.0), 7.10 (d, 8.6, 2H), 6.84 (d, 8.6), 4.09 (br s, 2H), 3.55 (br d, 11.0, 2H), 3.37 (td, 7.2, 5.0, 2H), 3.31 (s, 3H), 3.10 (br d, 11.6, 2H), 2.88 (q, 7.5, 2H), 2.73 (t, 7.2, 2H), 2.52 (s, 3H), 1.90-2.00 (m, 4H), 1.25 (t, 7.5, 3H). |
| I-33 | | 450 | (DMSO-d$_6$) δ 8.30 (d, 8.4), 7.87 (t, 5.0), 7.30 (d, 8.6), 7.03-6.88 (m, 3H), 6.52 (br s), 4.10 (br s, 2H), 3.56 (br d, 11.2, 2H), 3.37 (td, 7.2, 5.0, 2H), 3.18 (s, 3H), 3.09 (br d, 11.5, 2H), 2.73 (t, 7.2, 2H), 2.55 (s, 3H), 2.22 (s, 3H), 1.90-2.00 (m, 4H). |
| I-34 | | 464 | (DMSO-d$_6$) δ 8.30 (d, 8.4), 7.82 (t, 5.0), 7.29 (d, 8.6), 7.03-6.88 (m, 3H), 6.52 (br s), 4.10 (br s, 2H), 3.56 (br d, 11.2, 2H), 3.37 (td, 7.2, 5.0, 2H), 3.20 (s, 3H), 3.09 (br d, 11.5, 2H), 2.73 (t, 7.2, 2H), 2.63 (q, 5.4, 2H), 2.55 (s, 3H), 1.90-2.00 (m, 4H), 1.19 (t, 5.4, 3H). |
| I-35 | | 476 | (DMSO-d$_6$) δ 8.30 (d, 8.4), 7.87 (t, 5.0), 7.30 (d, 8.6), 7.03-6.88 (m, 2H), 6.60 (br s), 6.52 (br s), 4.10 (br s, 2H), 3.56 (br d, 11.2, 2H), 3.37 (td, 7.2, 5.0, 2H), 3.18 (s, 3H), 3.09 (br d, 11.5, 2H), 2.73 (t, 7.2, 2H), 2.59 (s, 3H), 2.22 (m), 1.90-2.00 (m, 4H), 0.93 (m, 2H), 0.67 (m, 2H). |
| I-36 | | 466 | (CDCl$_3$) δ 8.32 (d, 8.5), 8.06 (q, 5.7), 7.11 (d, 8.5), 6.78 (d, 8.6), 6.71 (br s), 6.57 (br d, 8.7), 5.59 (t, 5.6), 3.84 (s, 3H), 3.78 (br s, 2H), 3.60 (td, 6.9, 5.6, 2H), 3.47 (dd, 11.4, 2.3, 2H), 3.32 (d, 5.7, 3H), 3.02 (dd, 11.3, 1.5, 2H), 2.83 (t, 6.9, 2H), 2.67 (s, 3H), 1.94 (br s, 4H). |
| I-37 | | 461 | (CDCl$_3$) δ 8.30 (d, 8.5), 8.10 (q, 5.7), 7.53 (br s), 7.12 (d, 8.5), 7.17 (br d, 8.7), 6.91 (d, 8.5), 5.59 (t, 5.6), 3.83 (s, 3H), 3.78 (br s, 2H), 3.60 (td, 6.9, 5.6, 2H), 3.47 (dd, 11.4, 2.3, 2H), 3.32 (d, 5.7, 3H), 3.02 (dd, 11.3, 1.5, 2H), 2.83 (t, 6.9, 2H), 2.67 (s, 3H), 1.94 (br s, 4H). |
| I-38 | | 470 | (CDCl$_3$) δ 8.29 (d, 8.5), 8.10 (q, 5.7), 7.18-7.02 (m, 4H), 5.59 (t, 5.6), 3.78 (br s, 2H), 3.60 (td, 6.9, 5.6, 2H), 3.47 (dd, 11.4, 2.3, 2H), 3.32 (d, 5.7, 3H), 3.02 (dd, 11.3, 1.5, 2H), 2.83 (t, 6.9, 2H), 2.66 (s, 3H), 1.94 (br s, 4H). |
| I-39 | | 454 | (DMSO-d$_6$) δ 8.30 (d, 8.4), 7.87 (t, 5.0), 7.30 (d, 8.6), 7.24-7.12 (m, 3H), 6.52 (br s), 4.10 (br s, 2H), 3.56 (br d, 11.2, 2H), 3.37 (td, 7.2, 5.0, 2H), 3.18 (s, 3H), 3.09 (br d, 11.5, 2H), 2.73 (t, 7.2, 2H), 2.60 (s, 3H), 1.90-2.00 (m, 4H). |

TABLE 6-continued

| No. | Structural formulas | [M + H]+ | ¹H NMR 400 MHz [(solvent) (mult., J in Hz, Integ.)]* |
|---|---|---|---|
| I-40 | | 454 | (DMSO-d₆) δ 8.30 (d, 8.4), 7.87 (t, 5.0), 7.30 (d, 8.6), 7.15 (t-like, 8.9), 6.78-6.73 (m, 2H), 6.52 (br s), 4.10 (br s, 2H), 3.56 (br d, 11.2, 2H), 3.37 (td, 7.2, 5.0, 2H), 3.18 (s, 3H), 3.09 (br d, 11.5, 2H), 2.73 (t, 7.2, 2H), 2.55 (s, 3H), 1.90-2.00 (m, 4H). |
| I-41 | | 504 | (DMSO-d₆) δ 8.30 (d, 8.4), 7.87 (t, 5.0), 7.30 (d, 8.6), 7.52-7.35 (m, 3H), 6.52 (br s), 4.10 (br s, 2H), 3.56 (br d, 11.2, 2H), 3.37 (td, 7.2, 5.0, 2H), 3.18 (s, 3H), 3.09 (br d, 11.5, 2H), 2.73 (t, 7.2, 2H), 2.60 (s, 3H), 1.90-2.00 (m, 4H). |
| I-42 | | 472 | (DMSO-d₆) δ 8.30 (d, 8.5), 7.87 (t, 5.0), 7.30 (d, 8.5), 7.12 (m), 6.79 (m), 6.52 (br s), 4.10 (br s, 2H), 3.56 (br d, 11.2, 2H), 3.37 (td, 7.2, 5.0, 2H), 3.18 (s, 3H), 3.09 (br d, 11.5, 2H), 2.73 (t, 7.2, 2H), 2.58 (s, 3H), 1.90-2.00 (m, 4H). |
| I-43 | | 472 | (DMSO-d₆) δ 8.29 (d, 8.4), 7.87 (t, 5.0), 7.30 (d, 8.6), 6.91 (d, 10.4, 2H), 6.52 (br s), 4.10 (br s, 2H), 3.56 (br d, 11.2, 2H), 3.37 (td, 7.2, 5.0, 2H), 3.18 (s, 3H), 3.09 (br d, 11.5, 2H), 2.73 (t, 7.2, 2H), 2.60 (s, 3H), 1.90-2.00 (m, 4H). |
| I-44 | | 488 | (DMSO-d₆) δ 8.34 (d, 8.4), 7.81 (t, 5.0), 7.30 (d, 8.6), 7.22 (br s), 7.08 (d, 12.4), 6.52 (br s), 4.10 (br s, 2H), 3.56 (br d, 11.2, 2H), 3.39 (td, 7.2, 5.0, 2H), 3.18 (s, 3H), 3.09 (br d, 11.5, 2H), 2.73 (t, 7.2, 2H), 2.60 (s, 3H), 1.90-2.00 (m, 4H). |
| I-45 | | 472 | (DMSO-d₆) δ 8.29 (d, 8.4), 7.87 (t, 5.0), 7.30 (d, 8.6), 6.55-6.48 (m, 3H), 4.10 (br s, 2H), 3.56 (br d, 11.2, 2H), 3.37 (td, 7.2, 5.0, 2H), 3.18 (s, 3H), 3.09 (br d, 11.5, 2H), 2.75 (t, 7.2, 2H), 2.58 (s, 3H), 1.90-2.00 (m, 4H). |
| I-46 | | 472 | (DMSO-d₆) δ 8.30 (d, 8.4), 7.87 (t, 5.0), 7.29 (d, 8.6), 7.01 (dd, 13.3, 8.1), 6.68 (dd, 12.5, 8.1), 6.52 (br s), 4.10 (br s, 2H), 3.56 (br d, 11.2, 2H), 3.37 (td, 7.2, 5.0, 2H), 3.18 (s, 3H), 3.09 (br d, 11.5, 2H), 2.73 (t, 7.2, 2H), 2.59 (s, 3H), 1.90-2.00 (m, 4H). |

TABLE 6-continued

| No. | Structural formulas | [M + H]+ | ¹H NMR 400 MHz [(solvent) δ (mult., J in Hz, Integ.)]* |
|---|---|---|---|
| I-47 | 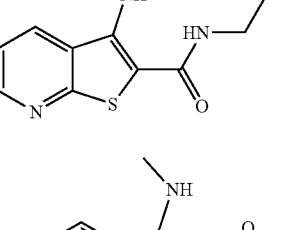 | 490 | (DMSO-d₆) δ 8.29 (d, 8.4), 7.87 (t, 5.0), 7.30 (d, 8.6), 6.82 (dd, 7.9, 4.9), 6.52 (br s), 4.10 (br s, 2H), 3.56 (br d, 11.2, 2H), 3.37 (td, 7.2, 5.0, 2H), 3.18 (s, 3H), 3.09 (br d, 11.5, 2H), 2.73 (t, 7.2, 2H), 2.58 (s, 3H), 1.90-2.00 (m, 4H). |
| I-48 | 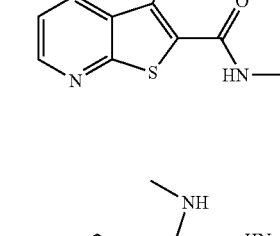 | 351 | (CDCl₃) δ 8.58 (dd, 4.6, 1.4), 8.40 (dd, 8.3, 4.6), 8.17 (br s), 7.66 (br d, 7.9), 7.38 (br d, 8.1), 7.24 (dd, 8.4, 4.6), 7.22 (br t, 7.3), 7.14 (br t, 7.2), 7.09 (d, 2.0), 5.69 (t, 4.8), 3.73 (td, 6.7, 5.0, 2H), 3.31 (s, 3H), 3.08 (t, 6.7, 2H). |
| I-49 | 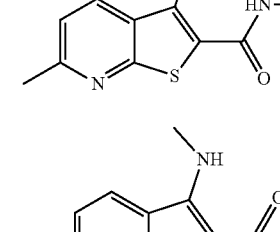 | 365 | (CDCl₃) δ 8.30 (d, 8.5), 8.17 (br s), 7.66 (br d, 7.9), 7.38 (br d, 8.1), 7.12 (d, 8.4), 7.22 (br t, 7.3), 7.14 (br t, 7.2), 7.09 (d, 2.0), 5.69 (t, 4.8), 3.73 (td, 6.7, 5.0, 2H), 3.31 (s, 3H), 3.08 (t, 6.7, 2H), 2.65 (s, 3H). |
| I-50 | 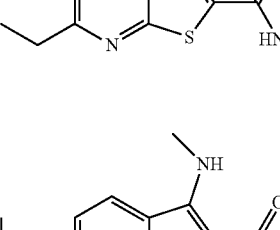 | 379 | (CDCl₃) δ 8.35 (d, 8.5), 8.15 (br s), 7.66 (br d, 7.9), 7.38 (br d, 8.1), 7.15 (d, 8.4), 7.22 (br t, 7.3), 7.14 (br t, 7.2), 7.09 (d, 2.0), 5.69 (t, 4.8), 3.73 (td, 6.7, 5.0, 2H), 3.31 (s, 3H), 3.08 (t, 6.7, 2H), 2.94 (q, 7.5, 2H), 1.25 (t, 7.5, 3H). |
| I-51 | 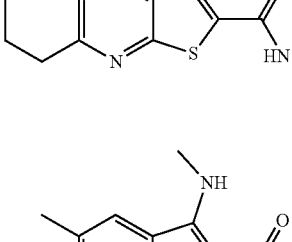 | 393 | (CDCl₃) δ 8.38 (d, 8.5), 8.15 (br s), 7.66 (br d, 7.9), 7.38 (br d, 8.1), 7.14 (d, 8.4), 7.22 (br t, 7.3), 7.14 (br t, 7.2), 7.09 (d, 2.0), 5.69 (t, 4.8), 3.73 (td, 6.7, 5.0, 2H), 3.31 (s, 3H), 3.08 (t, 6.7, 2H), 2.89 (t, 7.5, 2H), 1.85 (sept, 7.5, 2H), 0.98 (t, 7.5, 3H). |
| I-52 | 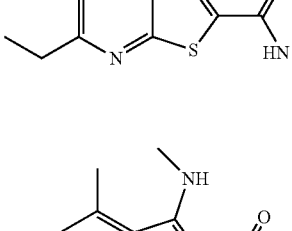 | 393 | (CDCl₃) δ 8.38 (s), 8.18 (br s), 7.66 (br d, 7.9), 7.38 (br d, 8.1), 7.22 (br t, 7.3), 7.14 (br t, 7.2), 7.09 (d, 2.0), 5.69 (t, 4.8), 3.73 (td, 6.7, 5.0, 2H), 3.30 (s, 3H), 3.08 (t, 6.7, 2H), 2.88 (q, 7.5, 2H), 2.41 (s, 3H), 1.26 (t, 7.5, 3H). |
| I-53 | 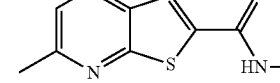 | 379 | (CDCl₃) δ 8.17 (br s), 7.66 (br d, 7.9), 7.38 (br d, 8.1), 7.22 (br t, 7.3), 7.14 (br t, 7.2), 7.09 (d, 2.0), 6.84 (s), 5.69 (t, 4.8), 3.73 (td, 6.7, 5.0, 2H), 3.32 (s, 3H), 3.08 (t, 6.7, 2H), 2.64 s, 3H), 2.56 (s, 3H). |

TABLE 6-continued

| No. | Structural formulas | [M + H]+ | ¹H NMR 400 MHz [(solvent) δ (mult., J in Hz, Integ.)]* |
|---|---|---|---|
| I-54 | | 419 | (CDCl₃) δ 8.22 (d, 8.5), 8.12 (q, 5.7), 7.66 (br d, 7.9), 7.38 (br d, 8.1), 7.24 (dd, 8.4, 4.6), 7.22 (br t, 7.3), 7.21 (d, 8.5), 7.14 (br t, 7.2), 7.09 (d, 2.0), 5.69 (t, 4.8), 3.73 (td, 6.7, 5.0, 2H), 3.31 (s, 3H), 3.08 (t, 6.7, 2H). |
| I-55 | | 409 | (CDCl₃) δ 8.30 (d, 8.5), 8.17 (br s), 7.66 (br d, 7.9), 7.38 (br d, 8.1), 7.12 (d, 8.4), 7.22 (br t, 7.3), 7.14 (br t, 7.2), 7.09 (d, 2.0), 5.81 (d, 5.2), 4.26 (m), 3.54 dd (11.5, 8.6), 3.42 dd (11.5, 7.3), 3.31 (s, 3H), 3.25 (s, 3H), 3.15-3.11 (m, 2H), 2.67 (s, 3H). |
| I-56 | | 366 | (CDCl₃) δ 8.30 (d, 8.3), 8.12 (q, 5.0), 7.83-7.86 (m, 2H), 7.59 (br d, 8.1), 7.11 (d, 8.3), 7.39 (br t, 7.3), 7.31 (br t, 7.2), 5.80 (t, 4.8), 3.76 (td, 6.7, 5.0, 2H), 3.31 (d, 5.5, 3H), 2.88 (t, 6.7, 2H), 2.65 (s, 3H). |
| I-57 | | 382 | (CDCl₃) δ 8.31 (d, 8.2), 8.11 (br s), 7.93 (br d, 7.9), 7.75 (br d, 8.1), 7.58 (d, 2.0), 7.11 (d, 8.2), 7.53 (br t, 7.3), 7.44(br t, 7.2), 5.69 (t, 4.8), 3.76 (td, 6.7, 5.0, 2H), 3.31 (br s, 3H), 2.92 (t, 6.7, 2H), 2.67 (s, 3H). |
| I-58 | | 386 | (CDCl₃) δ 8.30 (d, 8.5), 8.10 (q, 5.3), 6.79 (d, 8.0), 6.74 (d, 1.8), 6.60 (dd, 8.0, 1.8), 7.12 (d, 8.4), 5.69 (t, 4.8), 3.83 (s, 3H), 3.75 (s, 3H), 3.39 (td, 6.7, 5.0, 2H), 3.31 (d, 5.5, 3H), 2.78 (t, 6.7, 2H), 2.65 (s, 3H). |
| I-59 | | 482 | (CDCl₃) δ 8.22 (q, 5.3), 6.82 (d, 8.0), 6.80 (br s), 6.75 (dd, 8.0, 1.8), 5.70 (t, 5.1), 3.82 (s, 3H), 3.78 (s, 3H), 3.39 (td, 6.7, 5.0, 2H), 3.31 (d, 5.5, 3H), 2.80-2.74 (m, 4H), 2.64 (s, 3H), 1.29 (t, 7.5, 3H). |
| I-60 | | 400 | (CDCl₃) δ 8.15 (q, 5.3), 7.34 (s), 6.81 (br s, 2H), 6.74 (dd, 8.0, 1.8), 5.70 (t, 5.1), 3.82 (s, 3H), 3.78 (s, 3H), 3.39 (td, 6.7, 5.1, 2H), 3.14 (d, 5.5, 3H), 2.80-2.74 (m, 4H), 2.67 (s, 3H), 2.55 (s, 3H). |
| I-61 | | 418 | (CDCl₃) δ 8.30 (d, 8.5), 8.10 (q, 5.5), 7.82 (d, 8.3, 2H), 7.09 (d, 8.3, 2H), 7.12 (d, 8.4), 5.69 (d, 4.8), 4.18 (m), 3.31 (d, 5.5, 3H), 2.92 (dd, 11.5, 7.8), 2.67 (dd, 11.5, 6.5), 2.65 (s, 3H), 1.15 (d, 6.7, 3H). |

TABLE 6-continued

| No. | Structural formulas | [M + H]+ | ¹H NMR 400 MHz [(solvent) δ (mult., J in Hz, Integ.)]* |
|---|---|---|---|
| I-62 | | 418 | (CDCl₃) δ 8.30 (d, 8.5), 8.11 (q, 5.4), 7.82 (d, 8.3, 2H), 7.09 (d, 8.3, 2H), 7.12 (d, 8.4), 5.69 (d, 5.0), 4.18 (m), 3.31 (d, 5.5, 3H), 2.92 (dd, 11.5, 7.8), 2.67 (dd, 11.5, 6.5), 2.65 (s, 3H), 1.15 (d, 6.7, 3H). |
| I-63 | | 450 | (CDCl₃) δ 8.30 (d, 8.5), 8.11 (q, 5.5), 7.15 (d, 8.6, 2H), 6.80 (d, 8.6, 2H), 7.12 (d, 8.5), 5.69 (d, 5.1), 4.19 (m), 3.78 (br s, 2H), 3.47 (dd, 11.4, 2.3, 2H), 3.31 (d, 5.8, 3H), 3.02 (dd, 11.3, 1.5, 2H), 2.92 (dd, 11.5, 7.6), 2.67 (dd, 11.5, 6.7), 2.66 (s, 3H), 1.94 (m, 4H). 1.14 (d, 6.7, 3H). |
| I-64 | | 450 | (CDCl₃) δ 8.30 (d, 8.5), 8.11 (q, 5.5), 7.15 (d, 8.6, 2H), 7.12 (d, 8.5), 6.80 (d, 8.6, 2H), 5.69 (d, 5.1), 4.19 (m), 3.78 (br s, 2H), 3.47 (dd, 11.4, 2.3, 2H), 3.31 (d, 5.8, 3H), 3.02 (dd, 11.3, 1.5, 2H), 2.92 (dd, 11.5, 7.6), 2.67 (dd, 11.5, 6.7), 2.66 (s, 3H), 1.94 (m, 4H). 1.14 (d, 6.7, 3H). |
| I-65 | | 480 | (CDCl₃) δ 8.30 (d, 8.5), 8.12 (q, 5.3), 7.15 (d, 8.6, 2H), 6.80 (d, 8.6, 2H), 5.69 (d, 7.0), 4.26 (m), 3.78 (br s, 2H), 3.69 (dd, 10.8, 6.8), 3.47 (dd, 11.4, 2.3, 2H), 3.44 (dd, 10.8, 8.4), 3.30 (d, 5.9, 3H), 3.23 (s, 3H), 3.02 (dd, 11.3, 1.5, 2H), 2.95 (dd, 11.5, 7.6), 2.65 (dd, 11.5, 6.7), 2.66 (s, 3H), 1.94 (m, 4H). |
| I-66 | | 504 | (CDCl₃) δ 8.30 (d, 8.5), 8.12 (q, 5.3), 7.15 (d, 8.6, 2H), 7.12 (d, 8.5), 6.80 (d, 8.6, 2H), 5.74 (d, 7.0), 4.31 (m), 3.78 (br s, 2H), 3.47 (dd, 11.4, 2.3, 2H), 3.30 (d, 5.9, 3H), 3.05-2.98 (m, 3H), 2.72 (dd, 11.5, 7.0), 2.66 (s, 3H), 1.94 (m, 4H). |
| I-67 | | 450 | (CDCl₃) δ 8.30 (d, 8.5), 8.15 (q, 5.7), 7.25 (d, 8.6, 2H), 7.12 (d, 8.5), 6.86 (d, 8.6, 2H), 5.67 (t, 5.6), 3.78 (br s, 2H), 3.66 (m, 2H), 3.47 (dd, 11.4, 2.3, 2H), 3.32 (d, 5.7, 3H), 3.02 (dd, 11.3, 1.5, 2H), 2.92 (m), 2.67 (s, 3H), 1.25 (d, 6.8, 3H), 1.94 (br s, 4H). |

TABLE 6-continued

| No. | Structural formulas | [M + H]+ | 1H NMR 400 MHz [(solvent) δ (mult., J in Hz, Integ.)]* |
|---|---|---|---|
| I-68 | | 450 | (CDCl3) δ 8.30 (d, 8.5), 8.15 (q, 5.7), 7.25 (d, 8.6, 2H), 7.12 (d, 8.5), 6.86 (d, 8.6, 2H), 5.67 (t, 5.6), 3.78 (br s, 2H), 3.66 (m, 2H), 3.47 (dd, 11.4, 2.3, 2H), 3.32 (d, 5.7, 3H), 3.02 (dd, 11.3, 1.5, 2H), 2.92 (m), 2.67 (s, 3H), 1.25 (d, 6.8, 3H), 1.94 (br s, 4H). |
| I-69 | | 454 | (CDCl3) δ 8.30 (d, 8.5), 8.15 (q, 5.7), 7.25 (d, 8.6, 2H), 7.11 (d, 8.5), 6.86 (d, 8.6, 2H), 5.76 (t, 5.6), 3.78 (br s, 2H), 3.73 (m, 2H), 3.47 (dd, 11.4, 2.3, 2H), 3.32 (d, 5.7, 3H), 3.05-2.99 (m, 3H), 2.67 (s, 3H), 1.94 (br s, 4H). |
| I-70 | | 423 | (CDCl3) δ 8.58 (d, 2.3), 8.51 (d, 2.3), 7.83 (q, 5.1), 7.13 (d, 8.6, 2H), 6.79 (d, 8.6, 2H), 5.69 (t, 5.6), 3.72 (br s, 2H), 3.62 (dt, 5.6, 6.9, 2H), 3.50 (d, 5.1, 3H), 3.44 (dd, 11.4, 2.3, 2H), 2.97 (br d 11.5, 2H), 2.83 (t, 6.9, 2H), 1.90 (m, 4H). |
| I-71 | | 437 | (CDCl3) δ 8.66 (s), 7.85 (q, 5.1), 7.14 (d, 8.6, 2H), 6.79 (d, 8.6, 2H), 5.69 (t, 5.6), 3.72 (br s, 2H), 3.62 (dt, 5.6, 6.9, 2H), 3.50 (d, 5.6, 3H), 3.44 (dd, 11.4, 2.3, 2H), 2.65 (s, 3H), 2.97 (br d, 11.5), 2.83 (t, 6.9, 2H), 1.90 (br s, 4H). |
| I-72 | | 451 | (CDCl3) δ 8.68 (s), 7.85 (q, 5.1), 7.14 (d, 8.6, 2H), 6.79 (d, 8.6, 2H), 5.71 (t, 5.6), 3.74 (br s, 2H), 3.62 (dt, 5.6, 6.9, 2H), 3.50 (d, 5.6, 3H), 3.44 (dd, 11.4, 2.3, 2H), 2.97 (br d, 11.5, 2H), 2.87-2.80 (m, 4H), 1.90 (br s, 4H), 1.41 (d, 7.3, 3H). |
| I-73 | | 465 | (CDCl3) δ 8.65 (s), 7.84 (q, 5.1), 7.14 (d, 8.6, 2H), 6.79 (d, 8.6, 2H), 5.69 (t, 5.6), 3.72 (br s, 2H), 3.62 (dt, 5.6, 6.9, 2H), 3.50 (d, 5.6, 3H), 3.44 (dd, 11.4, 2.3, 2H), 3.15 (hept, 6.8), 2.97 (br d, 11.5), 2.83 (t, 6.9, 2H), 1.90 (br s, 4H), 1.43 (d, 6.8, 6H). |
| I-74 | | 465 | (CDCl3) δ 7.15 (d, 8.6, 2H), 6.80 (d, 8.6, 2H), 5.70 (t, 5.6), 3.72 (br s, 2H), 3.62 (dt, 5.6, 6.9, 2H), 3.44 (dd, 11.4, 2.3, 2H), 2.98 (q, 7.2, 2H), 2.97 (br d, 11.5), 2.83 (t, 6.9, 2H), 2.60 (s, 3H), 1.90 (br s, 4H), 1.41 (t, 7.2, 3H). |
| I-75 | | 471 | (CDCl3) δ 8.66 (s), 7.83 (q, 5.1), 7.00 (d, 7.5), 6.94 (s), 6.86 (d, 7.6), 5.70 (t, 5.6), 3.75 (br s, 2H), 3.62 (dt, 5.6, 6.9, 2H), 3.50 (d, 5.6, 3H), 3.44 (dd, 11.4, 2.3, 2H), 2.97 (br d, 11.5), 2.83 (t, 6.9, 2H), 2.65 (s, 3H), 1.90 (br s, 4H). |

TABLE 6-continued

| No. | Structural formulas | [M + H]⁺ | ¹H NMR 400 MHz [(solvent) δ (mult., J in Hz, Integ.)]* |
|---|---|---|---|
| I-76 | | 455 | (CDCl₃) δ 8.66 (s), 7.83 (q, 5.1), 6.94-6.89 (m, 2H), 6.87 (dd, 7.5, 4.8), 5.69 (t, 5.6), 3.75 (br s, 2H), 3.62 (dt, 5.6, 6.9, 2H), 3.50 (d, 5.6, 3H), 3.44 (dd, 11.4, 2.3, 2H), 2.97 (br d, 11.5), 2.83 (t, 6.9, 2H), 2.65 (s, 3H), 1.90 (br s, 4H). |
| I-77 | | 455 | (CDCl₃) δ 8.66 (s), 7.83 (q, 5.1), 7.07 (dd, 7.5, 5.0), 6.77 (dd, 7.5, 1.4), 6.33 (dd, 7.9, 2.5), 5.69 (t, 5.6), 3.72 (br s, 2H), 3.62 (dt, 5.6, 6.9, 2H), 3.50 (d, 5.6, 3H), 3.44 (dd, 11.4, 2.3, 2H), 2.97 (br d, 11.5), 2.83 (t, 6.9, 2H), 2.64 (s, 3H), 1.90 (br s, 4H). |
| I-78 | | 473 | (CDCl₃) δ 8.65 (s), 7.87 (t, 5.0), 7.05-6.98 (m), 6.71-6.64 (m), 6.52 (br s), 4.10 (br s, 2H), 3.56 (br d, 11.2, 2H), 3.37 (td, 7.2, 5.0, 2H), 3.18 (s, 3H), 3.09 (br d, 11.5, 2H), 2.75 (t, 7.2, 2H), 1.90-2.00 (m, 4H). |
| I-79 | | 487 | (Methanol-d₄) δ 8.56 (s), 7.05-7.11 (m), 6.65-6.73 (m), 4.09 (br s, 2H), 3.64 (dd, 12.8, 2.5, 2H), 3.55-3.49 (m, 2H), 3.25 (s, 3H), 3.12-3.06 (m, 3H), 2.15-2.07 (m, 4H), 1.28 (d, 6.8, 3H). |
| I-80 | | 447 | (Methanol-d₄) δ 8.49 (d, 8.5), 7.82 (d, 8.5), 7.40 (m), 7.17 (d, 8.6, 2H), 6.89 (d, 8.6, 2H), 4.12 (br s, 2H), 3.63 (dd, 12.8, 2.5, 2H), 3.50 (t, 7.5, 2H), 3.24 (s, 3H), 3.06 (br d, 12.3, 2H), 2.81 (t, 7.5, 2H), 2.07-2.15 (m, 4H). |
| I-81 | | 475 | (CDCl₃) δ 8.22 (s), 7.83 (q, 5.1), 7.07 (dd, 7.5, 5.0), 6.77 (dd, 7.5, 1.4), 6.33 (dd, 7.9, 2.5), 5.69 (t, 5.6), 3.72 (br s, 2H), 3.62 (dt, 5.6, 6.9, 2H), 3.50 (d, 5.6, 3H), 3.44 (dd, 11.4, 2.3, 2H), 2.97 (br d, 11.5), 2.83 (t, 6.9, 2H), 1.90 (br s, 4H). |
| I-82 | | 456 | (DMSO-d₆) δ 8.47 (d, 8.4), 7.87 (t, 5.0), 7.56 (d, 8.6), 7.10 (d, 8.6, 2H), 6.84 (d, 8.6, 2H), 6.52 (br s), 4.10 (br s, 2H), 3.56 (br d, 11.2, 2H), 3.37 (td, 7.2, 5.0, 2H), 3.18 (s, 3H), 3.09 (br d, 11.5, 2H), 2.73 (t, 7.2, 2H), 2.60 (s, 3H), 1.90-2.00 (m, 4H). |
| I-83 & I-84 | I-83 (R) I-84 (S) | 448 | (DMSO-d₆) δ 9.56 (d, 9.8), 9.52 (d, 9.8), 8.53 (d, 8.5), 8.06 (d, 6.7), 7.32 (d, 8.5), 7.06 (d, 8.3), 6.79 (d, 2.1), 6.70 (dd, 8.3, 2.1), 4.64 (m), 4.08 (s, 2H), 3.53 (dd, 13.0, 2.5, 2H), 3.18 (s, 3H), 3.12 (dd, 15.8, 7.5), 3.11 (d, 13.0, 2H), 3.08 (dd, 15.4, 7.7), 2.94 (dd, 15.8, 7.5), 2.87 (dd, 15.4, 7.5), 2.60 (s, 3H), 1.98 (m, 2H), 1.91 (m, 2H). |

TABLE 6-continued

| No. | Structural formulas | [M + H]⁺ | ¹H NMR 400 MHz [(solvent) δ (mult., J in Hz, Integ.)]* |
|---|---|---|---|
| I-85 & I-86 | I-85 (R)<br>I-86 (S) | 464 | (DMSO-d₆) δ 9.40 (s), 9.38 (s), 8.49 (d, 8.5), 7.73 (d, 7.4), 7.29 (d, 8.5), 6.95 (d, 8.5), 6.47 (dd, 8.5, 2.4), 6.31 (d, 2.4), 4.28 (m), 4.15 (dd, 10.3, 3.4), 4.08 (s, 2H), 3.83 (t, 9.8), 3.54 (dd, 10.3, 6.1, 2H), 3.17 (s, 3H), 3.05 (d, 11.7, 2H), 2.86 (d, 7.7, 2H), 2.59 (s, 3H), 2.00-1.93 (m, 2H), 1.91 (dd, 10.9, 6.5, 2H). |
| I-87 & I-88 | I-87 (R)<br>I-88 (S) | 465 | (DMSO-d₆) δ 9.52 (br s), 9.48 (br t, 9.8), 8.64 (s), 7.76 (d, 7.4), 6.95 (d, 8.5), 6.47 (dd, 8.5, 2.4), 6.31 (d, 2.4), 4.28 (m), 4.15 (dd, 10.3, 3.4), 4.08 (br s, 2H), 3.83 (t, 9.8), 3.54 (dd, 10.3, 6.1, 2H), 3.50 (s, 3H), 3.05 (d, 11.7, 2H), 2.86 (d, 7.7, 2H), 2.65 (s, 3H), 2.00-1.93 (m, 2H), 1.91 (dd, 10.9, 6.5, 2H). |
| I-89 & I-90 | I-89 (R)<br>I-90 (S) | 462 | (DMSO-d₆) δ 9.53 (d, 9.8), 9.47 (d, 9.8), 8.50 (d, 8.5), 7.80 (d, 7.7), 7.30 (d, 8.5), 6.94 (d, 8.5), 6.69 (dd, 8.5, 2.4), 6.61 (d, 2.4), 4.08 (s, 2H), 3.53 (dd, 12.2, 5.1, 2H), 3.17 (s, 3H), 3.08 (d, 12.2, 2H), 2.86 (dd, 15.8, 5.1), 2.80 (dd, 8.3, 4.3, 2H), 2.73 (dd, 15.8, 10.8), 2.60 (s, 3H), 2.00-1.94 (m, 3H), 1.91 (m, 2H), 1.75 (tt, 11.8, 8.9). |
| I-91 | | 476 | (DMSO-d₆) δ 9.55-9.50 (m, 2H), 8.49 (d, 8.4), 7.73 (d, 7.4), 7.31 (d, 8.4), 6.95 (d, 8.5), 6.47 (dd, 8.5, 2.4), 6.31 (d, 2.4), 4.28 (m), 4.15 (dd, 10.3, 3.4), 4.08 (s, 2H), 3.83 (t, 9.8), 3.54 (dd, 10.3, 6.1, 2H), 3.18 (s, 3H), 3.06 (d, 11.7, 2H), 2.90 (q, 7.5, 2H), 2.86 (d, 7.7, 2H), 2.00-1.93 (m, 2H), 1.91 (dd, 10.9, 6.5, 2H), 1.26 (t, 7.5, 3H). |
| I-92 | | 482 | (DMSO-d₆) δ 9.66 (m, 2H), 8.51 (d, 8.4), 7.71 (t, 6.1), 7.33 (d, 8.4), 7.16 (dd, 9.8, 8.8), 6.70 (dd, 16.2, 2.2), 6.64 (dd, 8.8, 2.2), 4.10 (br s 2H), 3.62 (br d, 11.4, 2H), 3.51 (br d, 6.2, 2H), 3.15 (br d, 11.5, 2H), 3.08 (s, 3H), 2.61 (s, 3H), 2.00 (m, 2H), 1.90 (m, 2H) 1.29 (s, 6H). |

*Unless otherwise specified, each shift value represents one hydrogen signal.

Example 10

Preparation of Compound I-93 (N-4-(3,8-diazabicyclo[3.2.1]octan-3-yl)phenethyl-6-amino-3-methyl-aminothiophene[2,3-b]pyridine-2-carboxamide)

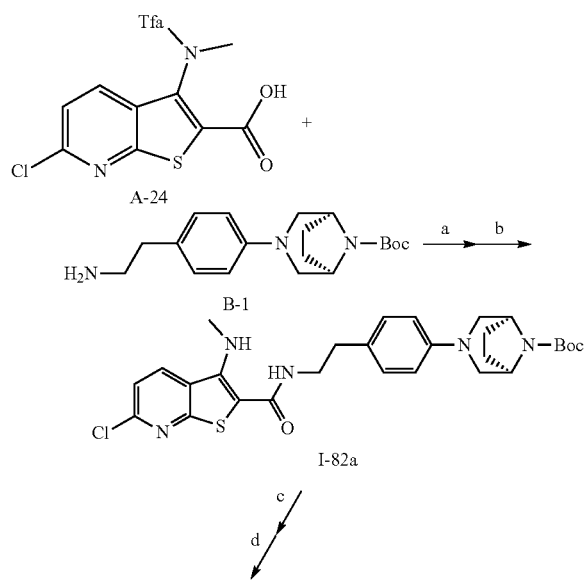

Reagents and reaction conditions are as follows:

Steps a) and b) are the same as a) and c) of Example 9.

c) To a flask (25 mL) were added I-82a (111 mg, 0.2 mmol), tert-butyl carbamate (117 mg, 1.0 mmol), $Cs_2CO_3$ (326 mg, 1.0 mmol) and 1,4-dioxane (1 mL), and the mixture was well stirred, added with X-Phos Pd (II) (39.5 mg, 0.05 mmol), bubbled with nitrogen for 2 min, and then heated to 90° C. overnight. After the reaction was completed, the reaction mixture was cooled to room temperature, and filtered to remove the solid, and the filtrate was concentrated under reduced pressure to remove the solvent. The residue was purified by column chromatography on silica gel using gradient elution (EA/PE=1:5->2:3) to give an amination product I-93a (42 mg, 33% yield) in the form of a pale yellow solid. ESI-MS: m/z 637.

d) To a reaction flask (5 mL) were added I-93a (21.2 mg, 0.033 mmol) and DCM (1 mL), followed by addition of TFA (100 µL, 1.535 mmol), and the mixture was heated to 40° C. and reacted overnight. After the reaction was completed, the reaction mixture was concentrated under reduced pressure to remove DCM and TFA to give 1-93 (7.92 mg, 55% yield). ESI-MS: m/z 437 ([M+H]$^+$); $^1$H NMR (400 MHz, DMSO-d$_6$) δ 7.91 (d, J=8.4 Hz), 7.87 (t, J=5.0 Hz), 7.10 (d, J=8.6 Hz, 2H), 6.84 (d, J=8.6 Hz, 2H), 6.55 (br s, 2H), 6.52 (br s), 6.45 (d, J=8.6 Hz), 4.10 (br s, 2H), 3.56 (br d, J=11.2 Hz, 2H), 3.37 (td, J=7.2, 5.0 Hz, 2H), 3.18 (s, 3H), 3.09 (br d, J=11.5 Hz, 2H), 2.73 (t, J=7.2 Hz, 2H), 2.60 (s, 3H), 1.90-2.00 (m, 4H).

Example compounds I-94 and I-95 in Table 7 below were synthesized according to the reagents and reaction conditions described above for Example 10 (Compound I-93) using appropriate synthesis precursors.

TABLE 7

| No. | Structural formulas | [M + H]$^+$ | $^1$H NMR 400 MHz [(solvent) □ (mult., J in Hz, Integ.)] |
|---|---|---|---|
| I-94 | | 451 | (DMSO-d$_6$) δ 7.93 (d, 8.4), 7.87 (t, 5.0), 7.66 (br s), 7.10 (d, 8.6, 2H), 6.84 (d, 8.6, 2H), 6.52 (br s), 6.70 (d, 8.6), 4.10 (br s, 2H), 3.56 (br d, 11.2, 2H), 3.37 (td, 7.2, 5.0, 2H), 3.18 (s, 3H), 3.09 (br d, 11.5, 2H), 2.85 (s, 3H), 2.73 (t, 7.2, 2H), 2.60 (s, 3H), 1.90-2.00 (m, 4H). |
| I-95 | | 487 | (DMSO-d$_6$) δ 7.56 (m), 7.51 (t, 56), 7.87 (t, 5.0), 7.10 (d, 8.6, 2H), 6.84 (d, 8.6, 2H), 6.72 (br s, 3H), 4.10 (br s, 2H), 3.56 (br d, 11.2, 2H), 3.37 (td, 7.2, 5.0, 2H), 3.18 (s, 3H), 3.09 (br d, 11.5, 2H), 2.73 (t, 7.2, 2H), 1.90-2.00 (m, 4H) |

*Unless otherwise specified, each shift value represents one hydrogen signal.

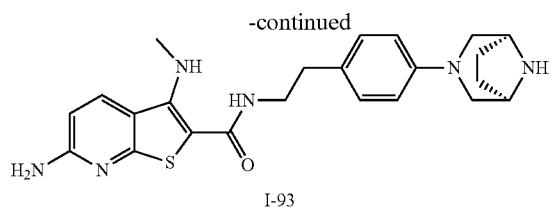

I-93

Example 11

USP28 activity was measured using ubiquitin-rhodamine 110 method.

Purified USP28 and the ubiquitin-rhodamine 110 substrate used for measuring DUBs activity were both from R&D Systems. Test compounds were first dissolved in DMSO to prepare a 10 mM stock solution, and then the stock solution was diluted with a buffer solution [containing 20 mM Tris-HCl (pH 8.0), 2 mM $CaCl_2$), 3 mM BME, 0.01% Prionix, 0.01% Triton X-100] to the desired concentration (with DMSO content less than or equal to 0.5%). The dilution was mixed well with USP28 (final concentration 4 nM) in a 96-well plate and incubated at room temperature for 30 min, and then added with the substrate (ubiquitin-rhodamine 110) to 125 nM. The final volume of the whole reaction system was 20 μL. The released fluorescence (excitation wavelength 485 nm, emission wavelength 535 nm) was detected immediately on a microplate reader after the addition of the substrate. The inhibitory rate of the test compound against USP28 was calculated according to the following formula:

Inhibition %=1−[(test compound+fluorescence value of substrate−fluorescence value of test compound (no substrate))/mean fluorescence value of DMSO control group−fluorescence value of test compound (no substrate)]

According to the inhibitory rates of the test compound against USP28 under different concentrations, $IC_{50}$ was calculated.

Example 12

USP25 activity was measured using ubiquitin-rhodamine 110 method.

Purified USP25 and the ubiquitin-rhodamine 110 substrate used for measuring DUBs activity were both from R&D Systems. Test compounds were first dissolved in DMSO to prepare a 10 mM stock solution, and then the stock solution was diluted with a buffer solution [containing 20 mM Tris-HCl (pH 8.0), 2 mM $CaCl_2$, 3 mM BME, 0.01% Prionix, 0.01% Triton X-100] to the desired concentration (with DMSO content less than or equal to 0.5%). The dilution was mixed well with USP25 (final concentration 15 nM) in a 96-well plate and incubated at room temperature for 30 min, and then added with the substrate (ubiquitin-rhodamine 110) to 125 nM. The final volume of the whole reaction system was 20 μL. The released fluorescence (excitation wavelength 485 nm, emission wavelength 535 nm) was detected immediately on a microplate reader after the addition of the substrate, and the inhibitory rate of the test compound against USP25 was calculated according to the following formula:

Inhibition %=1−[(test compound+fluorescence value of substrate−fluorescence value of test compound (no substrate))/mean fluorescence value of DMSO control group−fluorescence value of test compound (no substrate)]

As in Example 11, according to the inhibitory rates of the test compound against USP25 under different concentrations, $IC_{50}$ was calculated.

TABLE 8

Inhibitory activity of example compounds disclosed herein against USP28 and USP25 ($IC_{50}$)

| No. | USP28 | USP25 |
|---|---|---|
| I-1 | ++++ | ++++ |
| I-2 | +++ | +++ |
| I-3 | ++++ | +++ |
| I-4 | ++++ | ++++ |
| I-5 | ++++ | ++++ |
| I-6 | ++++ | ++++ |
| I-7 | ++++ | +++ |
| I-8 | ++++ | ++++ |
| I-9 | ++++ | +++ |
| I-10 | ++++ | ++ |
| I-11 | ++++ | − |
| I-12 | ++++ | + |
| I-13 | ++++ | − |
| I-14 | ++++ | − |
| I-15 | ++++ | ++ |
| I-16 | +++ | ++ |
| I-17 | +++ | +++ |
| I-18 | +++ | − |
| I-19 | ++ | − |
| I-20 | +++ | +++ |
| I-21 | +++ | ++ |
| I-22 | +++ | +++ |
| I-23 | +++ | + |
| I-24 | +++ | − |
| I-25 | + | − |
| I-26 | +++ | + |
| I-27 | ++++ | ++++ |
| I-28 | ++++ | ++++ |
| I-29 | ++++ | +++ |
| I-30 | +++ | ++ |
| I-31 | ++++ | +++ |
| I-32 | ++++ | + |
| I-33 | ++++ | + |
| I-34 | ++++ | +++ |
| I-35 | ++++ | +++ |
| I-36 | ++++ | ++++ |
| I-37 | ++++ | ++++ |
| I-38 | ++++ | − |
| I-39 | +++ | +++ |
| I-40 | ++++ | +++ |
| I-41 | +++ | − |
| I-42 | ++++ | − |
| I-43 | ++++ | − |
| I-44 | ++++ | − |
| I-45 | ++++ | − |
| I-46 | +++ | + |
| I-47 | ++++ | + |
| I-48 | ++++ | + |
| I-49 | ++++ | ++ |
| I-50 | ++++ | ++ |
| I-51 | ++++ | ++ |
| I-52 | ++++ | + |
| I-53 | +++ | − |
| I-54 | ++++ | + |
| I-55 | ++ | − |
| I-56 | +++ | ++ |
| I-57 | ++++ | + |
| I-58 | +++ | − |
| I-59 | ++++ | ++ |
| I-60 | ++++ | + |
| I-61 | ++ | − |
| I-62 | +++ | − |
| I-63 | +++ | − |
| I-64 | ++++ | +++ |
| I-65 | +++ | + |
| I-66 | +++ | +++ |
| I-67 | +++ | +++ |
| I-68 | +++ | +++ |
| I-69 | ++++ | +++ |
| I-70 | ++ | − |
| I-71 | ++++ | + |
| I-72 | ++++ | +++ |
| I-73 | ++++ | +++ |
| I-74 | ++++ | ++++ |
| I-75 | ++++ | ++++ |
| I-76 | ++++ | ++++ |
| I-77 | ++++ | ++++ |
| I-78 | ++++ | ++++ |
| I-79 | ++++ | +++ |
| I-80 | ++ | ++ |
| I-81 | ++ | − |
| I-82 | +++ | +++ |
| I-83 | +++ | + |
| I-84 | ++ | − |
| I-85 | ++++ | ++++ |
| I-86 | +++ | ++ |
| I-87 | ++++ | +++ |
| I-88 | ++ | ++ |
| I-89 | ++ | + |
| I-90 | ++++ | +++ |

TABLE 8-continued

Inhibitory activity of example compounds disclosed herein against USP28 and USP25 (IC$_{50}$)

| No. | USP28 | USP25 |
|---|---|---|
| I-91 | ++++ | ++++ |
| I-92 | ++ | − |
| I-93 | +++ | +++ |
| I-94 | +++ | − |
| I-95 | ++++ | ++++ |

The ranges of IC$_{50}$ represented by the symbols in Table 8 above are as follows:
++++ <0.1 μM;
+++ 0.1-1.0 μM;
++ 1.0-5.0 μM;
+ 5.0-10.0 μM;
− >10 μM

Example 13

Referring to Example 11 and Example 12, inhibitory activities (IC$_{50}$) of representative compounds disclosed herein and related compounds against USP28 and USP25 were tested, and the test results IC$_{50}$(E) of the compounds disclosed herein (E) was compared with the test results IC$_{50}$(F) of the related compounds (F) (to calculate the IC$_{50}$(F)/IC$_{50}$(E) ratios). The results show that the compounds disclosed herein (E) with the characteristic 3-methylamino group modification can have effectively improved inhibitory activity against USP28 and USP25 compared with the related 3-amino compounds (F). Representative comparative examples are shown in Table 9 below.

TABLE 9

Comparison of inhibitory activities (IC$_{50}$) of compounds disclosed herein (E) and related compounds (F) against USP28 and USP25

| No. | Compounds disclosed herein (3-NHMe, E) Structures | Related compounds (3-NH$_2$, F) (In the prior art) | IC$_{50}$(F)/IC$_{50}$(E) USP28 | USP25 |
|---|---|---|---|---|
| I-1 | [structure] | CN 201780021667.1 (Example I-15) | 18.75 | >20 |
| I-9 | [structure] | CN 201780021667.1 (General formula I, no example) | 9.2 | >10 |
| I-76 | [structure] | CN201780021734.X (Example I-5) | 33.3 | >20 |
| I-58 | [structure] | CN 201780021667.1 (General formula I, no example) | 5.0 | >8 |
| I-49 | [structure] | Not available in the prior art | 5.0 | >7 |

TABLE 9-continued

Comparison of inhibitory activities (IC$_{50}$) of compounds disclosed herein (E) and related compounds (F) against USP28 and USP25

| No. | Compounds disclosed herein (3-NHMe, E) Structures | Related compounds (3-NH$_2$, F) (In the prior art) | IC$_{50}$(F)/IC$_{50}$(E) USP28 | USP25 |
|---|---|---|---|---|
| I-85 | | PCT/US2018/046061 (Examples 1-3) | 8.8 | >8 |
| I-90 | | PCT/US2018/046061 (Example 11-1) | 5.5 | >6 |

The above experimental results show that the example compounds disclosed herein have a very significant improvement in inhibitory activity against USP28 and/or USP25 over related compounds (including compounds in the prior art) prior to structural optimization, and as shown in Table 9, the inhibitory activity of the improved compounds against USP28 and USP25 is more than 5 times that of the compounds in the prior art, indicating that the monoalkylated (or substitution-alkylated) 3-NH$_2$ of general formula I disclosed herein is a key site for the inhibitory activity of this type of compounds against USP28 and USP25.

Although examples of the present invention are illustrated and described above, it will be appreciated that the above examples are exemplary and not to be construed as limiting the present invention, and that changes, modifications, substitutions and alterations can be made to the above examples by those of ordinary skill in the art within the scope of the present invention.

The invention claimed is:

1. A compound of formula I, or a racemate, a stereoisomer, a tautomer, an isotopically labeled compound, a solvate, an ester, a pharmaceutically acceptable salt or a prodrug thereof:

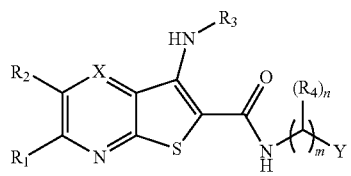
(I)

Wherein
X is CR$_5$ or N;
n is 1 or 2;
Y is selected from the group consisting of

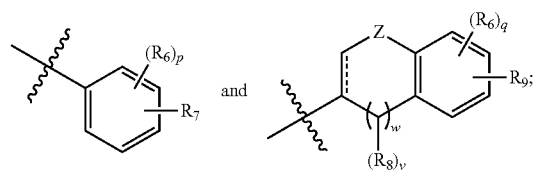

when Y is

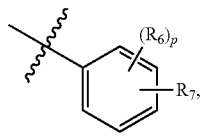

m is 2;
when Y is

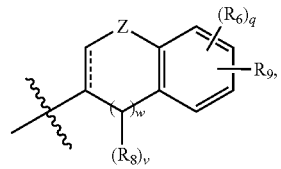

m is 0, 1 or 2;
Z is NH, O, S or CH$_2$; the dashed bond is a bond or not;
p is 1, 2, 3 or 4;
q is 1, 2 or 3;

w is 0 or 1;

v is 1;

$R_1$, $R_2$ and $R_5$, the same or different, are each independently selected from the group consisting of hydrogen, halogen, hydroxyl, amino, ($C_1$-$C_6$) alkyl, ($C_1$-$C_6$) alkoxy, ($C_1$-$C_6$) haloalkyl, ($C_1$-$C_6$) hydroxyalkyl, ($C_1$-$C_6$) alkylamino, cyclopropyl, cyclobutyl, cyclopentyl, and cyclohexyl;

$R_3$ is methyl or ethyl; $R_4$ and $R_6$, the same or different, are each independently selected from the group consisting of hydrogen, halogen, hydroxyl, amino, ($C_1$-$C_6$) alkyl, ($C_1$-$C_6$) alkoxy, ($C_1$-$C_6$) haloalkyl, cyclopropyl, cyclobutyl, cyclopentyl, cyclohexyl, and ($C_1$-$C_6$) alkoxy ($C_1$-$C_6$) alkyl;

$R_7$ and $R_9$, the same or different, are each independently selected from the group consisting of hydrogen, halogen, ($C_1$-$C_6$) alkoxy,

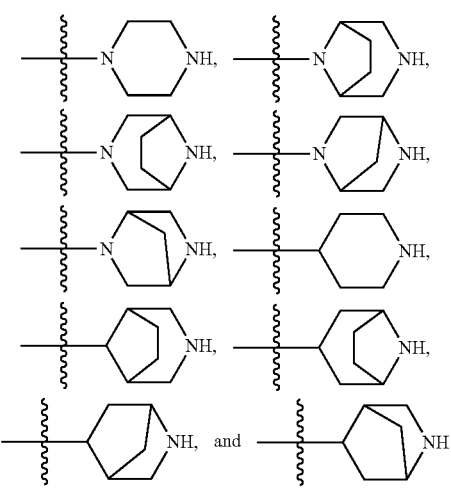

with the proviso that each $R_6$ and $R_7$ are not both H simultaneously; and $R_8$ is selected from the group consisting of hydrogen, halogen and ($C_1$-$C_6$) alkyl.

2. The compound of formula I, or the racemate, the stereoisomer, the tautomer, the isotopically labeled compound, the solvate, the ester, the pharmaceutically acceptable salt or the prodrug thereof according to claim 1, wherein $R_7$ and $R_9$ are selected from the following groups:

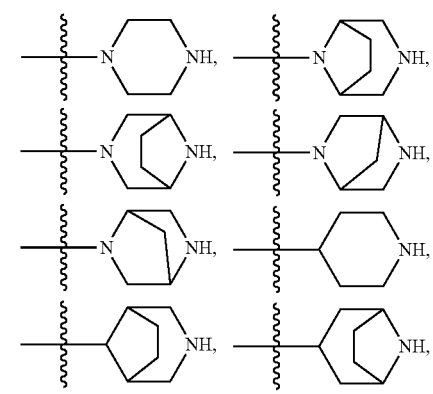

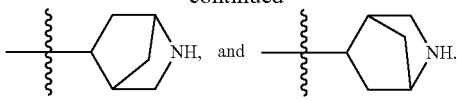

3. The compound of formula I, or the racemate, the stereoisomer, the tautomer, the isotopically labeled compound, the solvate, the ester, the pharmaceutically acceptable salt or the prodrug thereof according to claim 1, wherein the compound is of formula III:

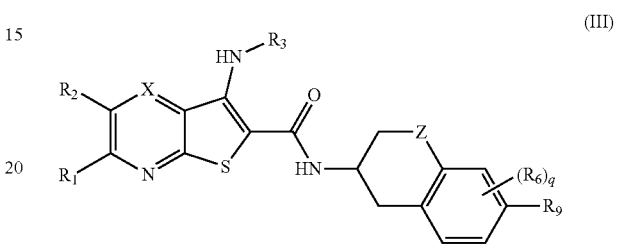

(III)

wherein, in the formula III, $R_1$, $R_2$, $R_3$, $R_6$, $R_9$, X, Z and q are as defined in formula I.

4. The compound of formula I, or the racemate, the stereoisomer, the tautomer, the isotopically labeled compound, the solvate, the ester, the pharmaceutically acceptable salt or the prodrug thereof according to claim 1, wherein the compound of formula I is selected from the following compounds:

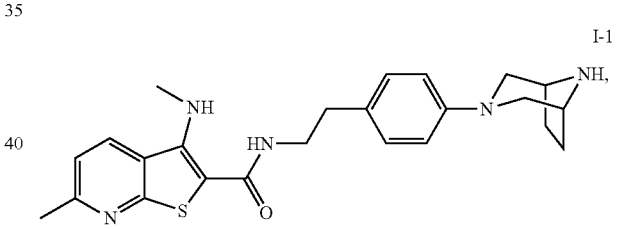

I-1

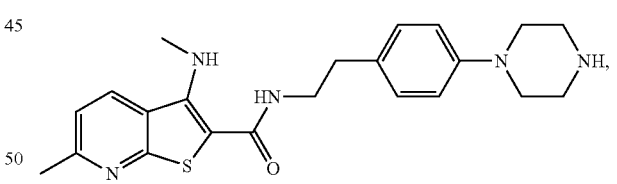

I-2

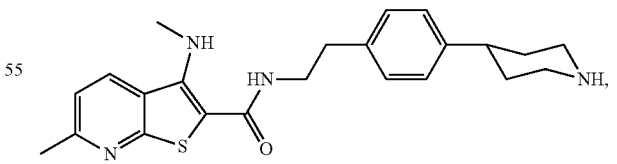

I-3

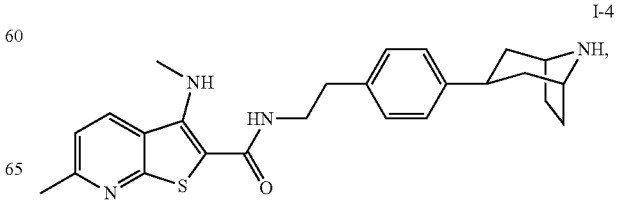

I-4

I-5
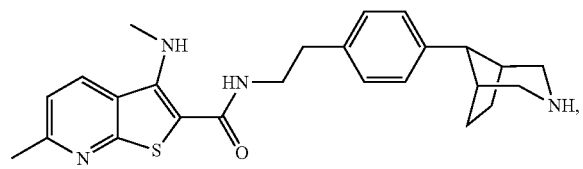
I-6
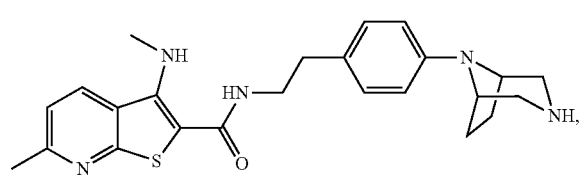
I-7
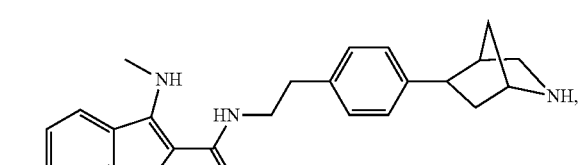
I-8
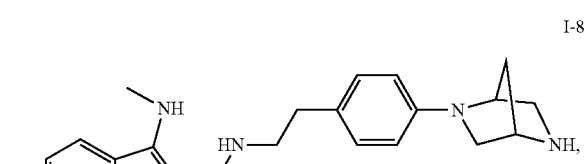
I-9
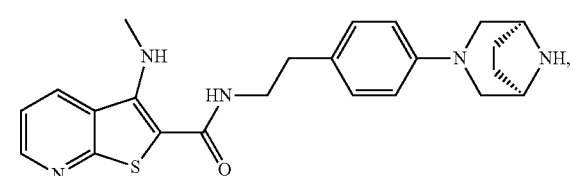
I-10
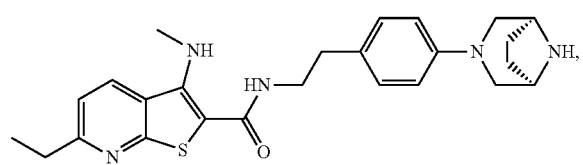
I-11
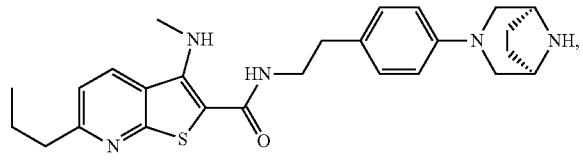
I-12
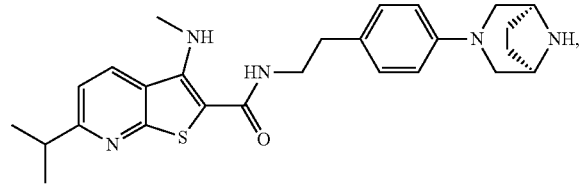
I-13
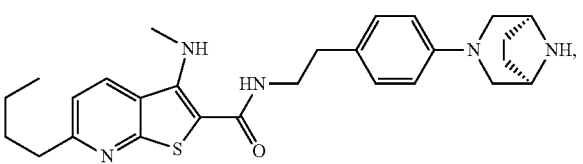
I-14
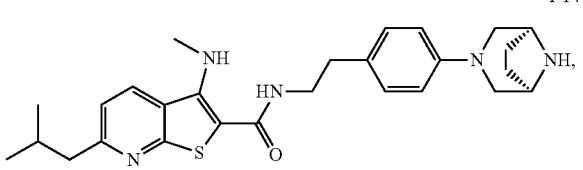
I-15
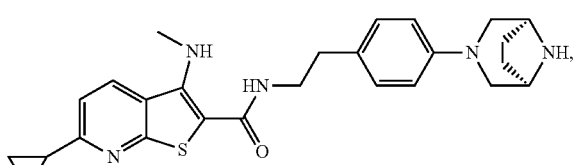
I-16
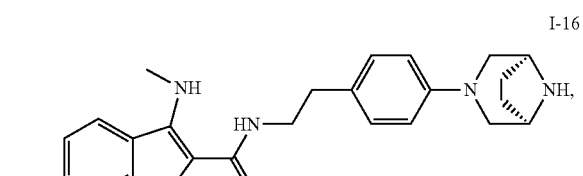
I-17
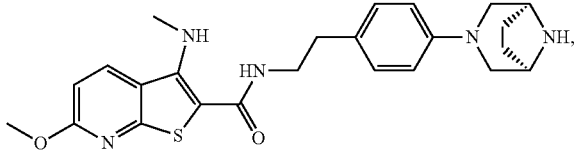
I-18
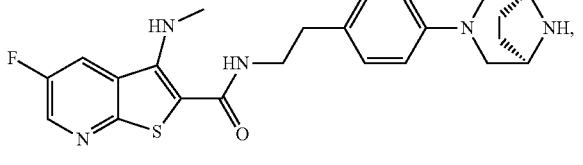
I-19
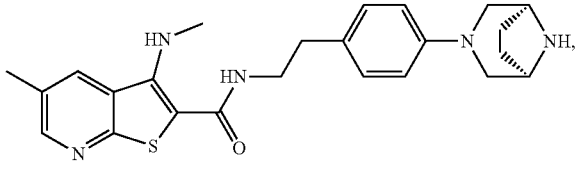
I-20

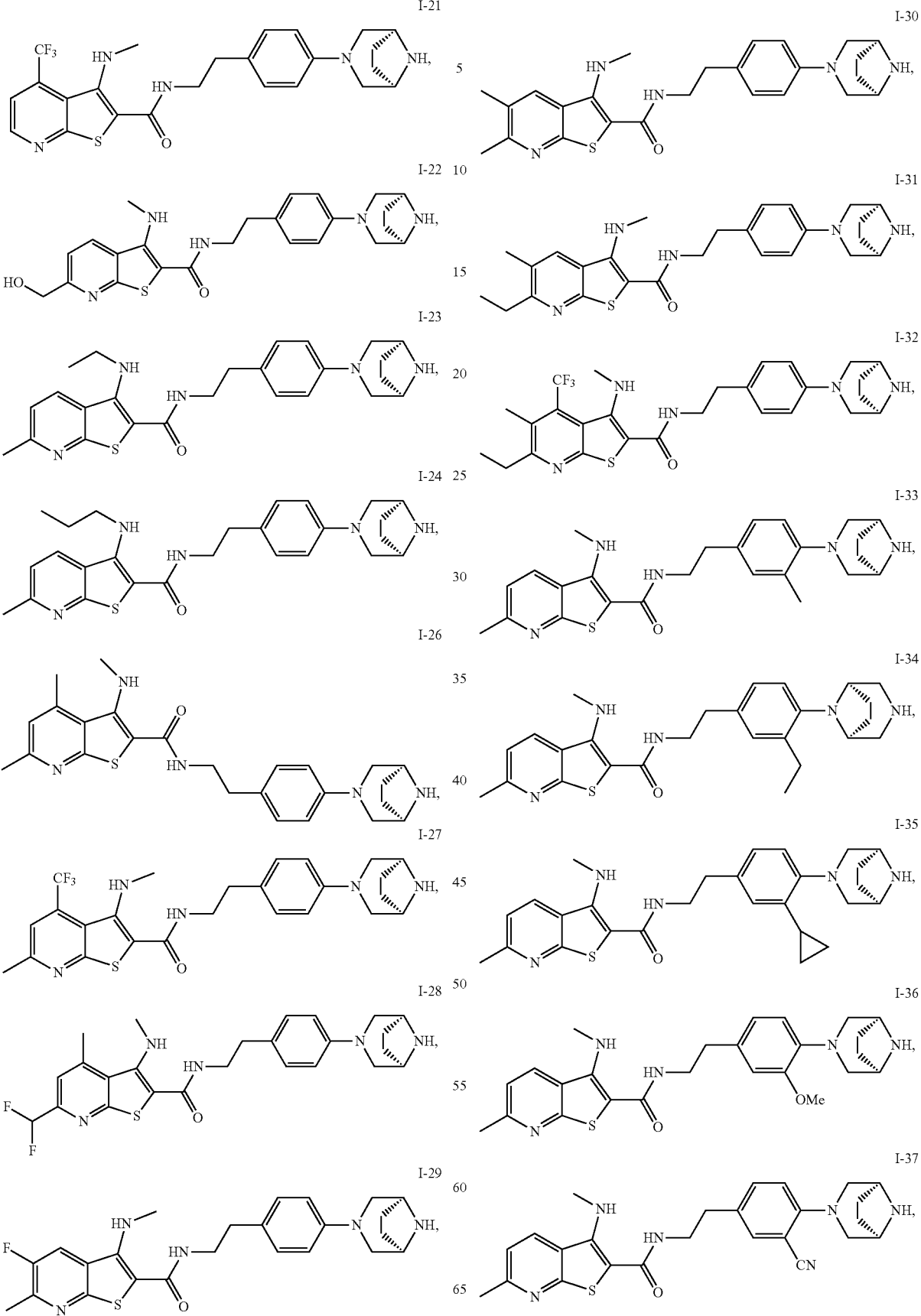
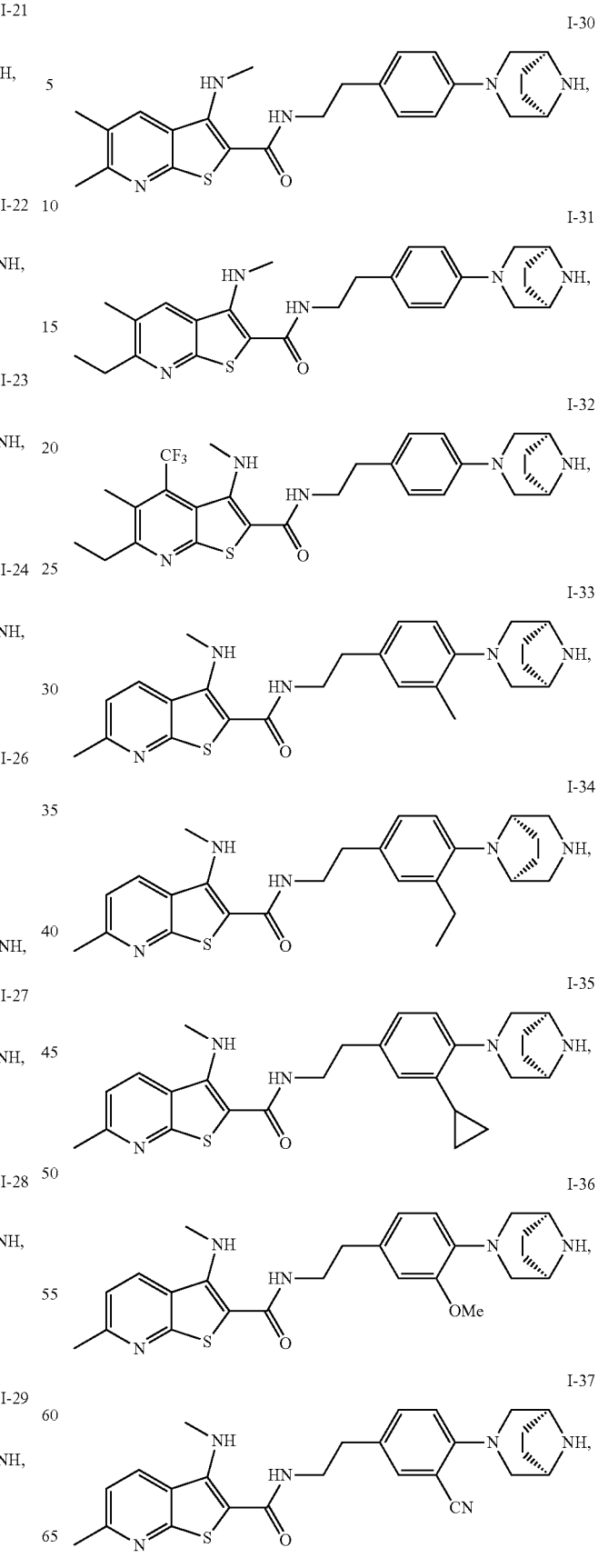

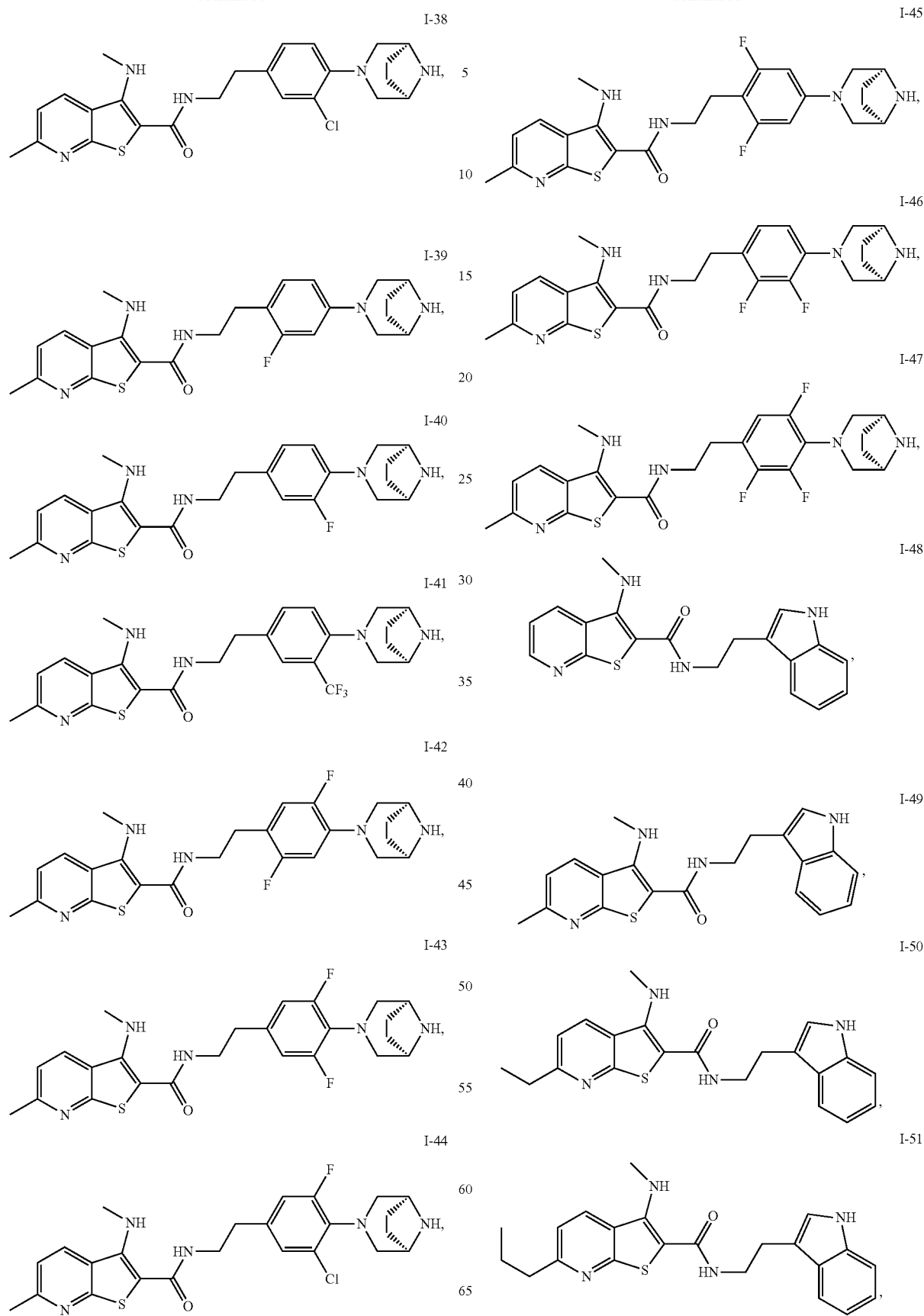

I-52
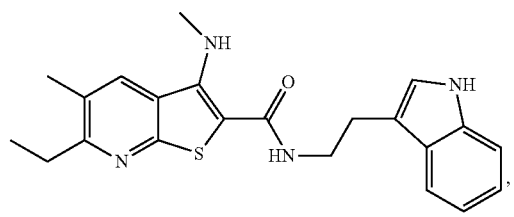
I-53
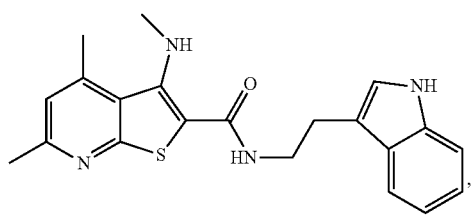
I-54
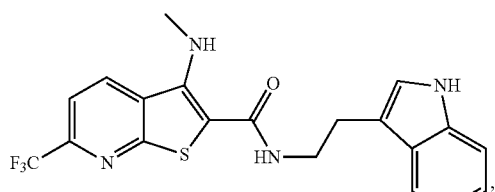
I-55
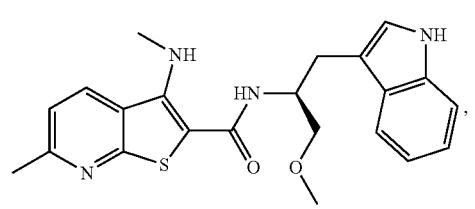
I-56
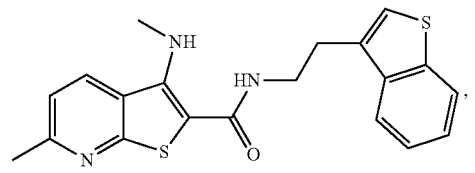
I-57
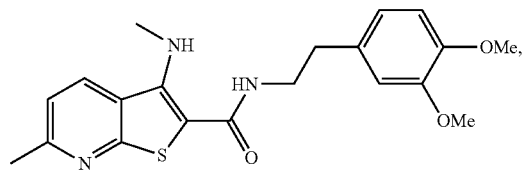
I-58
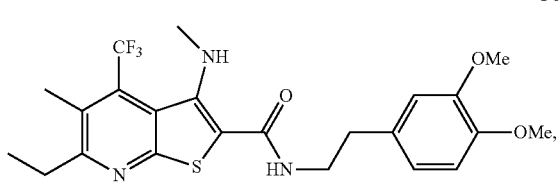
I-59
I-60
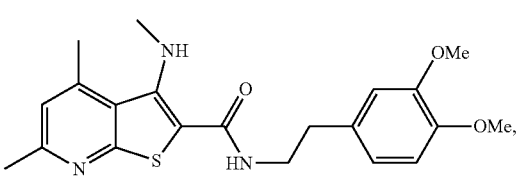
I-61
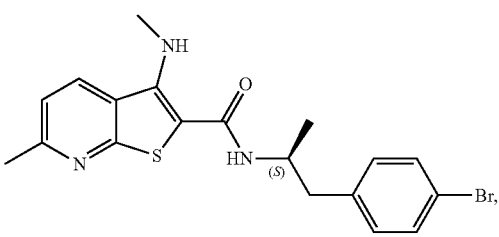
I-62
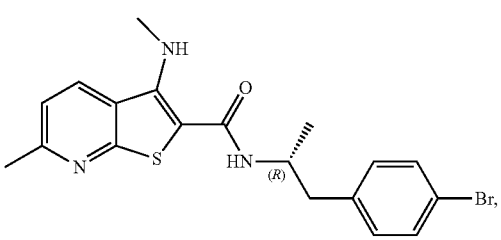
I-63
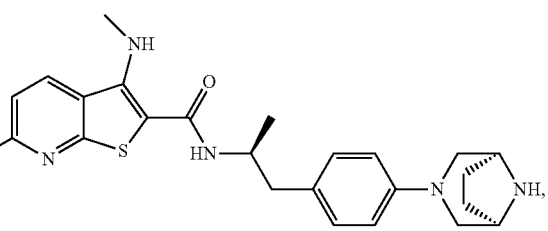
I-64
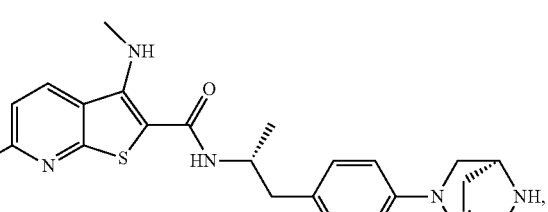
I-65
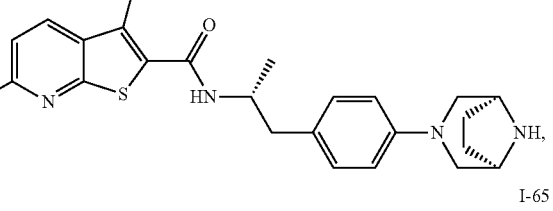
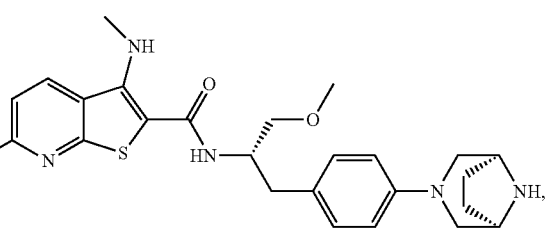

I-66
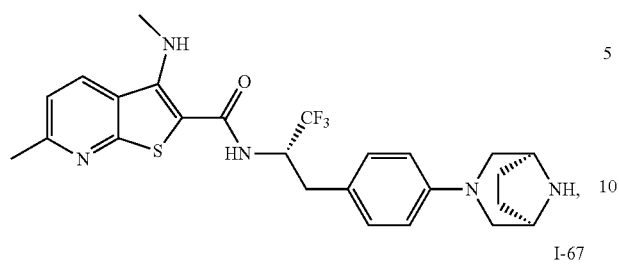
I-73
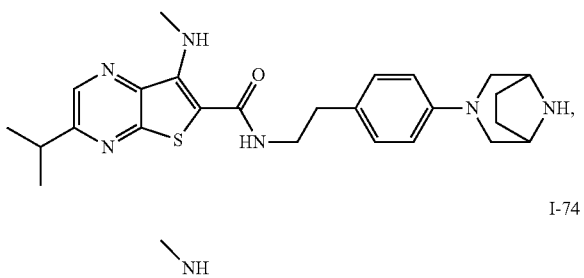
I-67
I-74
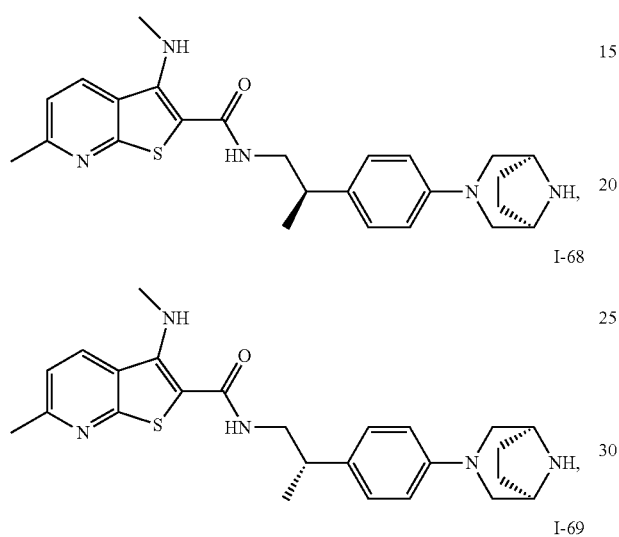
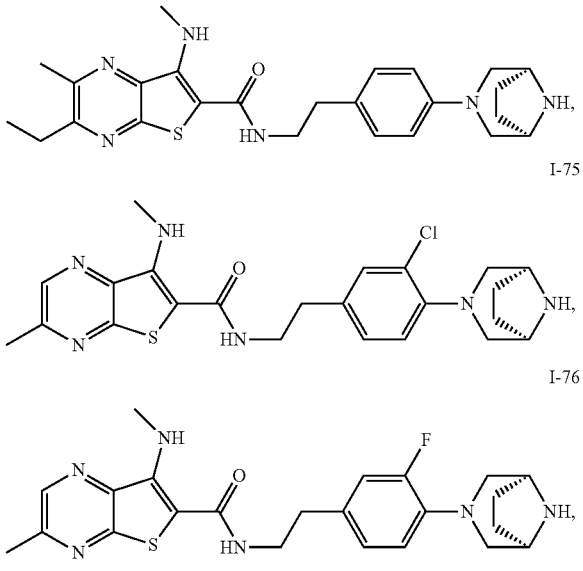
I-68
I-75
I-69
I-76
I-70
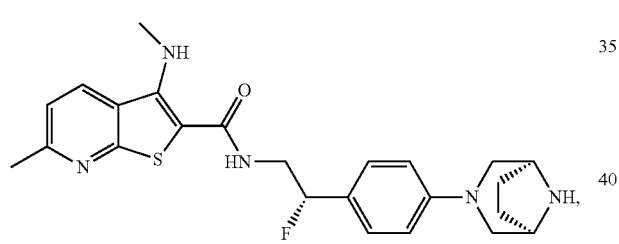
I-77
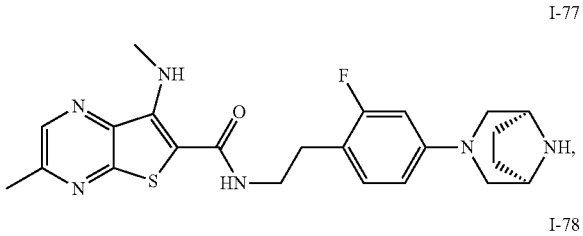
I-71
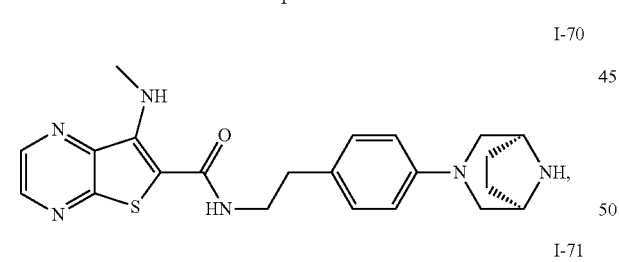
I-78
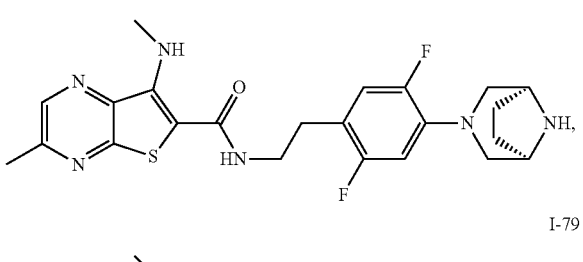
I-72
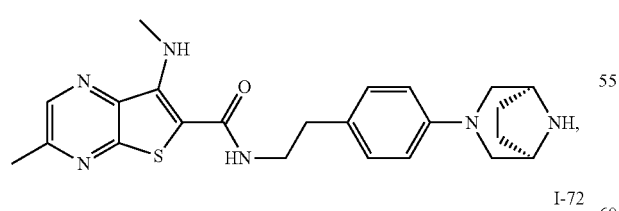
I-79
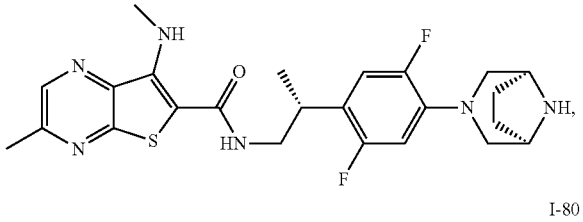
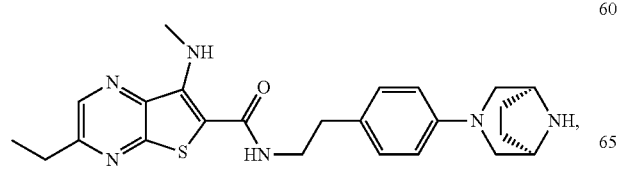
I-80
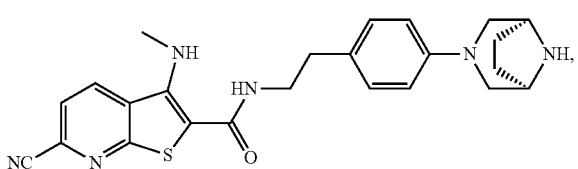

-continued

I-81, I-82, I-83, I-84, I-85, I-86, I-87, I-88, I-89, I-90, I-91, I-92, I-93, I-94

-continued

I-95

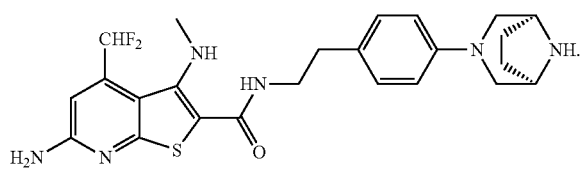

5. A method for treating a disease or disorder associated with the modulation of USP28 or USP25, which comprises administering to a patient in need thereof the compound of formula I, or the racemate, the stereoisomer, the tautomer, the isotopically labeled compound, the solvate, the ester, the pharmaceutically acceptable salt or the prodrug thereof according to claim 1.

6. The method according to claim 5, wherein the diseases or disorders associated with USP25 and/or USP28 include cancer, inflammation, autoimmune diseases, viral and bacterial infections.

7. A method for treating a disease or disorder associated with the modulation of USP28 or USP25, which comprises administering to a patient in need thereof the compound of formula I, or the racemate, the stereoisomer, the tautomer, the isotopically labeled compound, the solvate, the ester, the pharmaceutically acceptable salt or the prodrug thereof according to claim 4.

8. The method according to claim 7, wherein the diseases or disorders associated with USP25 and/or USP28 include cancer, inflammation, autoimmune diseases, viral and bacterial infections.

9. A pharmaceutical composition, comprising the compound of formula I, or the racemate, the stereoisomer, the tautomer, the isotopically labeled compound, the solvate, the ester, the pharmaceutically acceptable salt or the prodrug thereof according to claim 1.

10. A preparation method for the compound of formula I, or the racemate, the stereoisomer, the tautomer, the isotopically labeled compound, the solvate, the ester, the pharmaceutically acceptable salt or the prodrug thereof according to claim 1, comprising:
reacting an intermediate carboxylic acid A and an intermediate amine B with a peptide coupling reagent under a basic condition to form an amide, and removing protecting groups to give a target compound I:

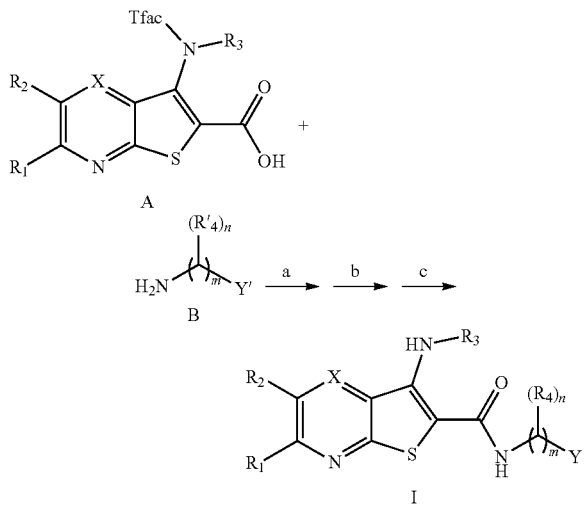

wherein $R_1$, $R_2$, $R_3$, X, m and n are as defined in formula I; $R'_4$ and Y' are $R_4$ and Y of formula I, or $R_4$ and Y in which active groups are protected by protecting groups; wherein the reagents and the reaction conditions in the step include:

a) amide coupling reaction: the coupling reagent is selected from EDCI-HOBt, BOP and HATU, and the base is selected from DEA, TEA, EDCI and DMAP; the solvent is selected from DCM and DMF;

b) Tfac removal reaction: the base is selected from $K_2CO_3$ and NaOMe, and the solvent is MeOH; and c) Boc removal reaction: dilute hydrochloric acid-methanol.

11. The preparation method according to claim 10, wherein
the intermediate carboxylic acid A is prepared according to the following reaction scheme:

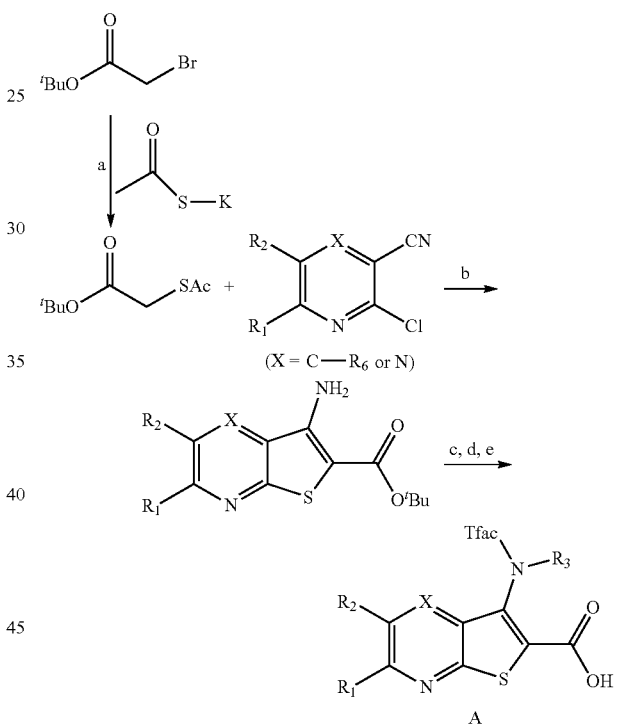

wherein, in the reaction scheme, letter "a" represents DMF; letter "b" represents NaOMe/DMF; letter "c" represents $(Tfac)_2O/NaHCO_3/CHCl_3$; letter "d" represents NaH/DMF, $R_3$—I; and letter "e" represents TFA/DCM.

12. The preparation method according to claim 10, wherein the intermediate B-I is B-Ia and B-Ib,

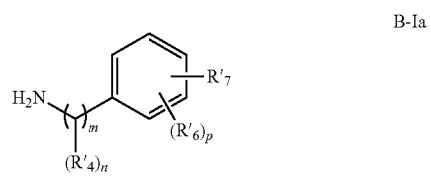

B-Ia

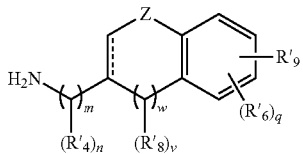

B-Ib wherein Z, m, n, p, q, w and v are as defined in formula I; $R'_4$, $R'_6$, $R'_7$, $R'_8$ and $R'_9$ are defined as $R_4$, $R_6$, $R_7$, $R_8$ and $R_9$ of formula I, or $R_4$, $R_6$, $R_7$, $R_8$ and $R_9$ in which active groups are protected by protecting groups; $R'_7$ and $R'_9$ are selected from hydrogen, halogen and ($C_1$-$C_6$) alkoxyl and the functional groups in which active groups are protected; with the proviso that each $R'_6$ and $R'_7$ are not both hydrogen atoms simultaneously.

13. The preparation method according to claim 12, wherein, intermediate B-II is B-IIa or B-IIb, respectively prepared according to the following reaction schemes:

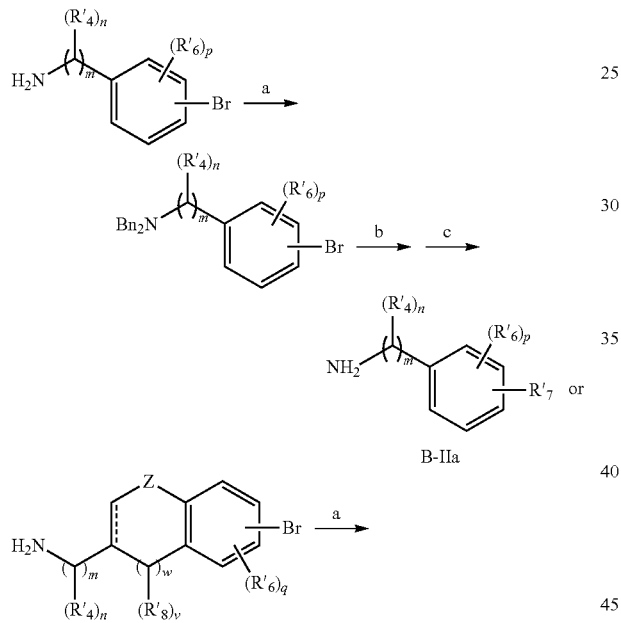

B-IIa

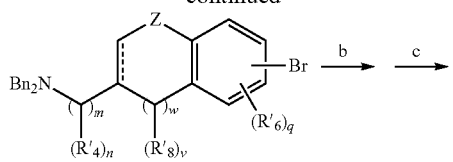

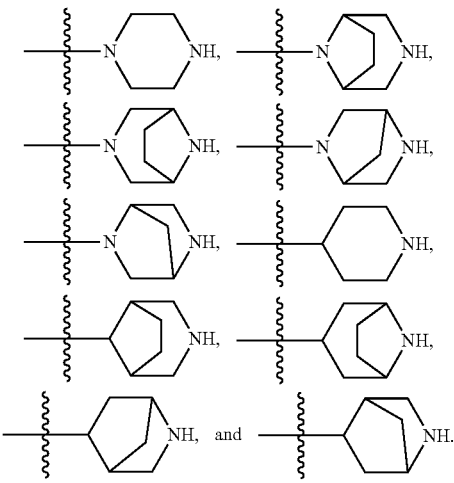

B-IIb wherein Z, m, n, p, q, w and v are as defined in formula I; $R'_4$, $R'_6$ and $R'_8$ are defined as $R_4$, $R_6$ and $R_8$ of formula I, or the functional groups in which active groups are protected by protecting groups; $R'_7$ and $R'_9$ are selected from the following groups, or the following groups in which active groups are protected by protecting groups;

* * * * *